(12) United States Patent
Serry

(10) Patent No.: US 9,891,246 B2
(45) Date of Patent: Feb. 13, 2018

(54) HARMONIC FEEDBACK ATOMIC FORCE MICROSCOPY

(71) Applicant: Fardad Michael Serry, Oxnard, CA (US)

(72) Inventor: Fardad Michael Serry, Oxnard, CA (US)

(*) Notice: Subject to any disclaimer, the term of this patent is extended or adjusted under 35 U.S.C. 154(b) by 0 days.

(21) Appl. No.: 15/229,515

(22) Filed: Aug. 5, 2016

(65) Prior Publication Data

US 2017/0038410 A1  Feb. 9, 2017

Related U.S. Application Data

(60) Provisional application No. 62/202,011, filed on Aug. 6, 2015.

(51) Int. Cl.
| | |
|---|---|
| *G01Q 10/00* | (2010.01) |
| *G01Q 60/32* | (2010.01) |
| *G01Q 10/06* | (2010.01) |
| *G01Q 60/24* | (2010.01) |

(52) U.S. Cl.
CPC .......... *G01Q 60/32* (2013.01); *G01Q 10/065* (2013.01); *G01Q 60/24* (2013.01)

(58) Field of Classification Search
CPC ...... G01Q 10/06; G01Q 20/00; G01Q 10/065; G01Q 10/00; G01Q 60/38; G01Q 60/24; G01Q 60/32; G01Q 60/34
See application file for complete search history.

(56) References Cited

U.S. PATENT DOCUMENTS

| | | | |
|---|---|---|---|
| 5,412,980 A | 5/1995 | Elings et al. | |
| 5,614,712 A * | 3/1997 | Ray | B82Y 35/00 250/306 |
| 5,753,814 A | 5/1998 | Han et al. | |
| 6,838,889 B2 | 1/2005 | Su et al. | |

(Continued)

OTHER PUBLICATIONS

Sneddon, Ian N., "The relation between load and penetration in the axisymmetric Boussinesq problem for a punch of arbitrary profile," *International Journal of Engineering Science* (Permagon Press, 1965), vol. 3, pp. 47-57.

(Continued)

*Primary Examiner* — Wyatt Stoffa
(74) *Attorney, Agent, or Firm* — DASCENZO Intellectual Property Law, P.C.

(57) ABSTRACT

Harmonic feedback atomic force microscopy (HF-AFM) includes regulating feedback in oscillating probe atomic force microscopy (AFM) based upon an extracted frequency component of a probe response signal. Feedback in conventional oscillating probe AFM uses the probe response signal as a whole (or at least a driven frequency component of the probe response signal). The extracted frequency of the extracted frequency component of HF-AFM generally is different from any substantially driven frequency that generates the probe oscillation and may be a harmonic of a driven frequency. The regulating may include responding to the strength or weakness of the extracted frequency component such that weakening (or strengthening) of the extracted frequency component contributes positively to a decrease (or an increase) in the average tip-sample distance and contributes negatively to an increase (or a decrease) in the average tip-sample distance.

29 Claims, 26 Drawing Sheets

(56) References Cited

U.S. PATENT DOCUMENTS

| | | | | |
|---|---|---|---|---|
| 7,451,638 | B1* | 11/2008 | Sahin | B82Y 35/00 73/105 |
| 7,775,086 | B2 | 8/2010 | Jesse et al. | |
| 7,954,165 | B2* | 5/2011 | Ando | G01Q 10/065 850/38 |
| 8,448,502 | B2* | 5/2013 | Jesse | G01Q 10/06 73/105 |
| 8,379,309 | B2 | 5/2014 | Hu et al. | |
| 9,244,103 | B1* | 1/2016 | Haviland | G01R 23/20 |
| 9,297,827 | B2* | 3/2016 | Proksch | G01Q 10/00 |
| 2004/0182140 | A1* | 9/2004 | Weide | B82Y 35/00 73/105 |
| 2008/0127722 | A1* | 6/2008 | Su | B82Y 35/00 73/105 |
| 2008/0295583 | A1* | 12/2008 | Giessibl | B82Y 35/00 73/105 |
| 2009/0133168 | A1* | 5/2009 | Ando | G01Q 10/065 850/33 |
| 2010/0011471 | A1* | 1/2010 | Jesse | G01Q 10/06 850/21 |
| 2011/0167524 | A1* | 7/2011 | Hu | G01Q 10/065 850/1 |
| 2011/0289635 | A1* | 11/2011 | Burns | G01Q 10/065 850/1 |
| 2012/0131702 | A1* | 5/2012 | Shi | G01Q 10/065 850/1 |
| 2012/0151637 | A1* | 6/2012 | Fukuma | B82Y 35/00 850/1 |
| 2013/0117895 | A1* | 5/2013 | Proksch | G01Q 10/00 850/1 |
| 2013/0340125 | A1* | 12/2013 | Jesse | G01Q 10/06 850/5 |
| 2013/0340126 | A1* | 12/2013 | Proksch | G01Q 60/32 850/33 |
| 2014/0041084 | A1* | 2/2014 | Proksch | G01Q 60/32 850/33 |
| 2015/0293144 | A1* | 10/2015 | Jesse | G01Q 10/06 850/5 |
| 2016/0282384 | A1* | 9/2016 | Proksch | G01Q 10/00 |
| 2017/0052209 | A1* | 2/2017 | Sadeghian Marnani | G01Q 10/06 |
| 2017/0131322 | A1* | 5/2017 | Proksch | G01Q 10/02 |

OTHER PUBLICATIONS

Marti et al., "Control electronics for atomic force microscopy," *Review of Scientific Instruments* (Jun. 1988), vol. 59, No. 6, pp. 836-839.
Burnham et al., "Interpretation of force curves in force microscopy," *Nanotechnology* (1993), vol. 4, pp. 64-80.
Rabe et al., "Vibrations of free and surface-coupled atomic force microscope cantilevers: Theory and experiment," *Review of Scientific Instruments* (Sep. 1996), vol. 67, No. 9, pp. 3281-3293.
Walters et al., "Short cantilevers for atomic force microscopy," *Review of Scientific Instruments* (Oct. 1996), vol. 67, No. 10, pp. 3583-3590.
Burnham et al., "How does a tip tap?," *Nanotechnology* (1997), vol. 8, pp. 67-75.
Stark et al., "Tapping-mode atomic force microscopy and phase-imaging in higher eigenmodes," *Applied Physics Letters* (May 31, 1999), vol. 74, No. 22, pp. 3296-3298.
Viani et al., "Small cantilevers for force spectroscopy of single molecules," *Journal of Applied Physics* (Aug. 15, 1999), vol. 86, No. 4, pp. 2258-2262.
Stark et al., "Fourier transformed atomic force microscopy: tapping mode atomic force microscopy beyond the Hookian approximation," *Surface Science* (2000), vol. 457, pp. 219-228.
Sulchek et al., "High-speed tapping mode imaging with active Q control for atomic force microscopy," *Applied Physics Letters* (Mar. 13, 2000), vol. 76, No. 11, pp. 1473-1475.

de Pablo et al., "Tip-sample interaction in tapping-mode scanning force microscopy," *Physical Review B* (May 15, 2000), vol. 61, No. 20, pp. 14179-14183.
San Paulo et al., "Unifying theory of tapping-mode atomic-force microscopy," *Physical Review B* (2002), vol. 66, 041406, pp. 1-4.
Sulchek et al., "Characterization and optimization of scan speed for tapping-mode atomic force microscopy," *Review of Scientific Instruments* (Aug. 2002), vol. 73, No. 8, pp. 2928-2936.
Stark et al., Higher harmonics imaging in tapping-mode atomic-force microscopy, *Review of Scientific Instruments* (Dec. 2003), vol. 74, No. 12, pp. 5111-5114.
Rodríguez et al., "Compositional mapping of surfaces in atomic force microscopy by excitation of the second normal mode of the microcantilever," *Applied Physics Letters* (Jan. 19, 2004), vol. 84, No. 3, pp. 449-451.
Sahin et al., "High-resolution imaging of elastic properties using harmonic cantilevers," *Sensors and Actuators A* (2004), vol. 114, pp. 183-190.
Sahin et al., "Resonant harmonic response in tapping-mode atomic force microscopy," *Physical Review B* (2004), vol. 69, 165416, pp. 1-9.
Schiener et al., "Stabilized atomic force microscopy imaging in liquids using second harmonic of cantilever motion for setpoint control," *Review of Scientific Instruments* (Aug. 2004), vol. 75, No. 8, pp. 2564-2568.
Balantekin et al., "Enhancing higher harmonics of a tapping cantilever by excitation at a submultiple of its resonance frequency," *Physical Review B* (Mar. 22, 2005), vol. 71, 125416, pp. 1-6.
Crittenden et al., "Probing attractive forces at the nanoscale using higher-harmonic dynamic force microscopy," *Physical Review B* (Dec. 21, 2005), vol. 72, 235422, pp. 1-13.
Stark et al., "Higher Harmonics in Dynamic Atomic Force Microscopy." in: Bhushan et al. (eds.), *Applied Scanning Probe Methods II: Scanning Probe Microscopy Techniques* (Springer Berlin Heidelberg, 2006), pp. 1-36, ISBN 978-3-540-26242-8.
Legleiter et al., "Scanning probe acceleration microscopy (SPAM) in fluids: Mapping mechanical properties of surfaces at the nanoscale," *PNAS* (Mar. 28, 2006), vol. 103, No. 13, pp. 4813-4818.
Jeong et al., "Direct tip-sample interaction force control for the dynamic mode atomic force microscopy," *Applied Physics Letters* (2006), vol. 88, 204102, pp. 1-3.
Kodera et al., "Dynamic proportional-integral-differential controller for high-speed atomic force microscopy," *Review of Scientific Instruments* (2006), vol. 77, 083704, pp. 1-7.
Proksch, Roger, "Multifrequency, repulsive-mode amplitude-modulated atomic force microscopy," *Applied Physics Letters* (2006), vol. 89, 113121, pp. 1-3.
Zhang et al., "Nonlinear dynamics of atomic force microscopy with intermittent contact," *Chaos, Solitons and Fractals* (2007), vol. 34, pp. 1021-2014.
Jeong et al., "Control of tip-to-sample distance in atomic force microscopy: A dual-actuator tip-motion control scheme," *Review of Scientific Instruments* (Sep. 26, 2007), vol. 78, 093706, pp. 1-7.
Platz et al., "Intermodulation atomic force microscopy," *Applied Physics Letters* (Apr. 15, 2008), vol. 92, 153106, pp. 1-3.
Abak et al., "Parametrically coupled multiharmonic force imaging," *Applied Physics Letters* (Jun. 6, 2008), vol. 92, 223113, pp. 1-3.
Melcher et al., "Multiple impact regimes in liquid environment dynamic atomic force microscopy," *Applied Physics Letters* (Sep. 4, 2008), vol. 93, 093111, pp. 1-3.
Ando et al., "High-speed atomic force microscopy for nano-visualization of dynamic biomolecular processes," *Progress in Surface Science* (2008), vol. 83, pp. 337-437.
Stark, Robert W., "Dynamics of repulsive dual-frequency atomic force microscopy," *Applied Physics Letters* (Feb. 10, 2009), vol. 94, 063109, pp. 1-3.
Melcher et al., "Origins of phase contrast in the atomic force microscope in liquids," *PNAS* (Aug. 18, 2009), vol. 106, No. 33, pp. 13655-13660.
Solares et al., "Triple-frequency intermittent contact atomic force microscopy characterization: Simultaneous topographical, phase, and frequency shift contrast in ambient air," *Journal of Applied Physics* (Sep. 2, 2010), vol. 108, 054901, pp. 1-5.

(56) References Cited

OTHER PUBLICATIONS

Stark, Robert W., "Bistability, higher harmonics, and chaos in AFM," *Materials Today* (Sep. 2010), vol. 13, No. 9, pp. 24-32.

Kondandarama, Santosh Ramaiah, "Bi-harmonic atomic force microscopy," a thesis presented to Missouri University of Science and Technology, 2011.

Kiracofe et al., "High efficiency laser photothermal excitation of microcantilever vibrations in air and liquids," *Review of Scientific Instruments* (Jan. 3, 2011), vol. 82. 013702, pp. 1-7.

Garcia et al., "The emergence of multifrequency force microscopy," *Nature Nanotechnology* (Apr. 1, 2012), vol. 7, pp. 217-226.

Platz et al., "Interpreting motion and force for narrow-band intermodulation atomic force microscopy," *Beilstein Journal of Nanotechnology* (Jan. 21, 2013), vol. 4, pp. 45-56.

Hall, David A., "Understanding Intermodulation Distortion Measurements," *Electronic Design* (Jul. 11, 2013), pp. 47-49.

Santos et al., "Unlocking higher harmonics in atomic force microscopy with gentle interactions," *Beilstein Journal of Nanotechnology* (Mar. 11, 2014), vol. 5, pp. 268-277.

Solares, Santiago D., "Challenges and complexities of multifrequency atomic force microscopy in liquid environments," *Beilstein Journal of Nanotechnology* (Mar. 14, 2014), vol. 5, pp. 298-307.

Labuda et al., "Photothermal excitation for improved cantilever drive performance in tapping mode atomic force microscopy," *Microscopy and Analysis: Scanning Probe Microscopy Supplement* (Apr. 2014), pp. 21-25.

Adams et al., "High-speed imaging upgrade for a standard sample scanning atomic force microscope using small cantilevers," *Review of Scientific Instruments* (Sep. 19, 2014), vol. 85, 093702, pp. 1-7.

Asylum Research, "Bimodal Dual AC™ Imaging," *Bimodal Dual AC App Note 09*, downloaded from asylumresearch.com/Applications/BimodalDualAC/BimodalDualACLR.pdf (accessed Jul. 1, 2016).

\* cited by examiner

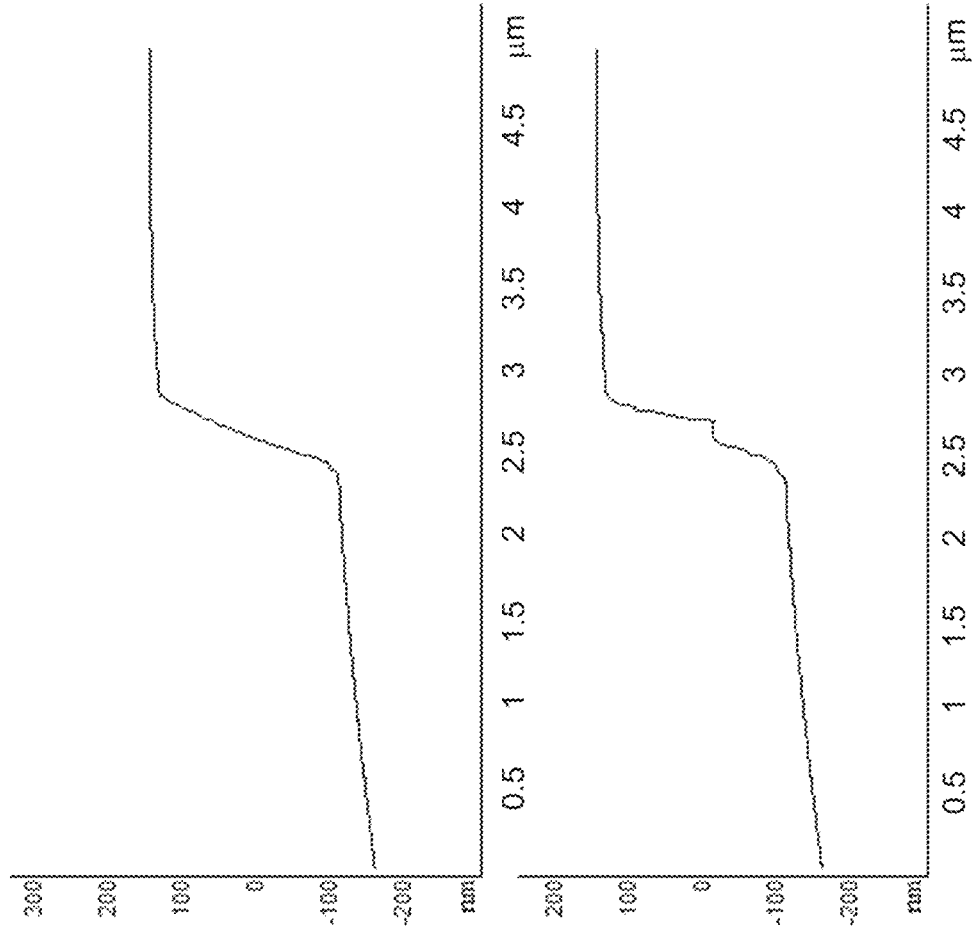

HARMONIC FEEDBACK ATOMIC FORCE MICROSCOPY

RELATED APPLICATION

This application claims priority to U.S. Provisional Patent Application Ser. No. 62/202,011, entitled "HARMONIC FEEDBACK ATOMIC FORCE MICROSCOPE," which was filed on Aug. 6, 2015, the complete disclosure of which is hereby incorporated by reference for all purposes.

FIELD

The present disclosure relates to oscillating probe atomic force microscopy (AFM).

BACKGROUND

Oscillating probe AFM uses a probe drive signal to generate substantially repetitive oscillatory motion of the AFM probe, which motion the AFM detects; but this motion is altered as a result in part of the AFM probe's sensing tip repeatedly approaching to and retracting from and/or making and breaking contact with the surface of the sample under study.

In this document the terms interaction and force are used interchangeably. In this document, tip-sample interaction covers conditions in which the tip and the sample are close enough for there to be between them detectably strong attractive forces such as van der Waals forces and/or adhesive forces (as described for example in "Interpretation of force curves in force microscopy" by N. A. Burnham et. al. in Nanotechnology Volume 4, 1993, pp 64-80) in the absence or in the presence of detectably strong repulsive contact mechanics forces as described for example by contact mechanics theory of Sneddon (for example in "The relation between load and penetration in the axisymmetric boussinesque problem for a punch of arbitrary profile", Ian N. Sneddon, International Journal of Engineering Science, volume 3, pp. 47-57. Pergamon Press 1965) and/or contact mechanics theory of Hertz (for example in "Contact Mechanics" by K. L. Johnson, Cambridge University Press 1985) and/or any other contact mechanics theory such as the Johnson-Kendall-Roberts (JKR) theory and the Derjaguin-Muller-Toporov (DMT) theory (Ibid., N. A. Burnham et. al.) Therefore, unless specifically stated otherwise, tip-sample interaction (or force) including intermittent includes any one or more of 1) exclusively attractive forces including possibly adhesive forces, 2) predominantly attractive forces with repulsive forces also present, 3) predominantly repulsive forces with attractive forces possibly including adhesive forces also present, and 4) the transitions between any two or any three of 1, 2, and 3 in this sentence. Furthermore, intermittent contact is used interchangeably with intermittent interaction. Therefore, similarly, intermittent contact may include attractive forces and/or adhesive forces and/or repulsive forces and transitions between them as discussed above in the context of intermittent interaction.

An example of prior art atomic force microscope (AFM) is illustrated in FIG. 1. In an AFM, a microfabricated probe also may be referred to as a probe and/or an AFM probe and includes an integrated sharp tip that also may be referred to as a tip, an AFM tip, an AFM probe tip, and/or a probe tip. The AFM probe tip interacts with its surroundings, which include of main interest the sample surface or immediate sub-surface as the AFM implements either one or both types of raster-scanning motion and approach-retract motion (including AFM force spectroscopy which involves one or more cycles of approach and retract) between the probe and the sample surface. FIG. 1 illustrates probe 4P and probe tip 6P and sample 10 in prior art. Raster-scanning motion is usually in a plane called the xy plane substantially parallel to the sample stage, a usually flat stage on which the sample rests. FIG. 1 illustrates sample stage 800P in prior art. The sample stage is usually parallel to the horizontal plane, but need not necessarily be so. Approach-retract motion including in AFM force spectroscopy is usually in a direction usually called the z direction substantially perpendicular to the xy plane. Raster-scanning is implemented with an actuator usually called the xy-actuator and approach-retract motion is usually implemented using an actuator usually called the z-actuator. FIG. 1 illustrates xy-actuator 744P and z-actuator 700P in some prior art. Raster-scanning and approach-retract motion are implemented by either holding the sample at a fixed position while moving the probe, or by holding the probe (which may be an oscillating probe) at one location while moving the sample. It is possible to have raster-scanning concurrently with approach-retract and force spectroscopy.

The AFM probe is typically a microfabricated cantilever beam, and the tip, including a usually nanometer-scale-sharp apex, is integrated into or attached to the free end of the cantilever probe opposite the clamped end of the probe. AFM probes with geometry different from the cantilever beam have also proven useful, but the dominant, most widely used shape has remained the cantilever beam.

In oscillating probe AFM modes, also referred to as dynamic (or AC) AFM modes, such as amplitude modulation AFM (AM-AFM), or frequency modulation AFM (FM-AFM), or torsion resonance mode AFM (TR-AFM), the probe is intentionally driven into mechanical oscillations, (i.e., oscillatory movement), which in the absence of tip-sample interaction are substantially, though not necessarily strictly, time periodic. These oscillations are indicated as "A" and the adjacent curved double-headed arrow in FIG. 1.

This movement is usually induced by applying a signal called the probe drive signal 5P directly or indirectly to the said probe. For example, the probe drive signal may be applied to a mechanical actuator such as a piezoelectric device or a quartz crystal which is in turn mechanically, i.e., via contact, coupled to the clamped base of a cantilever probe and drives the said probe into motion. Alternatively, the probe drive signal may be applied directly to the probe in the form of a modulated electromagnetic signal which brings about the said probe motion by generating thermally-induced stresses in the body of the probe (see, e.g., Scanning attractive force microscope using photothermal vibration, N. Umeda et. al., Journal of Vacuum Science and Technology B. April 1991; High efficiency laser photothermal excitation of microcantilever vibrations in air and liquids, D. Kiracofe, et. al., Review of Scientific Instruments; volume 82, 013702 (2011); and Photothermal excitation for improved cantilever drive performance in tapping mode atomic force microscopy, A. Labuda, et. al, in Microscopy and Analysis, SPM Supplement, March/April 2014). Alternatively, the probe drive signal may be applied to an inductive coil, thus generating a time-varying magnetic field which, when coupled to a magnetic coating on the probe, generates the said probe oscillatory motion.

In oscillating probe mode AFM, usually each of the single or multiple frequencies prominent or dominant in the frequency spectrum of the probe drive signal is chosen to be at or near to a mechanical resonance frequency associated with the probe's normal modes of oscillation; i.e., an eigenfrequency of the probe. One exception is peak-force tapping mode AFM (U.S. Pat. No. 8,739,309 B2). The eigenfrequencies that characterize the normal modes of a given probe are in turn determined in-part by the probe's geometry and material composition. In general, the probe drive signal generates probe movement of different types, which include torsion, bending, and rotation of the probe. In the case of a cantilever probe, these include but are not limited to torsion about the cantilever's long axis; bending along the cantilever's long axis; and rotation about an axis along the width of the cantilever at or near its clamped base. In general, as of this writing the most widely used probe drive signal is a single frequency sinusoid; however, multi-frequency probe drive signals have also been developed. See, e.g., "The emergence of multifrequency force microscopy", Ricardo Garcia and Elena T. Herruzo, Nature Nanotechnology, published online 1 Apr. 2012; and 6th Multi-frequency AFM Conference, 30 Mar.-1 Apr. 2016, Madrid Spain; and "Bimodal Dual AC Imaging", Application Note 09, Asylum Research, a division of Oxford Instruments; and "Band excitation method applicable to scanning probe microscopy", U.S. Pat. No. 7,775,086 B2.

A signal called the probe response signal 59P (FIG. 1) may include information about the tip-sample interaction as it does when the oscillating probe's sensing tip 6P makes intermittent contact with the surface of the sample 10.

The probe response signal 59P characterizes the response of the probe 4P to one or more of 1) the probe drive signal 5P; 2) the interaction of the probe's sensing tip 6P with the sample which is herein called the tip-sample interaction; and 3) the interaction of the probe 4P and its tip 6P with its surroundings minus the sample which includes all sources of noise and the ambient fluid (gaseous or liquid) which engulfs the probe 4P and its tip 6P.

Feedback in Oscillating Probe AFM

In this document, unless otherwise noted, any reference to totality of probe movement, totality of probe oscillations, probe oscillations whole, and the whole of probe movement, is to be understood in the context of such movement and such oscillations as encoded in the probe response signal and subject to inherent or intentionally introduced limitations of the detection and signal processing scheme used, especially viz. frequency selectivity. Therefore, depending on the probe and depending on the nature and the functional details of the detector and the detection scheme and signal processing used, including for example the Detector 20P and Signal Conditioner and Processor 30P in FIG. 1, the said movement and the said oscillation or oscillations qualified by the word "whole" and/or by the word "totality" may be the movement and/or the oscillation or oscillations of a location on the probe and/or of a multiplicity of locations on the probe and/or possibly though not necessarily of the entire probe. Furthermore, depending on the composition of the probe drive signal (e.g., single-frequency versus multi-frequency) and depending on the manner in which the probe response signal is constructed, the said movement and the said oscillation or oscillations qualified by the word "whole" and/or by the word "totality" may be the movement and/or oscillation or oscillations at a single frequency or at multiple frequencies or at a continuous band of frequencies.

In general, and in summary, closed-loop or feedback control of tip-sample interaction in oscillating probe AFM is usually implemented by first obtaining a probe response signal 59P indicative of the AFM probe movement; then by constructing from the probe response signal another signal 959P which is the input to a feedback loop (feedback input signal); then by comparing the feedback input signal with a setpoint signal 375P and thereby generating an error signal 405P which measures how far the feedback input signal is from the setpoint signal, and which measurement is usually made by subtracting the value of the setpoint signal 405P from the value of feedback input signal 959P or vice-versa; then by implementing a control algorithm, for example by implementing any one or more of proportional, integral, and differential (PID) gains, on the error signal 405P thereby generating a feedback output signal 1089P which is usually amplified (high voltage or HV Gains 490P) and possibly filtered or otherwise suitably processed further but not necessarily in that order before it is applied to one or more actuators 700P whose collective action is meant to reduce, ideally to zero, the said error signal 405P.

The word actuator is used herein in the context of the discipline of automatic control. Therefore, the action of the actuator may be mechanical in nature, as is the case for a piezoelectric actuator which affects movement and thereby spatially relocates an object such as the probe or the sample. Indeed, the AFM's controlling actuators frequently consist of one or more piezoelectric elements the collective action of which is intended to reposition the probe or the sample in real-time or near real-time so as to adjust the probe-sample distance, thus rendering the desired result of reducing, ideally to zero, the said error signal. The AFM image based on this feedback output signal is usually referred to as the "topography image" or "height image", and is the most commonly captured, analyzed, and presented and published type of AFM image. The action of the actuator may also be non-mechanical; for example the actuator may change the strength or polarity of an applied electrical potential difference or voltage; or the actuator may change a single frequency or multiple component frequencies or the amplitude or the phase of the AFM probe drive signal; or the actuator may adjust the AFM control parameters including the setpoint signal and any one or more of proportional gain, integral gain, or differential gain. Actuators may control probe and/or sample positioning, and they may also control signals and control parameters. When the latter is the case, then the actuator is not necessarily a positioning device such as a piezoelectric element; rather, it may be one or more electrical elements the combined actions of which bring about a change, for example, in a control parameter such as a gain or a setpoint, or for example in a probe drive signal parameter such as amplitude or phase or frequency.

Conventional oscillating probe mode AFM includes Amplitude Modulation AFM (AM-AFM) which includes tapping mode AFM and multi-frequency AFM, which are in-part illustrated in FIG. 1.

Amplitude Modulation AFM

In amplitude modulation AFM, the feedback input signal measures the RMS (root means squared) amplitude of the probe response signal. Such a signal is denoted as 959P in the illustration in FIG. 1. Using as the feedback input signal the RMS amplitude of the probe response signal and spatially actuating either the probe or the sample towards or away from the other (modulating the distance "D" in FIG. 1) along the z-axis in order to minimize, ideally to zero, the error signal 405P, i.e., the difference between the setpoint signal 375P and the feedback input signal 959P, is the most common type of amplitude modulation AFM (AM-AFM), and illustrated in-part in FIG. 1.

The most commercially successful AFM, tapping mode AFM (e.g., as described in "Tapping Atomic Force Microscope", U.S. Pat. No. 5,412,980), is an AM-AFM mode. The early and continued success of tapping mode AFM in part led first to the development of other single-frequency AM- AFM modes such as magnetically-actuated probe AFM (U.S. Pat. No. 5,753,814) and more recently to multi-frequency amplitude modulation AFM (commonly called multi-frequency AFM). In multi-frequency AFM, the RMS amplitude feedback input signal 959P may be measured of probe oscillations at select drive frequencies including but also other than the probe's fundamental transverse oscillation resonance frequency (usually called the first eigenfrequency), for example by including one or more lock-in amplifiers in the detector.

Today, however, a technology shift is under way to move away from or to improve upon AM-AFM. Important reasons for this shift are that, 1) as a consequence of tip-sample interaction, probe oscillations often depart from the linear regime, but these important departures are usually relatively small contributors to the probe response signal, which is dominated by oscillations at frequencies (a single frequency or multiple frequencies) driven directly by the probe drive signal; and 2) the departures from linearity frequently occur earlier than substantial relative changes in the probe response signal. Therefore, probe oscillations whole or probe oscillations at frequencies driven directly by the probe drive signal are relatively insensitive to and frequently late in detecting these departures. Consequently, using as the feedback input signal the RMS amplitude of the whole of the detected probe oscillations or of oscillations (possibly at select frequencies) driven directly by the probe drive signal takes into account this non-linearity disproportionately to its significance, and by extension takes into account the source of the nonlinearity, the tip-sample interaction, disproportionately to its significance. Nearly always, the most important operational objective of any AFM is to control the tip-sample interaction. Tip-sample interaction control in AM-AFM, including tapping mode AFM and multi-frequency AFM, limits the fidelity of the images and data produced on a wide range of sample types. Included in these sample types are soft samples, notably many biological samples and soft polymer samples the AM-AFM studies directed to each of which has been a driving force behind the growth of AFM use worldwide so far.

The inadequacies of tip-sample interaction control in AM-AFM are major impediments to further advancement and growth of AFM use and applications in general, because AM-AFM, exemplified by tapping mode AFM and multi-frequency AFM, is still by far the most widespread AFM mode commercially available and in-use everywhere.

Shortcomings of AM-AFM

During raster scanning in AM-AFM, for example in tapping mode AFM and in multifrequency AFM, whenever the probe's sensing tip encounters an increase in sample height, the probe's oscillatory movement is restricted and the amplitude of oscillation and therefore the measured RMS amplitude decrease (e.g., signal 959P decreases). Hereafter, an increase in sample height encountered by the tip is referred to as an up-slope whether it is a gradual increase, a steep increase, or an abrupt increase, i.e., an up-step. Whenever the probe tip encounters a decrease in sample height, gradually or abruptly, the oscillations are less restricted and the RMS amplitude increases (e.g., signal 959P increases). Hereafter, a decrease in sample height encountered by the tip is referred to as a down-slope whether it is a gradual decrease, a steep decrease, or an abrupt decrease; i.e., a down-step. Furthermore, an intrinsically gentle slope, up or down, is effectively encountered by the probe as a steeper slope when the speed of raster scanning (or scan speed) is faster; this point is key to understanding some shortcomings of AM-AFM as will be described herein.

Numerous factors other than the size of the height change encountered by the probe tip and the scan speed affect the change in RMS amplitude in general, that is, on both up-slopes and down-slopes, as well as on relatively flat areas, where height changes are minimal. These factors include but are not limited to the stiffness of the sample and of the probe, and the adhesive, viscoelastic, electric, and magnetic interactions between the sensing tip and the sample. They also include the interaction between the probe tip sidewalls and the sample surface when the probe encounters a surface feature as steep as or steeper than the probe tip sidewalls.

Implicit in interpreting AM-AFM images as topography maps are several assumptions that pertain to down-slopes. One key assumption is that the RMS amplitude increase is proportional to the decrease in sample height. This assumption is generally though not always valid so long as the probe tip does not lose intermittent contact with the sample surface as it scans across the down-slope. Requiring that the probe tip does not lose intermittent contact with the sample surface in turn places an upper limit on the scanning speed in AM-AFM as will be described in detail below.

Furthermore, approximately half of the surface features the probe tip encounters during raster-scanning are down-slopes, half up-slopes. This is because during each and every round trip cycle in raster-scanning, an up-slope during one half of the cycle is usually a down-slope during the subsequent half. This description becomes more accurate as consecutive cycles scan the sample surface more closely to each other; in other words, as the raster scanning covers the scan area with more densely-spaced scan lines (which leads to higher image pixel resolution).

Therefore, approximately half the time the said down-slope scan speed limitation is present (this limitation will be discussed in detail later). Since with rare exceptions the location of a downslope is unknown in advance of the tip encountering it, effectively the speed limitation described here is present nearly one hundred percent of the time during raster scanning in most cases. This is true regardless of sample composition and detail, and regardless of scan area size (image size). This is why this particular speed limitation is a most acute and pervasive problem in search of robust, universally applicable solutions.

Partial solutions to this speed limitation for some targeted applications have been proposed and/or implemented, but the universal nature of this limitation and its continued drag on wider proliferation and use of AFM continuously inspire new solutions; the problem is so pervasive that it has acquired its own well-known name: "parachuting". In the light of the importance of this speed limitation, the nature and root cause of this imitation will be described in some detail next.

Parachuting, Attendant Speed Limitation, and Small Setpoint Solution

When the oscillating probe's sensing tip encounters a down-slope, the probe is free to oscillate with larger amplitude because the sample surface is less of an obstacle or no obstacle at all to the probe oscillation. In AM-AFM, which uses RMS amplitude of probe oscillations whole or of probe oscillations at frequencies driven directly by the probe drive signal (e.g., 959P in FIG. 1) as feedback input signal, the increase in the RMS amplitude is detected and feedback actuation approaches the probe towards the sample or the sample towards the probe both cases of which are intended to restore the RMS amplitude of probe oscillation such that it remains equal or close to the setpoint signal 375P, thus keeping the error signal 405P at or as close to zero as possible; when this is done successfully, the probe tip is said to track the sample surface.

Scanning across a down-slope at sufficiently fast scan speeds, or at any scan speed but across steep enough down-slopes, or at RMS setpoint values close to the free RMS, which is the value of the RMS amplitude when the probe is far from the sample surface, the sensing tip often loses intermittent contact with the sample surface during several consecutive oscillation cycles; the sensing tip does not reach the sample surface because, as the probe is scanned along the down-slope, even with the action of the feedback (z-) actuator 700P taken into account, the separation at the bottom of each oscillation cycle (i.e., at the point of closest approach) between the probe tip and the sample surface increases faster than do the amplitude and the RMS amplitude of probe oscillations whole and of probe oscillations at frequencies driven directly by the probe drive signal; the feedback input signal 959P fails to increase fast enough to faithfully reflect the increased separation between the probe tip and the sample surface. If this failure continues, eventually the RMS amplitude grows to its maximum value, the free RMS, and the error signal 405P is said to be saturated.

As a consequence of this failure (with or without the error signal saturated), the error signal 405P, and ultimately the feedback output signal 1089P no longer accurately represent changes of sample topography. The probe no longer tracks the sample surface. This is parachuting, illustrated in FIG. 2A. Parachuting is a common problem in AM-AFM, for example in tapping mode and in multi-frequency AFM, and afflicts imaging applications of AFM across the board; it does not depend on sample type; and it happens in gaseous and liquid environments as well as in vacuum.

Three points deserve attention in regards to parachuting: 1) Parachuting arises not only when the probe tip encounters a genuinely steep down-slope, but also when the scanning speed is fast enough so that even a gentle down-slope effectively becomes a steep down-slope. Herein lays a key connection to the aforementioned parachuting-related scan speed limitation of AM-AFM, not only in scanning ragged and highly irregular surfaces, but also in scanning smooth surfaces largely devoid of sharp discontinuities. Therefore, the phrase "steep down-slope" is to be understood in this context: a slope that is either in reality steep or a slope that may not be steep, but effectively becomes steep when the scan speed is fast enough. Furthermore, "fast enough" is not necessarily fast at all. Parachuting is often a problem when operating an AM-AFM at scan speeds as low as 1 micrometer a second. 2) The closer is the RMS amplitude setpoint signal 375P to the free RMS amplitude, i.e., the RMS amplitude when the tip and sample are far apart, the more likely is parachuting. In other words, for a given free RMS amplitude, the larger is the setpoint signal 375P value in AM-AFM, the more likely is parachuting. 3) On the other hand, in general, for a given free RMS amplitude, a larger setpoint signal 375P value means a relatively gentler tip-sample intermittent contact in AM-AFM (lighter tapping), and this is frequently desirable as sample damage and/or tip deformation is less likely with gentler tip-sample intermittent contact.

One approach to limit or avoid parachuting in AM-AFM is to set the setpoint signal 375P value small. The resulting stronger intermittent contact forces (harder tapping) are detrimental to many samples, notably softer samples including many biological samples and many polymer samples. If sample deformation under the harder tapping tip is not permanent because of the sample's elasticity, then the image data is misrepresentative of the sample surface height. If the sample is harder than the tip, then the detriment is to the tip which becomes dull with harder tapping and image resolution suffers. This brute-force approach (reducing the setpoint signal value and thereby increasing tapping force) to limit or eliminate parachuting is even more detrimental to the sample surface (or to the tip) when used in combination with fast scanning speeds. Unfortunately, this combination, lower setpoint and faster scanning speed, is frequently used especially by users insufficiently familiar with the ways in which tip-sample interaction control is affected by the interrelations between setpoint value, scanning speed, feedback gains, and other control parameters in AM-AFM.

Probe Q and Parachuting

The duration of parachuting is determined by several factors. These include scan speed, feedback gains, RMS setpoint, free RMS value, and of course the inherent steepness of the down-slope (which by our definition includes the height of a down-step). Excluding the inherent steepness of the down-slope, many of these factors are subject to human operator control.

For a given set of human-operator-controlled parameters, during parachuting, when intermittent contact between the sensing tip and the sample is lost, the speed at which the probe oscillation amplitude and therefore RMS amplitude of probe oscillations whole and of probe oscillations at frequencies driven directly by the probe response signal grow is determined in part by the quality factor, Q, of the resonance(s) at or near to whose frequency or frequencies the AM-AFM probe is driven by the probe drive signal. The higher the Q, the slower is the amplitude build-up, and the longer is the time during which the sensing tip fails to reach the sample surface at the bottom of successive oscillation cycles before it finally succeeds. In other words, the higher is the Q, the longer is the duration of parachuting. During parachuting in AM-AFM, the RMS amplitude of probe oscillation whole or of probe oscillations at frequencies driven directly by the probe drive signal (e.g., 959P) grows too slowly to maintain intermittent tip-sample contact even as the distance "D" in FIG. 1 between the sample stage 800P and the probe base 2P is decreased with AM-AFM's z-actuator 700P feedback action. The RMS amplitude 959P of the probe response signal 59P and therefore the error signal 405P of the feedback loop fail to accurately and in a timely fashion reflect the change of sample height passing under the scanning probe's tip as raster-scanning proceeds. If the RMS amplitude setpoint signal 375P value is close to the value of free RMS amplitude, the error signal 405P saturates at its maximum value and exacerbates this problem, leading in turn to even longer parachuting times.

As a result, the output of the feedback loop which is ultimately the actuation of the probe towards the sample (or the sample towards the probe) also fails to represent the change of sample height (or topography). (We recall that the height or topography image is built pixel by pixel on the output of the feedback loop, i.e., on 1089P). The portions of an image constructed from the feedback output signal during the times when the probe parachutes down to the sample surface, rather than track the sample surface with intermittent contact, appear as smooth, gradual slopes; these portions of the image are entirely artifact.

Conventional Approaches to Parachuting and Down-slope Speed Limitation

Besides using smaller RMS amplitude setpoint, one way to address the problem of parachuting is to use AFM probes that have higher eigenfrequencies or resonant frequencies, including the lowest eigenfrequency. For a given value of the Q, if the probe oscillation frequency (at or near the corresponding resonance) is higher, then the amplitude builds up faster, alleviating the described down-slope speed limitation. As far back as 1996, this approach has been applied, mainly for imaging biological samples, and frequently in a liquid environment ("Short cantilevers for atomic force microscopy"; D. A. Walters1, J. P. Cleveland1, N. H. Thomson1, P. K. Hansma1, M. A. Wendman2, G. Gurley2 and V. Elings; Rev. Sci. Instrum. 67, 3583 (1996)). Probes with frequencies in the mega Hertz (MHz) range have been introduced. This approach has been successful in some applications. For example, extremely smooth biological surfaces with feature heights only in nanometers have been successfully imaged in liquid very fast. One limitation here is the requirement that the sample surface be smooth (T. Uchihashi and T. Ando, "Atomic Force Microscopy in Biomedical Research", Methods in Molecular Biology Volume 736, pp 285-300, 2011). Another limitation of this approach appears to be that the sample be imaged in liquid.

Regardless of applications, and notwithstanding its success where it has been documented, some limitations of this approach are 1) the required cantilever probes tend to be difficult to use because of their unusually small size even by micro-fabrication standards applicable to AFM probes; 2) optical and mechanical engineering and components required to implement the monitoring of smaller cantilever's movement are demanding, adding to system complexity and cost (see, e.g., T. Uchihashi and T. Ando, "Atomic Force Microscopy in Biomedical Research", Methods in Molecular Biology Volume 736, pp 285-300, 2011; and J. D. Adams et al., "High-speed imaging upgrade for a standard sample scanning atomic force microscope using small cantilevers", Review of Scientific Instruments, volume 85, 093702, 2014"); and 3) larger cantilevers of this type (high frequency) tend to be quite stiff, lacking the required force sensitivity to be used to probe soft samples; therefore they damage soft samples.

Another solution to the parachuting problem is to engineer a Q-control routine so as to intentionally reduce the effective Q of the AFM probe, thereby alleviating parachuting and the associated scan speed limitation on downslopes. When the effective Q is reduced, oscillation amplitude builds up faster on a down-slope, and tip-sample intermittent contact is re-established sooner. ("High-speed tapping mode imaging with active Q control for atomic force microscopy", T. Sulchek, et. al, Applied Physics Letters Volume 76, Number 11, 13; March 2000, pp. 1473-1475.) This has been done with even less success than the higher-frequency cantilever approach. The proof of the limitation of this approach is best evident in the fact that beyond a single exception (measuring laser zone textured (LZT) magnetic hard drives sometime in the early 2000's) the technique did not and has not achieved any measurable success in the marketplace to address the down-slope speed limitation on any type of sample; it has not been widely adopted as a solution to this speed limitation despite the fact that the speed limitation it had intended to address is universal, as described earlier.

False Engages in AM-AFM

AM-AFM uses the RMS amplitude 959P of the probe response signal 59P as the input signal to the feedback scheme; this quantity gradually decreases when the AFM probe approaches the sample surface during a pre-engage sequence including the initial approach prior to initial engage. This decrease is mainly due to the additional fluid-dynamic damping of the probe by some of the fluid which engulfs the probe becoming partially trapped between the body of the oscillating probe and the sample surface during approach. Probe oscillations are always damped by the fluid in which the probe oscillates, but when the probe-sample distance becomes comparable to the smaller of the probe's two planar dimensions (e.g., the width of a cantilever probe), the damping becomes stronger, and in some cases an additional spring-like effect also appears which makes the probe effectively stiffer than it actually is. These phenomena are collectively called squeeze-film effect and are frequently relevant to AFM operation in an oscillating probe mode. ("Air-Damping of AFM Micro-Cantilevers in the Presence of a Nearby Surface," F M Serry, P Neuzil, R Vilasuso, and G J Maclay in Proceedings of The 188th Electrochemical Society National Symposium, Chicago, Ill., 1995.)

During the final stages of an approach, the reduction of the RMS amplitude as a consequence of squeeze-film damping frequently results in "false-engage" events. The AM-AFM feedback scheme treats the squeeze-film damping-induced reduction of the RMS amplitude as if it were due to tip-sample intermittent contact, (which is false); the AFM false-engages, and starts raster scanning and producing an image which is comprised totally of artifact. A solution to the problem of false-engage in AM-AFM was developed early on by the developers of tapping mode AFM. In this scheme, in summary, when the RMS amplitude drops, the feedback scheme halts the approach, then reduces the setpoint incrementally. If the feedback output adjusts incrementally, then the engage is deemed to be real and raster scanning commences. If on the other hand the feedback output adjusts largely, then the engage is aborted (it is false); the approach continues. In the art, the scheme is referred to as "sewing", because with each iteration, except possibly the last, there is also a pull-back of the actuator; but the basic scheme is as described. Sewing largely reduces incidents of false engage, especially in gaseous environments. The price the user pays for this solution is a long wait time during the approach. It is common to have a sewing engage sequence of 5-7 minutes; a 3-minute wait is very common. Given that frequently when a user wants to examine different locations on the sample surface (s)he has to engage, withdraw, and re-engage the probe several times in an hour, the cumulative waiting time is often painfully long, but absent a robust solution, this waiting time is accepted as a necessary nuisance to deal with false engages.

In liquids, however, sewing sometimes does not work. Sometimes a sewing step never completes; the feedback scheme is suspended without any action as the implementation of the sewing algorithm fails to resolve one way or another: real engage, or false engage. Much of this is due to the complicated ways in which the laser light which is to probe the movement of the cantilever alters its trajectory and intensity as it traverses across several media: air, liquid, possibly air bubbles in the liquid, and the glass or clear polymer (sometimes including optical coatings) that makes up the AFM fluid cell (also called the liquid cell). In these cases, the operator is forced to manually make some type of adjustment, either in hardware or in software or in both. The adjustments sometimes include completely disassembling and re-assembling the fluid cell, which is very time-consuming, and requires both patience and dexterity. In short, sewing can and too often does fail when operating AM-AFM with a fluid cell.

False engages can also occur when a sample's surface is highly reflective of light. In these situations, various optical effects that involve a laser light beam such as used in an optical detection scheme trigger a false engage with and/or without the use of a fluid cell.

To summarize: with recent advances in theoretical and computational science of oscillating probe mode AFM including AM-AFM and with growing body of experimental verifications, change of the RMS amplitude of probe oscillations at frequencies driven directly by the probe drive signal as reflected in the change of the RMS amplitude of the probe response signal is frequently no longer considered a reliable enough indicator of the change in the interaction between the probe tip and the sample surface on many sample types. For example, parachuting and the resulting scanning speed limitation, lack of acceptable image fidelity, and false engages may result in inadequate, inaccurate, and/or time consuming AFM measurements. For many years AM-AFM, exemplified mainly by tapping mode AFM, which uses RMS amplitude of the probe response signal as feedback input signal, has been a driving force behind the growth of AFM and its application space. If, in conventional AFM including AM-AFM including tapping mode AFM, the speed limitations (including during approach and during raster scanning), inadequate tip-sample interaction control, and the attendant compromised image fidelity were addressed robustly and applicably to a wide range of samples, then the adoption of AFM as a desirable surface metrology and analysis instrument across industries and applications would very likely have proceeded even faster than it has been and that it is going to be with these problems lingering.

SUMMARY

Harmonic feedback atomic force microscopy (HF-AFM) includes regulating feedback in oscillating probe atomic force microscopy (AFM) based upon an extracted frequency component of a probe response signal. Feedback in conventional oscillating probe AFM uses the probe response signal as a whole (or at least a driven frequency component of the probe response signal). The extracted frequency component of HF-AFM generally is (but is not required to be) a harmonic of a driven frequency.

Methods of HF-AFM include driving an AFM probe in an oscillatory motion, detecting the oscillatory motion (to produce the probe response signal), extracting an extracted frequency component from the probe response signal, and regulating the average distance between the sensing tip of the AFM probe and a sample surface according to a contribution due to the extracted frequency component. For example, the regulating may include responding to the strength or weakness of the extracted frequency component such that weakening of the extracted frequency component contributes positively to a decrease in the average tip-sample distance and contributes negatively to an increase in the average tip-sample distance. Similarly, the regulating may include regulating such that strengthening of the extracted frequency component contributes positively to an increase in the average tip-sample distance and contributes negatively to a decrease in the average tip-sample distance.

The extracted frequency of the extracted frequency component may be a frequency that is not substantially driven. For example, the oscillatory motion of the AFM probe may be driven by a probe drive signal that includes one or more prominent frequencies and the extracted frequency may be different than the prominent frequencies in the probe drive signal. The interaction of the sensing tip of the AFM probe and the sample surface may generate the extracted frequency component according to the character of the interaction.

In some embodiments, the regulating includes approaching the sample surface and detecting the contact of the sample surface based upon the strength of the extracted frequency component increasing above a threshold value. In some embodiments, the regulating is based upon the extracted frequency component and the probe response signal. In such embodiments, the regulating of the average distance between the sensing tip and the sample surface is according to a contribution due to the extracted frequency component and an opposing contribution due to the probe response signal.

BRIEF DESCRIPTION OF THE DRAWINGS

FIG. 2B is experimental result that show parachuting in tapping mode AFM

FIG. 2C is experimental result showing suppression of parachuting in accordance with the present disclosure.

DESCRIPTION

Figure 1:
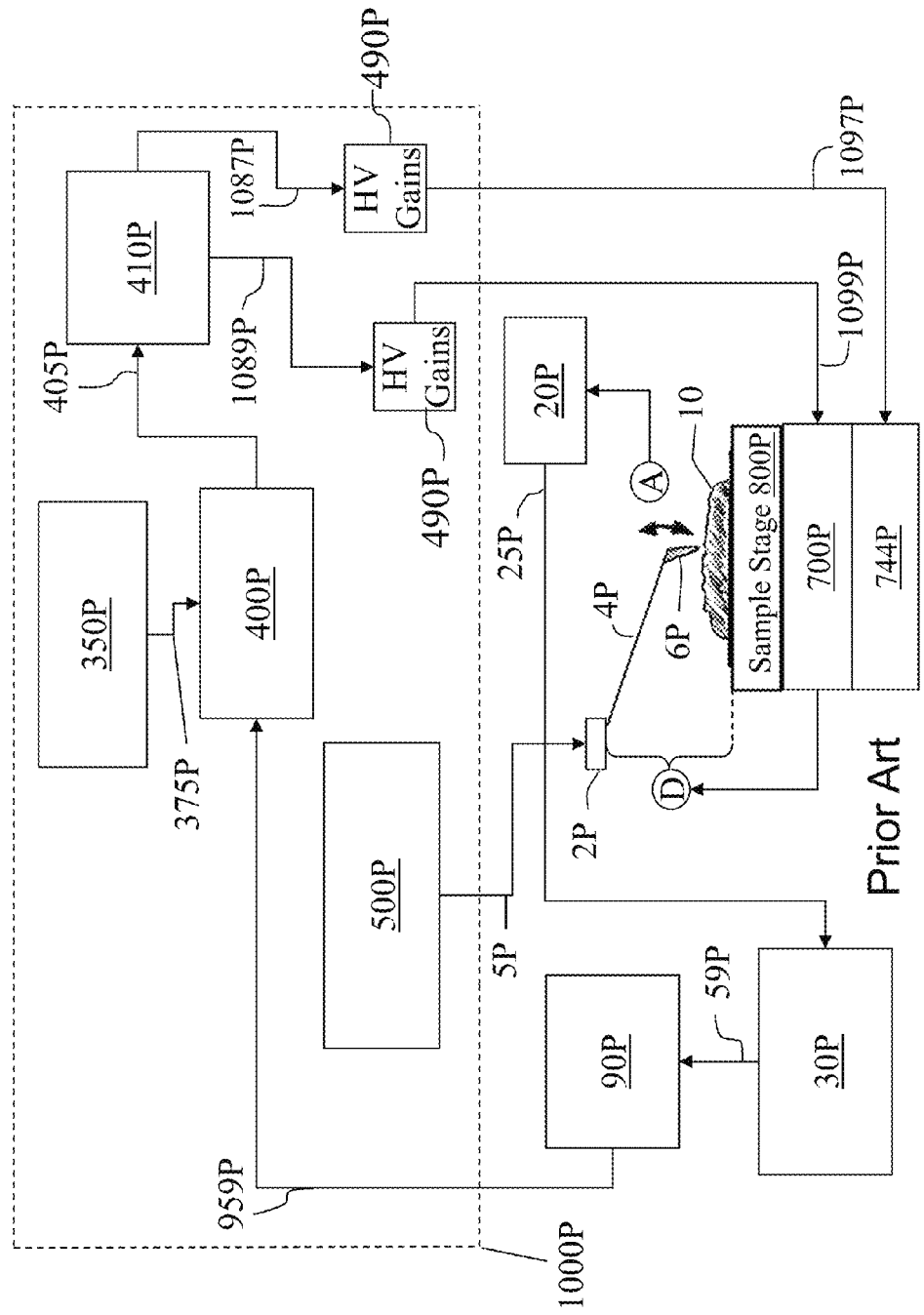
FIG. 1 is a simplified block diagram illustrating prior art AM-AFM and tapping mode AFM.

Improvements include selectively manipulating and making more relevant than they are in AM-AFM (including tapping mode AFM and multi-frequency AFM) to the AFM feedback control scheme probe oscillation harmonics, as defined below, via harmonic components of the probe response signal, for example the harmonics whose frequencies are the sixth multiple, and/or the twelfth multiple, and/or the eighteenth multiple of a frequency or of a prominent frequency or of a dominant frequency in the frequency spectrum of the probe drive signal that elicits said probe response signal in the first place.

Systems and methods of the present disclosure may selectively extract one or more extracted frequency components (which may be harmonic components as discussed further herein) of AFM probe oscillations and may selectively amplify one or more of said extracted frequency components and optionally selectively combine or combine measures of energy of two or more of said extracted and/or amplified extracted frequency components, optionally with probe oscillations or with a measure of the energy of probe oscillations, and optionally re-combine or re-combine measures of energy of said extracted and/or amplified extracted frequency components with said combinations and/or with probe oscillations whole or with a measure of the energy of probe oscillations, all of which combinations may involve linear and non-linear mathematical operations, for example inversion, delay, addition, multiplication, division, logarithmic transformation, exponential transformation, and power-law transformation. In doing so, select frequency components may in customized fashions be made selectively strongly relevant to a feedback control scheme in an oscillating probe mode AFM in order to enhance control of tip-sample interaction and thereby may at least achieve at least one of the following improvements over conventional AFM, including AM-AFM: 1) improve AFM image clarity and/or AFM image fidelity and/or AFM image resolution; 2) reduce the chance of sample damage and/or unwanted tip modification including tip damage; 3) reduce parachuting and the associated artifact in AFM images and data; 4) alleviate a scan speed limitation associated with parachuting; 5) reduce incidences of false engage during pre-engage approach and reduce the lost time and other resources wasted on addressing false engages. Though examples generally discuss harmonics and harmonic components, the examples are applicable to extracted frequencies and extracted frequency components as well as harmonics and harmonic components, unless the context clearly indicates otherwise.

Accordingly, embodiments of the disclosure implement oscillating probe mode atomic force microscopy (AFM) such that the input, the output, and the operation of a feedback loop in AFM in real-time or near-real-time are in part or in whole controlled by a signal or a multiplicity of signals synthesized and manipulated to be in customized fashions indicative substantially or mainly or nearly exclusively or exclusively of the presence, absence, and strength of at least one select harmonic, to be defined below, and possibly of a multiplicity of select harmonics of probe oscillations, which probe oscillations may be at one frequency or a multiplicity of frequencies deliberately selected to be made present in the frequency spectrum of a probe drive signal which elicits the said probe oscillations and which does not directly substantially drive said harmonics, which harmonics are rather driven mainly by the tip-sample intermittent contact as defined in this document.

Use of the harmonics-based systems and methods of the present disclosure may realize the above stated benefits in-part because in general, when harmonics are not driven directly substantially by the probe drive signal, changes in the harmonics of probe oscillations may carry information about changes to the tip-sample interaction more exclusively and more promptly than do changes in probe oscillations as a whole or at frequencies driven directly substantially by the probe drive signal. This fact germinates from the fundamental difference between the way in which probe drive signal-driven probe oscillations (and probe oscillations whole) are excited on the one hand, and the way in which harmonics of probe oscillations not driven directly substantially by the probe drive signal are excited on the other hand. When probe oscillations whole, driven by a probe drive signal, are kept small enough, harmonics of probe oscillations, although smaller than probe oscillations whole, are mainly or nearly exclusively driven by and modulated with changes in intermittent tip-sample contact when such contact is present. This fundamental difference makes the harmonics not directly substantially driven by the probe drive signal, as compared with probe oscillations whole and as compared with probe oscillations at frequencies directly substantially driven by the probe drive signal, more sensitive to and therefore potentially more useful for detecting changes, including initiation and loss, of tip-sample intermittent contact and interaction, often relatively more strongly and more promptly than these can be detected using probe oscillations whole or probe oscillations at frequencies driven directly substantially by the probe drive signal.

Figure 2A:
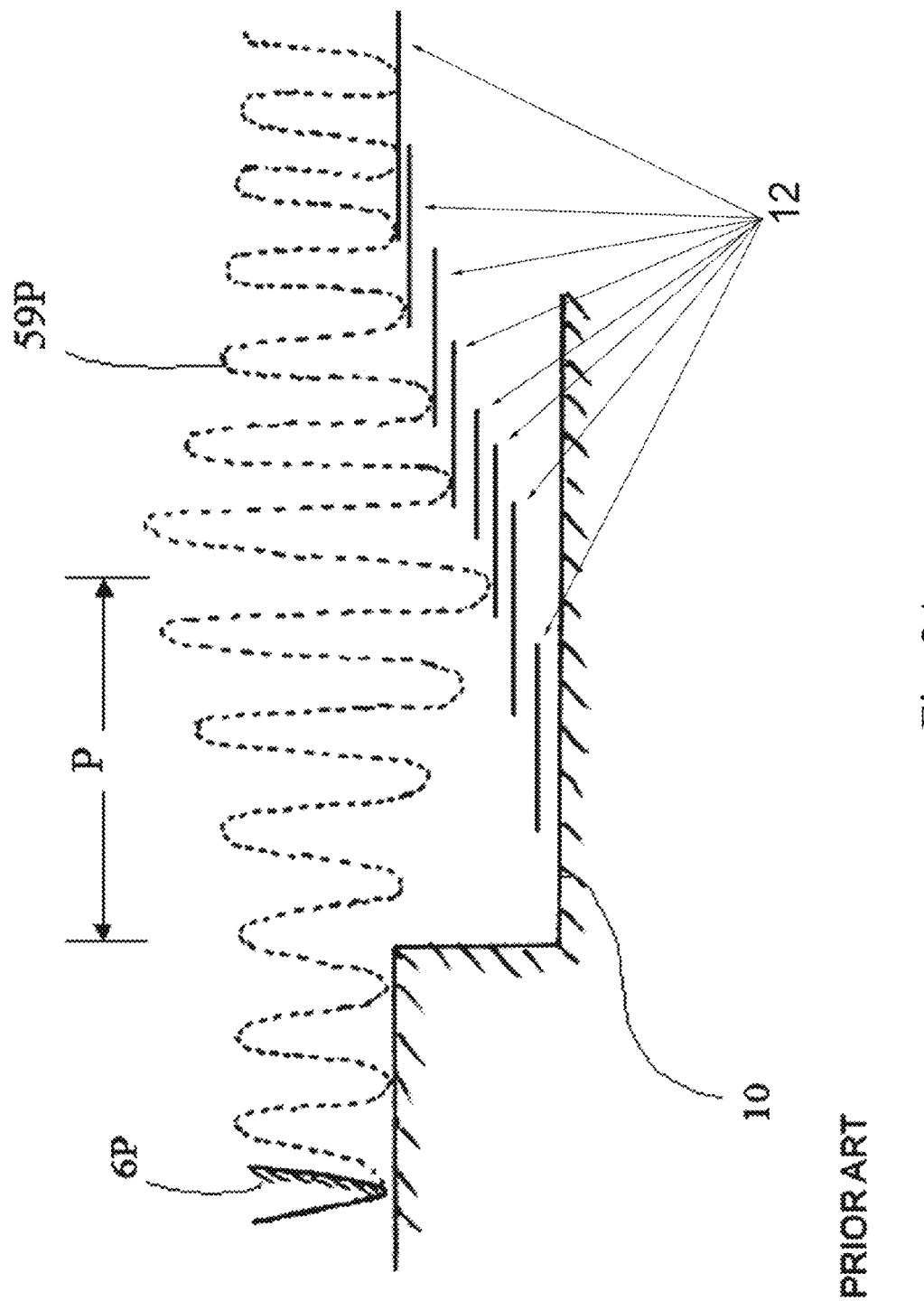
FIG. 2A is a drawing illustrating parachuting.

Systems and methods of the present disclosure address shortcomings of conventional AFM including the shortcoming of parachuting in AM-AFM. Systems and methods according to the present disclosure may alleviate parachuting, regardless of sample composition and detail, without resort to large intermittent contact forces via large reduction of oscillation amplitudes. FIGS. 2B and 2C illustrate a comparison between conventional tapping mode AFM (currently the most widely used oscillating probe mode AFM) and an embodiment of the present disclosure. FIG. 2B illustrates the detrimental effect of parachuting in conventional tapping mode AFM. FIG. 2C shows substantial elimination of parachuting and was produced with an embodiment of the systems and methods of the present disclosure which will be described in detail below. The same probe, detector, and actuators were used to capture both plots at the same location on the same sample. FIG. 2B shows parachuting that happens during tapping mode AFM. The fine structure of the 200 nm tall step (multiple steps, including a small one near the top) which is visible in FIG. 2C when parachuting is alleviated using the said embodiment of the present disclosure are missing in FIG. 2B. These steps are also present during the tapping mode operation which produced FIG. 2B, but are not detected in tapping mode AFM data because of parachuting. Furthermore, these steps may also be imaged and revealed with tapping mode AFM, but at the price either of 1) tapping the sample surface harder thereby risking sample and/or tip deformation and damage, and/or 2) scanning slower thereby taking longer to obtain the results, and/or 3) increasing feedback gains which may cause unwanted feedback oscillations and distort the data and possibly damage the sample and/or the tip. In FIG. 2C, the tip tracks the sample surface across the scan line (right to left) and reveals the fine structure that makes up the multiple down-steps. In FIG. 2B the tip loses intermittent contact with the sample surface when traversing the multiple down-steps (right to left); it parachutes down the steps, and the resulting data fails to show the fine structure of the steps. All feedback operating parameters that could be kept identical while capturing the two data (FIGS. 2B and 2C) were kept identical; these included scan speed, feedback gains, amplitude and frequency and phase of the probe drive signal, and the approximate value of the RMS amplitudes of the probe response signals 59P and 59. These considerations and their significance will become clearer in the subsequent sections.

In a similar but separate experiment, the duration of parachuting across a 65 nm-tall down-step was compared using conventional AFM (tapping mode AFM) and an embodiment of the present disclosure. Parachuting across this step lasted approximately 33 ms with tapping mode AFM, and about 13 ms with the embodiment of the present disclosure. The same probe, detector, and actuators were used for conventional AFM and the systems and methods of the present disclosure. All feedback operating parameters that could be kept identical were kept identical; these included scan speed, feedback gains, amplitude and frequency and phase of the probe drive signal, and the approximate value of the measured RMS amplitudes of the probe response signals. These considerations and their significance will become clearer in the subsequent sections.

The descriptions below are generally applicable to digital and analog and mixed-signal implementations unless otherwise noted even though at times an analog version or a digital version or a mixed-signal version of a stage or a component is described or emphasized. Furthermore, digital stages may be implemented in traditional digital signal processing (DSP) hardware and/or in coarse-grained and/or fine-grained reconfigurable hardware, including programmable logic array (PLA) and field programmable gate arrays (FPGA).

Embodiments of the present disclosure are not limited to work with probes that have the cantilever beam geometry; any combination of any probe shape and any detector type that can detect harmonic oscillations as defined below and described throughout this document may be used to implement embodiments of the present disclosure.

Figure 3:
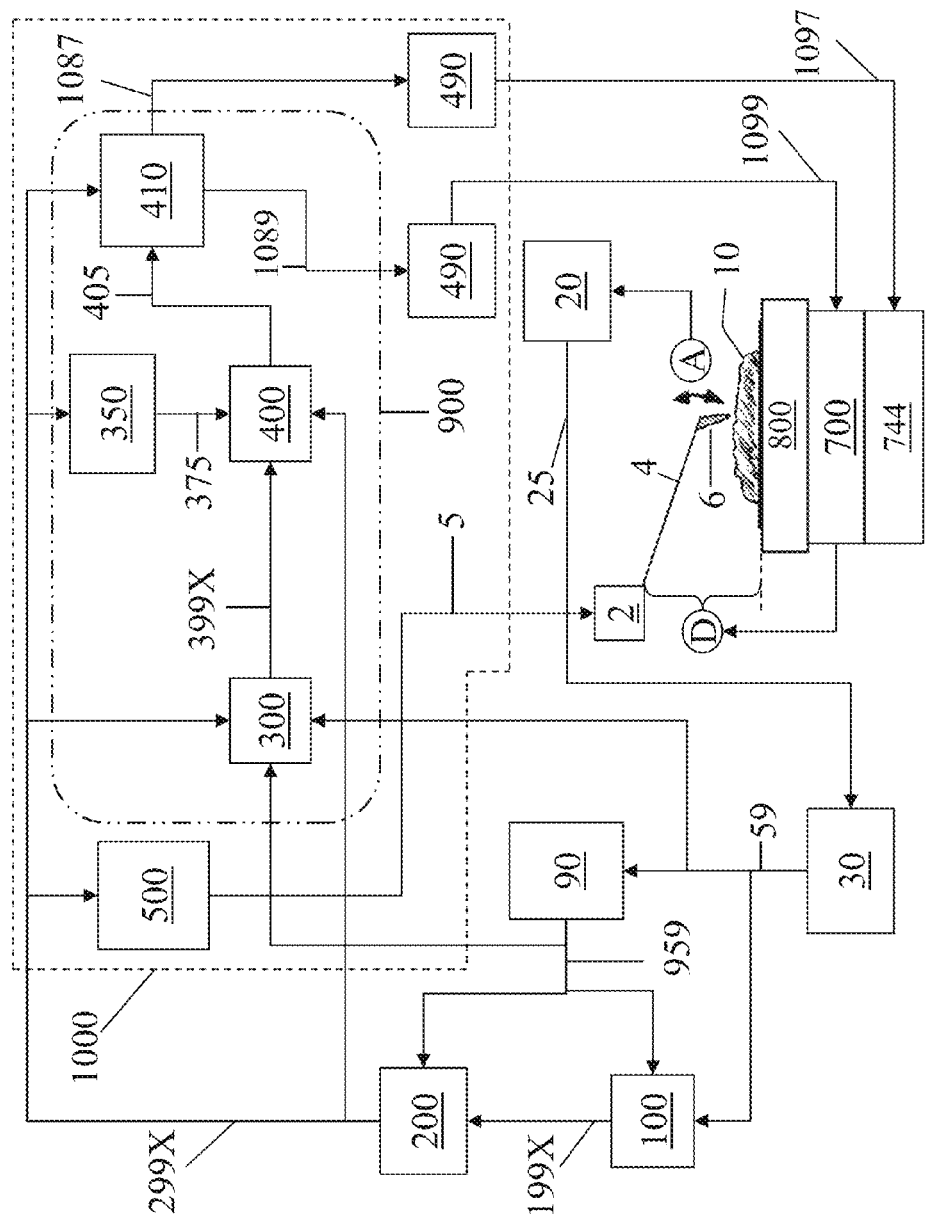
FIG. 3 is a simplified block diagram showing the major components and their relationship to each other and to the sample in accordance with the present disclosure.

FIG. 3 is a simplified top-level diagram of an embodiment of the disclosed system as it would be used to image a sample 10 or to perform force spectroscopy on the sample 10 or to otherwise analyze the sample 10 which rests on a sample stage 800. In this figure, the z-axis is along the indicated distance "D" between the sample stage 800 and the probe base 2; and the implied xy plane is perpendicular to the z-axis. The figure illustrates a probe 4 interacting at its sensing tip 6 with the sample 10 as a probe drive signal 5 drives the probe 4 into mechanical oscillations "A", which are detected by the detector 20, which in turn generates the detector signal 25, which is indicative of oscillations "A". In a feedback scheme to be detailed below, or in force spectroscopy, the distance "D" between the probe base 2 and the sample stage 800 is adjusted as a result of a movement which the z-actuator 700 generates (the z-actuator 700 may consist of a multiplicity of actuators); this movement may be imparted onto the probe base 2 and/or onto the sample stage 800. Though, for convenience, the distance "D" is shown and described generally as the distance between the probe base 2 and the sample stage 800, the distance "D" is directly related to the average distance between the sensing tip 6 and the surface of the sample 10. The average tip-sample distance (also called the tip-sample separation) is also essentially the resting tip-sample distance if the tip is not oscillating. A reference to regulating, changing, and/or controlling the distance "D" is also a reference to regulating, changing, and/or controlling the average tip-sample distance.

In systems and methods of the present disclosure, either the sample stage 800 or the probe base 2 may be attached more immediately to the z-actuator 700, and the other may be attached to the z-actuator 700 across a longer mechanical path that includes other parts of the AFM. In FIG. 3, for example, the sample stage 800 is attached more immediately to the z-actuator 700. Similarly, an actuator or a collection of actuators 744 is used to implement raster scanning (and planar or xy positioning) of the sample stage 800 relative to the probe 4 or of the probe 4 relative to the sample stage 800. These two implementations of raster scanning corresponds to two generally-recognized in the art realizations of AFM's, including embodiments of the present disclosure; one realization is usually called sample-scanning; the other, tip-scanning (or probe-scanning). FIG. 3 illustrates a sample-scanning realization in which the actuator 744 herein called the xy-actuator raster scans the sample stage 800, but embodiments of the present disclosure are not limited to the sample-scanning realization; they include both probe-scanning realizations and sample-scanning realizations. Furthermore, it is possible to have a sample scanning or a probe scanning embodiment of the present disclosure in which the z-actuator 700 is integrated with the xy-actuator 744 resulting for example in a tube scanner comprising several different segments tasked with implementing both z feedback actuation and force spectroscopy approach-retract cycles using the z-actuator 700 portion and raster scanning and xy positioning using the xy-actuator 744 portion.

Embodiments of the present disclosure are also possible in which the z-actuator 700 and the xy-actuator 744 are physically separated rather than integrated into one object. In such embodiments, the z-actuator 700 may be connected more immediately to the probe 4, and the xy-actuator 744 more immediately to the sample stage 800; or vice-versa: the z-actuator may be connected more immediately to the sample stage 800, and the xy-actuator 744 more immediately to the probe 4. At least one advantage of such embodiments is that the masses of the different actuators are no longer added together such as they would be in a single object such as a typical AFM tube scanner, and therefore the actuators may be more agile in their response to applied actuation drive signals 1097 (xy) and 1099 (z) without the actuators going into unwanted resonance oscillations that may limit scanning speed and feedback speed. Actuation drive signals 1097 (xy) and 1099 (z) are driven by the corresponding HV Gains 490 and the respective control unit 410 output signals 1087 (xy) and 1089 (z).

Therefore, FIG. 3 is not meant to limit the way in which the various elements depicted in the figure are to be positioned relative to each other in order to represent embodiments of the present disclosure.

The probe 4 is driven into mechanical oscillation (i.e., oscillatory movement), which in the absence of tip-sample interaction generally are time periodic. These oscillations are indicated as "A" and the adjacent curved double-headed arrow in FIG. 3. This movement is usually induced by applying a signal called the probe drive signal 5 directly or indirectly to the said probe. The probe drive signal 5 may be produced and/or applied in a similar manner as the probe drive signal 5P (FIG. 1), but optionally subject to harmonics-enabled feedback control as described later.

The probe drive signal may be a superposition of multiple, substantially periodic signals of different waveforms including but not limited to sinusoidal waves; probe drive signals in embodiments of the present disclosure include but are not limited to sinusoidal waves, pulse waves (also called pulse trains), saw tooth waves, triangular waves, impulses, and superposition of such waves, each component in the superposition possibly having a different periodicity or frequency from each. This inventor has compared tapping mode AFM operation with the systems and methods of the present disclosure using several types of probe drive signals (square wave, triangular wave, impulse train, and pulse wave probe drive signals) in addition to single-frequency sinusoidal wave probe drive signal. The motivation for this experimentation was in-part to ascertain the utility, viz. the objectives, of the methods and components of various embodiments of the present disclosure when used with probe drive signals other than the single sinusoidal probe drive signal: Do the embodiments of the present disclosure prove adaptable to use with probe drive signals other than the single-frequency sinusoidal probe drive signal? In all cases tested, the various systems and methods, which make use of the harmonics, as defined below, to enable and/or implement control of the tip-sample interaction, proved successful to different degrees, attesting to generally affirmative answer to the question.

The function of the detector 20 is to detect the movement indicated by "A" of the probe 4 in FIG. 3, and generate from it a detector signal 25. The detector 20 may be of optical beam deflection type, or optical interferometric type, or strain gauge type, or piezoresistive type, or other types. For example, an optical beam deflection method involves a collimated laser light beam bouncing off a location on the back of the probe and subsequently projecting (entering) into a position sensitive photo-detector (PSPD), and is the most widely used method to detect AFM probe movement and generate probe response signal. Other detection schemes including ones than involve optical interferometry and mechanical strain-gauges have also been used. The type and detailed implementation and functioning of the detector 20 is not to limit this disclosure. Suitable detectors 20 are capable of producing a detector signal 25 indicative of the probe oscillations ("A") including the harmonics, as defined below and described throughout this document. Various embodiments of the present disclosure may be implemented to work with different detection methods capable of producing a probe response signal that has embedded in it probe oscillation "harmonics" as described throughout this document.

Depending on the nature of the detection method in a given embodiment, the detected movement of the probe 4 may be understood to be the movement of a location on the probe 4, or the movement of a small or large part of the probe 4, or the movement of the entirety of the probe 4. The separation of the detector 20 from the probe 4 in FIG. 3 does not imply that the detector 20 is necessarily mechanically remote to the probe 4. Indeed, in some embodiments of the present disclosure, the detector 20 may be mechanically and/or electrically in direct contact with the probe 4. An example of such an embodiment may have a piezoresistive element integrated into the probe 4 so that the movement of the probe 4 generates an electrical signal in the piezoresistive element, which signal or a suitably conditioned version of it is then the detector signal 25.

The detector signal 25 indicative of the movement of the probe 4 enters the signal conditioner and processor 30, where the detector signal 25 is conditioned and processed in accordance with the requirements of the subsequent stages of a given embodiment of the present disclosure. The signal conditioner and processor 30 may for example include one or more analog-to-digital converters and anti-aliasing filters; multiplexers and/or de-multiplexers of analog and/or digital signals; analog and/or digital filters and/or inverters and/or up-samplers and/or down-samplers; and analog and/or digital gain stages for scaling signals up or down. The output of the signal conditioner and processor 30 is the probe response signal 59. This signal may be digital or analog, depending on the detailed implementation of subsequent stages in a given embodiment of the present disclosure. Time evolution of the probe response signal 59 may be used as an indicator, a measure, of change in the probe's instantaneous position and orientation; in other words, a measure of the instantaneous probe movement. Usually though not always this movement is detected of a location on the probe, not of the entirety of the probe. Probe movement and detecting of same may refer herein to the movement of a location on the probe or movement of the entirety of the probe.

In general, closed-loop or feedback control of tip-sample interaction in AFM of the present disclosure is usually implemented by first obtaining the probe response signal 59 indicative of the AFM probe movement; then by suitably modifying the probe response signal into a feedback input signal 399X (FIG. 3) which is the input to a feedback loop; then by comparing the feedback input signal with a setpoint signal 375 and thereby generating an error signal 405 which measures how far the feedback input signal is from the setpoint signal, and which measurement is usually made by subtracting the value of the setpoint signal from the value of feedback input signal or vice-versa; then by implementing a control algorithm, for example by implementing any one or more of proportional, integral, and differential (PID) gains, on the error signal thereby generating a feedback output signal 1089 which is usually amplified (high voltage or HV Gains 490) and possibly filtered or otherwise suitably processed further but not necessarily in that order before it is applied to one or more z-actuators 700 whose collective action is meant to reduce, ideally to zero, the said error signal 405 by regulating the distance "D".

Tip-sample interaction control schemes in various disclosed embodiments offer advantages over conventional oscillating probe mode AFM by using the harmonics, as defined below. In conventional oscillating probe mode AFM, change of tip-sample interaction is measured in the change of the totality of the probe response signal, much of which is driven by the probe drive signal, and not by tip-sample interaction. However, especially when they are not driven directly substantially or at all by the probe drive signal, the harmonics in the probe oscillations, embodied in the harmonics in the probe response signal, may be carriers of information about tip-sample interaction more exclusively and/or more promptly than is the totality of the probe movement, which totality is embodied in the probe response signal. ("Bistability, higher harmonics, and chaos in AFM", Robert W. Stark, Materials Today, September 2010, Volume 13, Number 5. "Spectroscopy of the anharmonic cantilever oscillations in tapping-mode atomic-force microscopy", M. Stark et. al., Applied Physics Letters, Vol 77, No. 20, 13 Nov. 2000.)

Various embodiments of the present disclosure make select harmonics selectively more strongly relevant than they are in conventional oscillating probe mode AFM, including tapping mode AFM and multi-frequency AFM, to the control of tip-sample interaction, thereby rendering the control operation and the AFM images and data built on it better representative of tip-sample interaction.

Definition of Harmonic

Except when otherwise noted, references to a "probe oscillation harmonic" or to "probe harmonic" or to a "harmonic component of the probe response signal" or simply to "harmonic" in this document are references to a component of the probe response signal (and/or of probe oscillations) which component's frequency is a) unequal to any prominent or dominant frequency of the probe drive signal and b) is one of a positive integer (1, 2, 3, 4, 5, 6, . . . ) multiple of ½ of a prominent or dominant frequency in the probe drive signal, or a sum of integer multiples of prominent or dominant frequencies in the probe drive signal; and c) is not directly substantially driven by the probe drive signal except possibly to pull up one or more harmonics in the probe response signal just above the noise level. Rather, a harmonic, as generated with the methods disclosed herein germinates as a result of the tip-sample intermittent contact/interaction. An exception to this will be discussed in which at least one harmonic is intentionally driven by the probe drive signal only strongly enough to pull the said harmonic only slightly out above the background noise level. For sake of clarity, a natural harmonic is a frequency that is a positive integer multiple of another frequency; a sub-harmonic frequency is an inverse (multiplicative inverse) positive integer multiple of a harmonic frequency; and a natural sub-harmonic frequency is an inverse (multiplicative inverse) positive integer multiple of a natural harmonic frequency.

As used herein, an action and/or quantity (such as a signal, parameter, and/or value) "based upon" a given quantity, is in response to, responsive to, indicated by, triggered by, derived from, and/or functionally related to the given quantity or a quantity based upon the given quantity.

As seen in FIG. 3, the probe response signal 59 enters the harmonics-enabled controller 1000 and enters a harmonics signal generator (HSG) 100. The output 199X of the harmonics signal generator is called the harmonics signal 199X. The harmonics signal 199X is indicative of the presence or absence and strength when present of at least one harmonic as defined in the section above entitled "Definition of harmonic" and as described and exemplified elsewhere in this document.

The harmonics-enabled controller 1000 includes a probe drive signal controller 500 and a feedback system 900. The harmonics-enabled controller 1000 may include one or more HV Gains 490 to drive a z-actuator 700 in response to a z output signal 1089 and/or an xy-actuator 744 in response to an xy output signal 1087. The feedback system 900 generally includes a harmonics input feedback synthesizer (HFIS) 300, a setpoint controller 350, an error signal controller 400, and control algorithm unit (CAU) 410. The feedback system 900 may include one or more HV Gains 490, the harmonics signal generator (HSG) 100, a harmonics gating unit (HGU) 200, and/or an energy extractor 90. Though for convenience, 'harmonics' is used as part of the name of the harmonics-enabled controller 1000, the harmonics signal generator 100, the harmonics gating unit 200, the harmonics input feedback synthesizer 300, and other components and functions, these components and functions are not limited to use with harmonics and may be used with extracted frequencies, as discussed further herein.

Human operator input determines several parameters, usually in software, but depending on the detailed implementation of a given embodiment of the present disclosure also sometimes in hardware, that together with other, automatically-adjusted parameters, control the operation of various parts and ultimately of the whole of a given embodiment of the present disclosure. Human operator-defined parameters in an AFM operating in an oscillating probe mode including embodiments of the present disclosure usually include feedback gains; feedback setpoint; scanning speed; amplitude, frequency composition, and phase composition of the probe drive signal 5; approach-retract speed and distance in force spectroscopy; and numerous others.

In contradistinction to other oscillating probe mode AFM's including tapping mode AFM and multi-frequency AFM, various embodiments of the present disclosure have the distinction that their human operator-defined parameters and automatically-adjusted parameters may also control which harmonics are made more strongly relevant to the feedback scheme, and to what extent, when, under what conditions, and in exactly what customized fashion, which customization may include re-integrating signals indicative of extracted, optionally amplified, and otherwise manipulated harmonics with the detected probe response signal.

Harmonics Signal Generator (HSG) 100

This section starts by describing the difference between the way the absolute strengths of various signals change and the way the relative strengths of various signals change as a consequence of changes in the tip-sample interaction.

A relative change is usually measured in dimensionless quantities such as fractions and percentages; whereas an absolute change is measured in quantities that have dimensions, for example volts or millivolts. In the following and preceding discussions, a relative change in the strength of a signal refers to a fraction whose numerator is a measure of the change in the absolute strength of that signal at a given moment in time from the absolute strength of the same signal at an earlier moment in time, and whose denominator is the measured absolute strength of the said signal at the said earlier time.

Compared with probe oscillations at the frequency or frequencies driven directly substantially by the probe drive signal 5, probe oscillations at the frequencies of the harmonics (not driven directly substantially by the probe drive signal 5) are usually small in absolute strength. (We recall that a periodic but non-sinusoidal probe drive signal 5 such as in the form of a triangular waveform or square waveform with a well-defined repetition period whose inverse is the dominant frequency of the spectrum is not a single-frequency sinusoidal signal and will include substantial contributions at some integer multiples of the said dominant frequency.) In the case of probe drive signals composed mainly of a single-frequency sinusoid or of multiple single-frequency sinusoids, none of whose frequencies coincides with nor is substantially close to the frequency of a target harmonic, the probe drive signal 5 may be constructed such that a given target harmonic frequency is driven concurrently with the dominant frequency (or frequencies) but at a smaller or much smaller amplitude, large enough only to amplify the said target harmonic in the probe response signal 59 just above the noise level, but keep it smaller or substantially smaller than the same harmonic will be as a consequence of tip-sample interaction. Whether this method is used or not, the probe response signal 59 which carries information about all these components, that is, about the totality of the detected probe response, is usually dominated by oscillations at the single frequency (such as in tapping mode AFM) or at the multiple frequencies (such as in multi-frequency AFM) driven directly substantially by the probe drive signal 5. The absolute strength of the harmonics usually remain small, and sometimes very small, for example, at least 1, 2, or 3 orders of magnitude smaller than the absolute strength of the totality of the detected probe oscillations. Also, the absolute changes in the strength of the harmonics usually remain small, and sometimes very small, compared with the absolute changes in the strength of the totality of probe oscillations.

However relative changes in the probe oscillations at the frequencies of some harmonics (marginally driven or not driven at all by the probe drive signal 5) can and frequently do reflect changes in tip-sample interaction more exclusively than the relative changes in the totality of the probe oscillations, i.e., more exclusively than the relative changes in the probe response signal 59.

Furthermore, the relative changes which arise in the harmonics as a consequence of changes in tip-sample interaction are sometimes larger, or much larger, typically an order of magnitude larger, than the relative changes which arise from the same source (i.e., from changes of tip-sample interaction) in probe oscillations whole, indicated by the probe response signal 59. This is because probe oscillations at the frequencies of the harmonics are driven mainly, indeed frequently exclusively, by tip-sample interaction when such interaction is present; while probe oscillations at the frequency or frequencies prominent or dominant in the probe drive signal 5 are always driven by the probe drive signal 5, regardless of the presence or absence of tip-sample interaction.

Figures 4A, 4B:
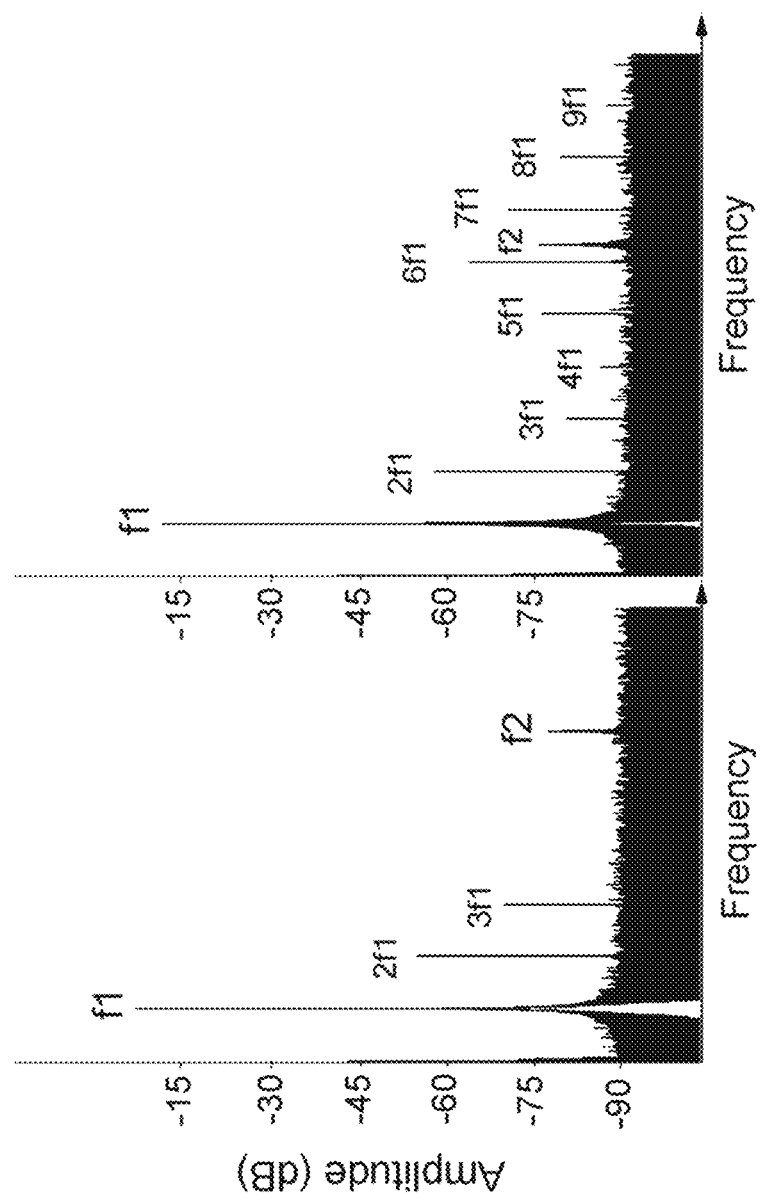
FIGS. 4A-4B show Fourier transforms of probe response signal in the presence (FIG. 4A) and in the absence (FIG. 4B) of tip-sample intermittent contact.

Absent tip-sample interactions, probe oscillations at the frequencies of the harmonics may be small or diminish or approach their noise level; (or in some cases, they can be intentionally driven lightly by the probe drive signal 5 to bring them marginally above their noise level). In contradistinction, absent tip-sample interactions, probe oscillations at the frequencies driven substantially by the probe drive signal 5 and therefore prominent in the totality of probe oscillation, i.e., in the probe response signal 59, remain prominent. These are illustrated in FIG. 4A, which is experimental result showing partial Fourier transform of probe oscillations whole as indicated in a probe response signal 59 without tip-sample intermittent contact. FIG. 4B shows partial Fourier transform of the same probe's oscillations whole as indicated in a probe response signal 59 with tip-sample intermittent contact present. With the tip-sample intermittent contact present, several harmonics of the probe's first transverse eigenfrequency f1 appear which were absent in the absence of tip-sample intermittent contact; notably, the sixth harmonic is at least 25 decibels stronger than it is in the absence of tip-sample intermittent contact. In the absence of intermittent contact, this sixth harmonic (like many others) is buried below the noise level of the probe response signal 59. When intermittent contact is present, the reduction in the strength of the first eigenfrequency, which is also the frequency of the applied sinusoidal probe drive signal 5, is less than 5 decibels. The sixth harmonic is closest to the probe's second transverse eigenfrequency f2 and that is one reason it is amplified significantly (at least 30 decibels) more strongly than the other harmonics that grew in strength when intermittent contact was present.

This inventor has observed that in cases where the amplitude of a sinusoidal probe drive signal 5 driven at a single frequency is large enough to produce harmonics of that frequency in the probe response signal 59 even in the absence of tip-sample interaction (and in-line with what is expected from the probe oscillations departing from the linear regime), a majority of these harmonics diminish or substantially diminish in the frequency spectrum of the probe response signal 59 upon the initiation (and subsequent maintenance) of tip-sample intermittent contact. In contrast, (in these cases and in all cases), the harmonics which become most prominent (relative to their neighboring harmonics) only with tip-sample intermittent contact may be substantially near to or coincident with an eigenfrequency of the probe. Notably, the frequency of the sixth harmonic 6/1 of the lowest transverse oscillation eigenfrequency f1 of a typical rectangular cantilever AFM probe is usually close to its second lowest transverse oscillation eigenfrequency f2. Consequently, when the probe is driven substantially at or near the said lowest transverse oscillation eigenfrequency, the oscillations at the said sixth harmonic of that driven frequency are frequently amplified with tip-sample intermittent contact and dissipate substantially (including in some cases down to their noise level) with loss of tip-sample intermittent contact.

Furthermore, substantial changes in the relative strength of harmonics resulting from changes in tip-sample interaction frequently indicate initiation and loss of tip-sample intermittent contact faster than changes in the totality of probe oscillations indicate the same; i.e., faster than the changes in the relative strength of the probe response signal 59.

These and several related phenomena are shown in experimental results depicted in FIG. 5A thru FIG. 5D and will be discussed next.

Figure 5A:
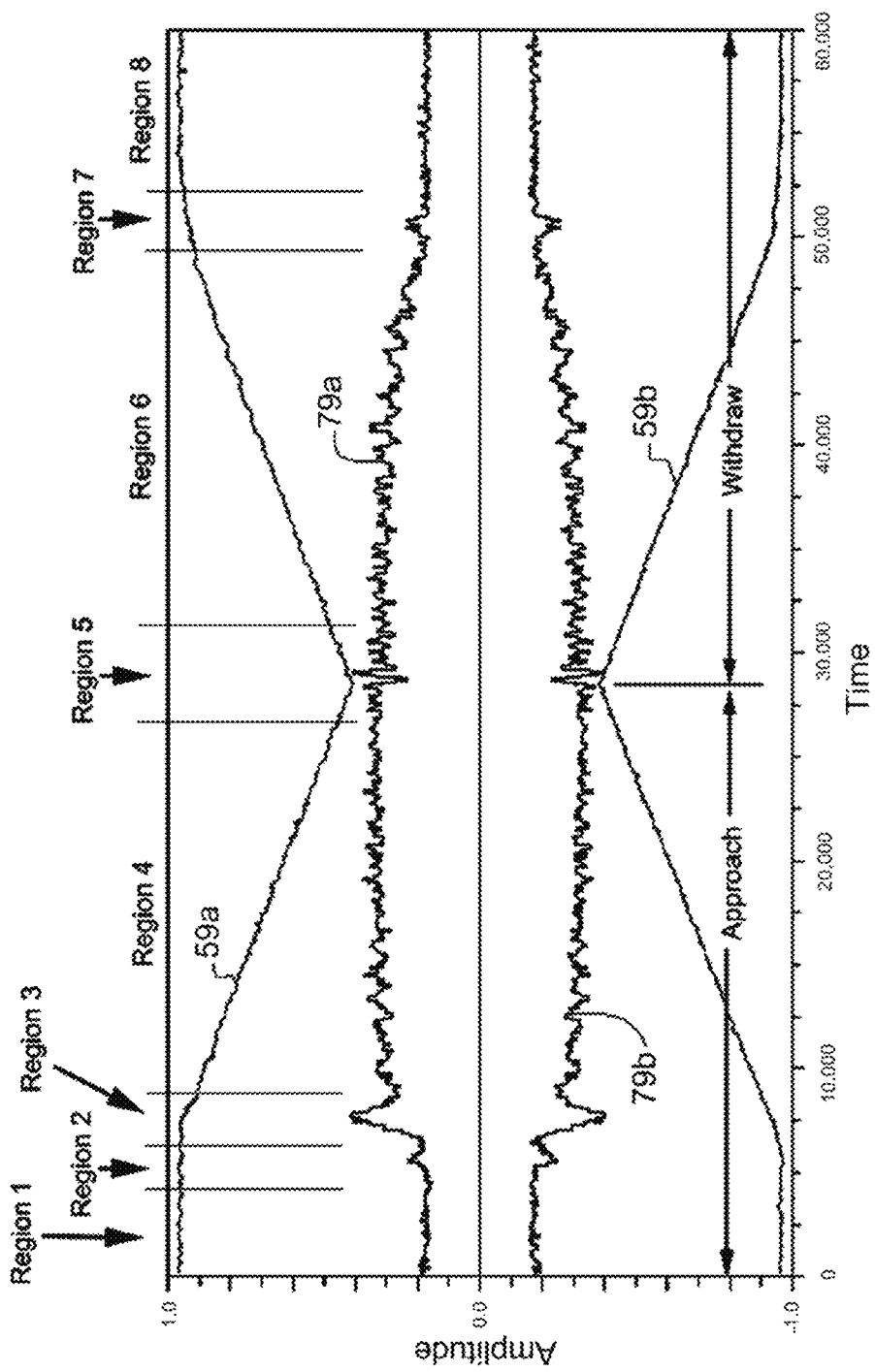
FIG. 5A shows amplitude of an AFM probe oscillations induced at its first transverse eigenfrequency f1 and amplitude of extracted and amplified oscillations of the same probe at the sixth harmonic frequency 6f1 during an approach-retract cycle.

FIG. 5A depicts experimental results from one cycle of what is commonly referred to in the art as "force spectroscopy" experiment. The figure illustrates the time evolution from left to right of two types of oscillations during a single cycle of approach-retract in force spectroscopy. The abscissa is the time; the ordinate is the amplitude of the detected probe oscillations, substantially along the z-axis. Oscillation trajectories are densely packed and not shown, only the amplitude change (the envelope) is shown; this is adequate for the descriptions that follow. In such a cycle, usually, as is the case in this example, the probe and the sample are incrementally brought close to each other during one half of the cycle (approach) and pulled apart during the other half (retract); at each end of the cycle or at other points during the cycle, it is possible to halt the approach or the retract for a duration and then resume it, with the aim of maintaining a constant separation in that duration. (FIG. 5A through FIG. 5D include no halt). In the context of the FIG. 3, the movement of the approach-retract cycle is realized by the z-actuator 700 (e.g., a piezoelectric element).

The first oscillation type the envelope of which is plotted is an example of the probe response signal and denoted as 59a (top envelope) and 59b (bottom envelope). This signal is larger and steady on the far left; diminishes mostly monotonically over time as we go towards the middle; then grows mostly monotonically back up to its original steady strength on the far right. In this experiment and in the context of FIG. 3, this quantity is a measure of the totality of a rectangular cantilever probe's oscillations "A" as detected at a location near the free end of the probe; however, these oscillations are dominated in this case by oscillations at a single frequency f1, which is the sole prominent component in the frequency spectrum of a sinusoidal probe drive signal 5 applied to the probe base 2 in FIG. 3. These oscillations (the probe response signal 59) carry the harmonics as well, but the harmonics are so small that they are essentially buried in the larger main oscillations at frequency f1, which are driven by the probe drive signal 5. As the z-actuator 700 reduces (from the far left to the middle in FIG. 5A) and then increases (from the middle to the far right in FIG. 5A) the distance "D" in FIG. 3 between the probe base 2 and the sample stage 800, the amplitude of the probe response signal 59 is at first unchanged in the absence of tip-sample intermittent contact despite the approach (Region 1, far left); then changes briefly and almost imperceptibly in Region 2 (in 59b, the bottom envelope) before gradually decreasing with continuing approach and the attendant tip-sample intermittent contact in Region 3 and Region 4; reaches a minimum around the middle of the plot in Region 5; and finally rebounds and gradually increase as the z-actuator 700 first reverses course (also in Region 5) and then increases the distance "D", thereby retracting the sample from the probe (and in other embodiments retracting probe from the sample) in Regions 5 through 8. Within the margin of the noise in the signal, the final, constant, amplitude of these oscillations at the end of the retraction in Region 8 (far right) reaches the same value as its initial value on the far left at the beginning of the approach in Region 1. At both ends, Region 1 and Region 8, tip-sample intermittent contact is absent and the amplitude (59a and 59b) of the probe response signal 59 has it maximum value, which is usually called the free amplitude, and its RMS called the free RMS amplitude.

The second type of oscillation (envelopes) plotted and denoted as the signal 79a and 79b in FIG. 5A are smaller on the far left in Region 1 in the absence of tip-sample intermittent contact. During the approach, as the z-actuator 700 reduces the distance "D", the oscillation amplitude at first remains unchanged until intermittent tip-sample interaction is initiated (Region 2 and Region 3) and the amplitude increases in two consecutive peaks, a smaller peak in Region 2 followed by a larger peak in Region 3, and thereafter exhibits with continuing approach (Region 4) a more complex pattern than the oscillations of the first type 59 (59a and 59b envelopes). Shortly after the z-actuator 700 stops the approach, reverses course, and starts to pull the probe base 2 and the sample stage 800 apart during the retract portion of the force spectroscopy cycle, the amplitude of this second oscillation type goes through several closely-spaced cycles of relatively large increase and decrease (Region 5) before exhibiting in Region 6 a pattern similar (though not identical) to that in Region 4, and finally reaching on the far right (Region 8) to the level it has on the far left (Region 1), indicating once more the tip and the sample are no longer in intermittent contact. This second type of oscillation is mainly of the rectangular cantilever probe at the frequency 6/1, the sixth harmonic of the probe drive signal frequency f1. In the context of FIG. 3, the second type (harmonic) oscillations 79 plotted (envelopes 79a and 79b) in FIG. 5A were extracted, filtered, and amplified in the harmonics signal generator 100 from the first type of oscillations, i.e., from the probe response signal 59 (envelopes 59a and 59b).

The signal 79 whose envelopes represent the second oscillation type in FIG. 5A is the starting signal for generating the harmonics signal 199X. In the context of the example embodiments of the harmonics signal generator 100 illustrated in FIG. 6 and detailed in a subsequent section, the oscillatory signal represented by its envelopes 79a and 79b in FIG. 5A is the (amplified) extracted harmonic 79. Further signal processing is required to complete the synthesis of a harmonics signal 199X which may be built from the amplified extracted harmonic 79. These will be described in detail later. But first, the plots in FIG. 5A through FIG. 5D are examined in detail to elucidate the subsequent discussions.

1) In Regions 2 and 3 in FIG. 5A, the relative change in the oscillation amplitude of the amplified extracted harmonic 79 is much larger than the relative change of the amplitude of the probe response signal 59. Furthermore, the duality of the peaks (Regions 2 and 3) in the amplitude of the amplified extracted harmonic 79 corresponds roughly to the beginnings of reduction in the maximum excursion (envelopes) of the probe response signal 59 at the bottom and at the top of probe oscillation trajectories.

2) The amplified extracted harmonic 79 is able to clearly detect in the form of the smaller peak in Region 2 the presence of predominantly attractive intermittent tip-sample interaction, just before the onset of repulsive intermittent tip-sample interaction, which is represented by the larger peak, in Region 3. The amplified extracted harmonic 79 detects the initiation of (attractive) intermittent tip-sample interaction in Region 2 more clearly and unambiguously than does the probe response signal 59 which is the signal used in AM-AFM, e.g., in tapping mode AFM (and also in multi-frequency AFM), to implement feedback. In the plot of the amplified extracted harmonic 79, the distance between the smaller peak in Region 2 and the point of reversal from approach to retract (near the middle of the plots in Region 5) is approximately the same as the distance between the peak in Region 7 and the point of reversal (in Region 5). The peak in Region 7 corresponds to a surge in the tip-sample interaction immediately prior to total loss of intermittent contact upon further retraction in Region 8. The counterpart to this peak in the oscillations of the first type, i.e., in the probe response signal 59, is a much smaller relative change. Furthermore, the final change in Region 7 of the probe response signal 59 is less localized, more diffuse along the abscissa (time, corresponding to z-) axis than the peak in Region 7 in the amplified extracted harmonic 79.

3) During the transition period immediately after the approach-retract cycle is reversed from approach to retract (Region 5), i.e., immediately after the z-actuator 700 stops decreasing and starts increasing the distance "D", the large relative changes in the amplified extracted harmonic 79 reflect the modulations of the intermittent tip-sample contact which result from the high Q of the AFM cantilever probe hindering a rapid enough change in the amplitude of the first type of oscillations (probe response signal 59) upon initiation of retraction. In Region 5, the amplified extracted harmonic 79 shows that the tip-sample intermittent contact wanes and waxes rapidly several times. In sharp contrast, the probe response signal 59 is almost blind to this effect in Region 5.

Figure 5B:
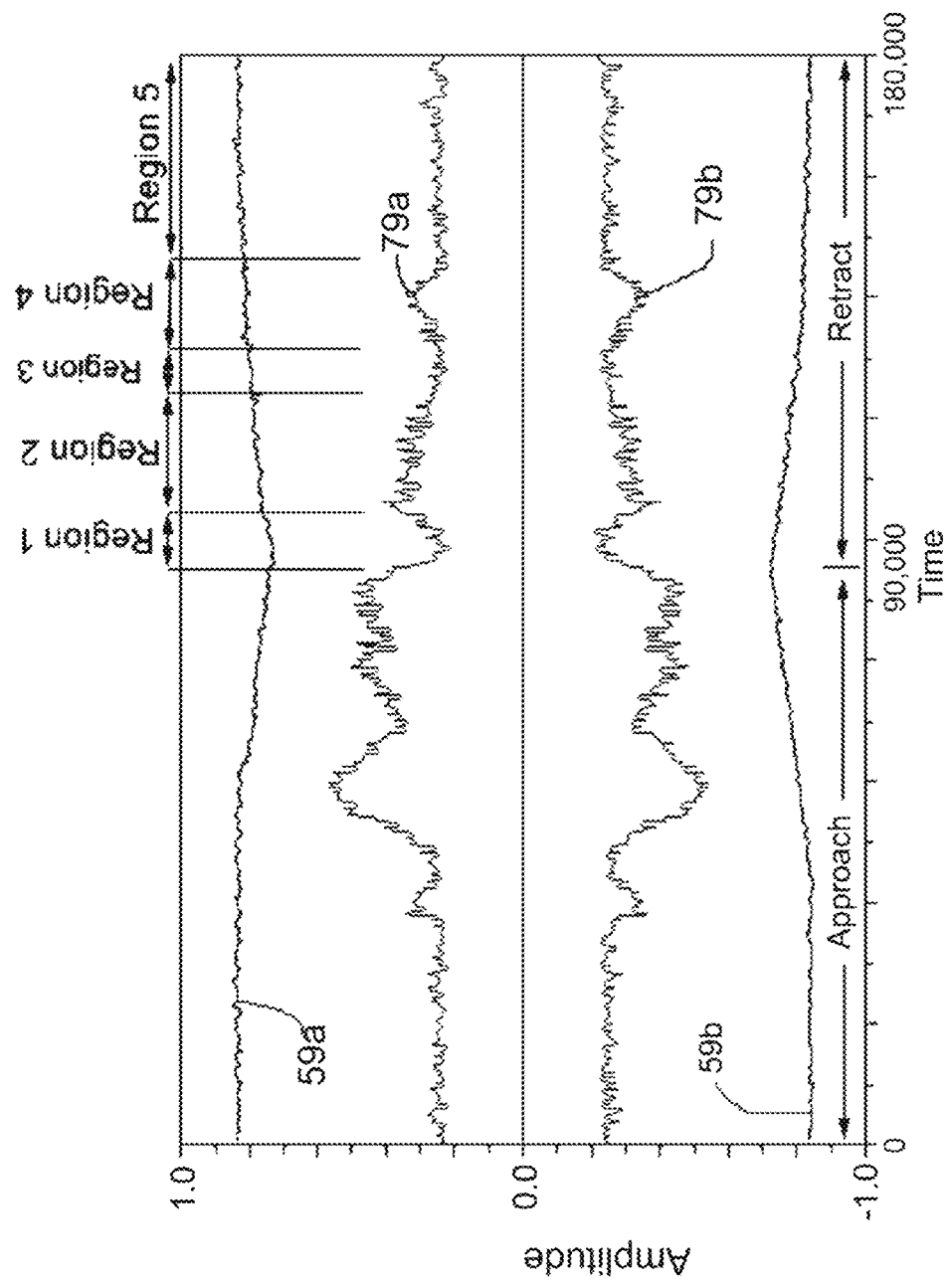
FIG. 5B is experimental data showing oscillations similar to those in FIG. 5A but for a shallower final depth of approach.

A related situation is illustrated in FIG. 5B. This figure shows experimental results similar to those in FIG. 5A (same probe, same sample, same approach-retract speed, and same probe drive signal 5) with the difference that during the approach, the smallest value of the separation "D" between the probe base 2 and the sample stage 800 was larger than same in the experiment depicted in FIG. 5A: the initial and final separations of the probe base 2 and sample stage 800 were both larger than they were in FIG. 5A (in other words the depth of approach was smaller); so, even though the approach-retract speed associated with FIG. 5B was the same as that associated with FIG. 5A, fewer oscillation cycles in FIG. 5B coincide with the times when tip-sample intermittent interaction (attractive and/or repulsive) was present. In this case, FIG. 5B, when the force spectroscopy cycle is reversed from approach to retract, the amplified extracted harmonic 79 shows that the tip-sample intermittent interaction is at first nearly totally lost (Region 1), re-established (Region 2); lost again (Region 3); re-established again (Region 4), and finally lost altogether in Region 5. That the tip-sample intermittent interaction is nearly or totally lost in Regions 1 and 3 can be deduced by noting that the amplitude of the amplified extracted harmonic 79 reduces in these regions (certainly in Region 3) to the value it has on the far left (and far right) of the figure which denote the times when the tip and the sample are far apart. FIG. 5B shows that the probe response signal 59 carries no clearly decipherable indication of these changes, which include the crucial events that are the intermittent loss of intermittent contact, which some embodiments of the present disclosure address, using amplified extracted harmonics, as will be discussed in detail.

Figure 5C:
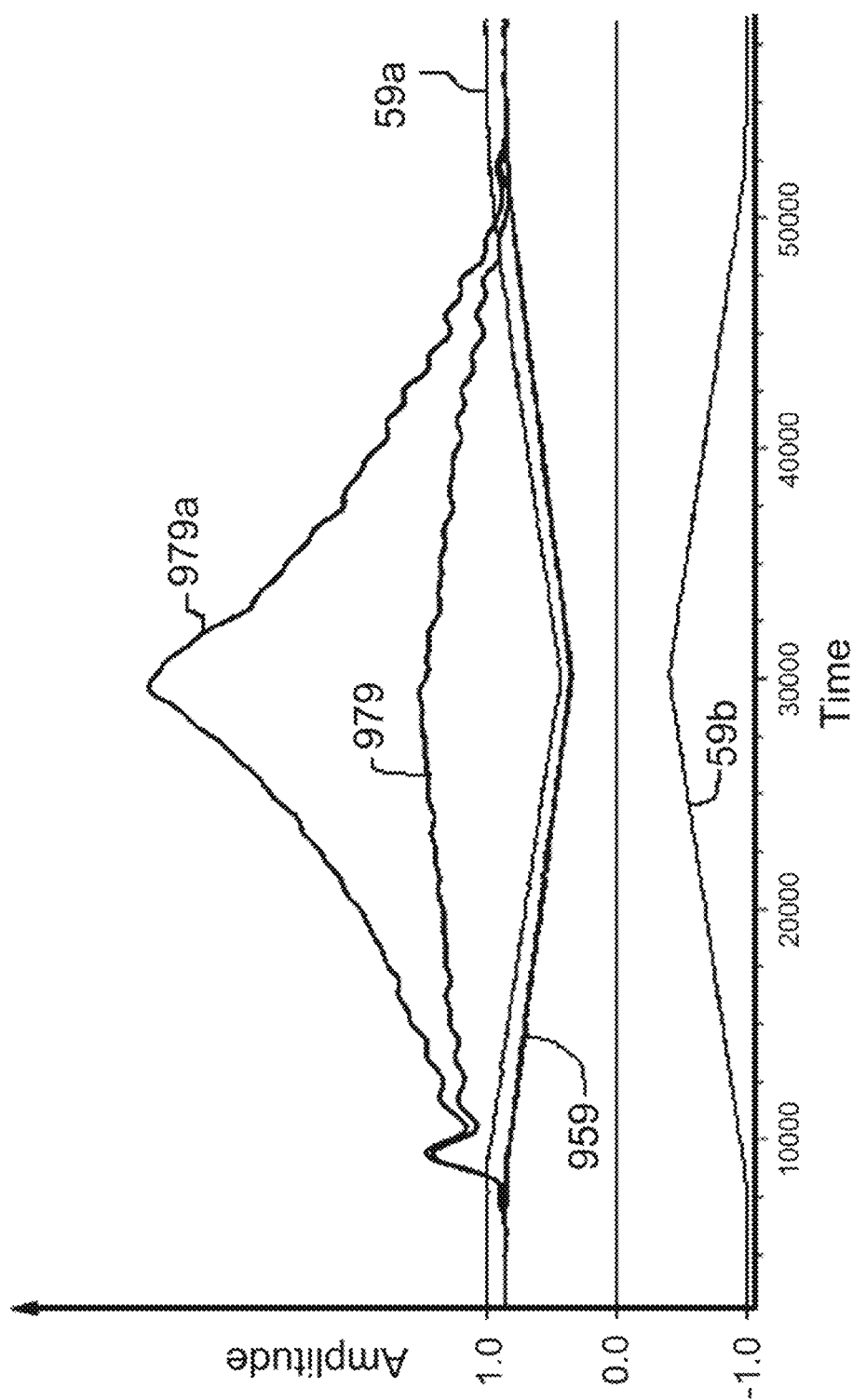
FIG. 5C shows same amplitude of oscillations as in FIG. 5A, and RMS amplitudes (959) of said oscillation, and RMS amplitude (979) of the sixth harmonic 6f1 in FIG. 5A, and the RMS amplitude (979N) of oscillations at the sixth harmonic normalized (divided by) the RMS amplitude 959. RMS amplitudes are computed at a bandwidth of approximately 1.2 kHz.
Figure 5D:
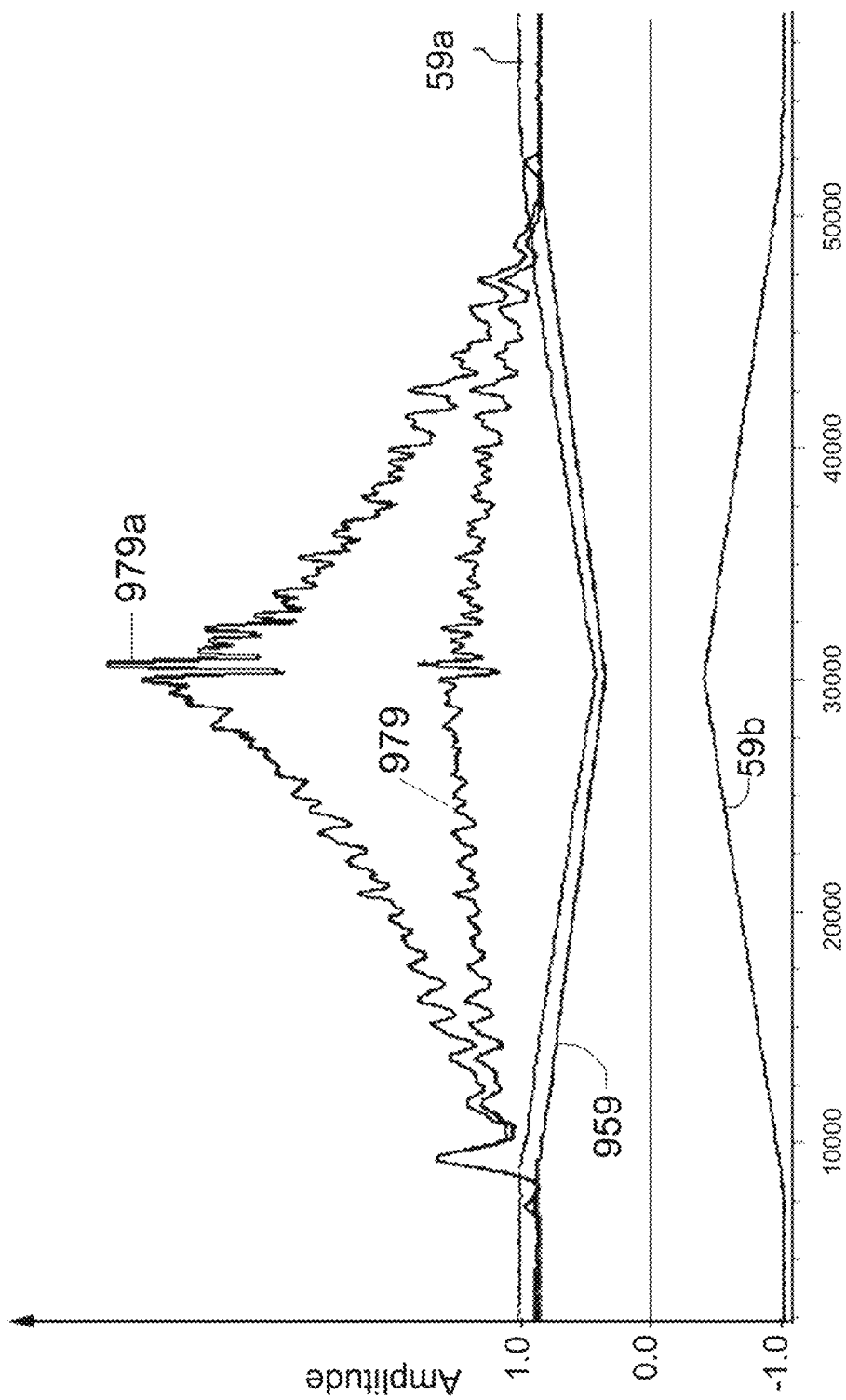
FIG. 5D shows all four entities plotted in FIG. 5C with the RMS amplitudes computed at a larger bandwidth.

4) FIG. 5C shows the envelopes (59a and 59b) of probe response signal 59, the RMS amplitude 959 of the probe response signal 59, the RMS amplitude 979 of the amplified extracted harmonic 79, and 979N the RMS amplitude 979 of the amplified extracted harmonic 79 normalized (divided) by the RMS amplitude 959 of the probe response signal 59. The RMS amplitude 979 of the amplified extracted harmonic 79 has a non-linear long-range trend in both the approach and retract half cycles; and shows a rich and complex short-range structure. These features are in sharp contrast to the mainly linear long-range trend and the relatively feature-free short-range structure of the RMS amplitude 959 of the probe response signal 59. This difference reflects the fact that as compared with the RMS amplitude 979 of the extracted harmonic 79 (and its normalized version 979N), the RMS amplitude 959 of the totality of the probe oscillation is largely insensitive to the sometimes subtle and sometimes overt changes in and the non-linear nature of the tip-sample interaction. In conventional AM-AFM including tapping mode AFM and multi-frequency AFM, the feedback input signal would be the RMS amplitude 959 of the signal herein called the probe response signal 59. As seen in FIG. 5C and FIG. 5D, the RMS amplitude 959 (of the probe response signal 59) changes substantially linearly and monotonically in both directions, i.e., with probe-sample approach and retraction. In contrast, it is well-known in the art that tip-sample interactions, even at their weakest, may be non-linear or highly nonlinear ("How does a tip tap?", N. A. Burnham et. al, Nanotechnology 8 (1997) pp. 67-75. "Interpretation of force curves in force microscopy", N A Burnham et. al., Nanotechnology 4 (1993), pp 64-80).

5) Furthermore, the amplified extracted harmonic 79 can detect the changes in the tip-sample interaction earlier than the probe response signal 59 is able to detect them. This can be seen for example just to the left of the center of Region 5 of FIG. 5A, where the amplified extracted harmonic 79 drops sharply over approximately 15 cycles of probe oscillations upon the reversal of the force spectroscopy direction from approach to retract; during these 15 cycles, the probe response signal 59 remains largely unchanged. The same effect can be seen in FIG. 5B, in Region 1 and the region immediately to its left. (To re-iterate, only envelopes of the oscillations are shown; the described 15 cycles of probe oscillations are too densely packed to show individually in these plots.)

As compared with AM-AFM, including tapping mode AFM and multi-frequency AFM, embodiments of the present disclosure can take stronger account, viz. AFM feedback control, of the changes to the non-linear tip-sample interaction that result in-part (but not only) from changes of the probe-sample distance. They can do this by selectively making more strongly relevant to the AFM feedback control scheme the type of information exemplified in the changes of the harmonics as depicted in FIG. 5A through FIG. 5D. In doing so, embodiments of the present disclosure improve upon AM-AFM including tapping mode and multi-frequency AFM, viz. tip-sample interaction control.

In FIG. 5C, the RMS amplitudes 959 and 979 (and 979N) are computed with an averaging (low-pass) filter whose approximately 1.2 kHz bandwidth corresponds to that of a typical (as of this writing) AFM tube shaped piezoelectric actuator combining the z (700) and the xy (744) actuators. In FIG. 5D they are computed with a bandwidth approximately 10 times wider than that of a typical AFM tube actuator. The significance of FIG. 5D is that if all other features of a given feedback scheme remain the same, when a fast enough actuator is available, a feedback input signal based in-part or in-whole on the amplified extracted harmonic 79 (or on its value normalized by the RMS amplitude of the probe response signal 59) will result in a more agile feedback response, and therefore the AFM probe will track the surface of the sample with better fidelity than is possible to do with an input signal measuring the RMS amplitude of the probe response signal 59 as it is done in AM-AFM including tapping mode and multi-frequency AFM.

By making use of the type of information exemplified in, though not limited by, signals 979 and/or 979N plotted in FIGS. 5C and 5D, some embodiments of the disclosure can generate AFM images that visualize the sample surface more clearly and with higher fidelity and higher resolution than images generated with AM-AFM, exemplified by tapping mode AFM and multi-frequency AFM.

In various embodiments of the present disclosure various signals are modified with the aim of making more prominent and more strongly relevant to the feedback control scheme the changes of tip-sample interaction as embodied in the changes of the harmonics, i.e., in the changes of the harmonics signal 199X and by extension changes of the gated harmonics signal 299X, which will be discussed in detail in a separate section later. The harmonics signal 199X is synthesized in the harmonics signal generator (HSG) 100, example embodiments of which are described below.

The said modifications may be accomplished inside or outside the unit that is generically illustrated as the harmonics-enabled controller 1000 in FIG. 3, but the precise location of the sub-units in which the modifications are accomplished may be different and given different names in various embodiments of the present disclosure; this means, for example, that the modifications may be implemented outside a unit called the controller. Therefore, the choice of the nomenclature and exact location of the sub-units illustrated and described herein are not to be understood to limit, but rather to exemplify embodiments of the present disclosure.

In general, in a given embodiment of the present disclosure, the amplified extracted harmonics 79 may be made accessible (for further signal processing) independently and separately of the harmonics signal 199X.

Several example embodiments of the harmonics signal generator (HSG) 100 are discussed herein by way of exemplifying but not limiting the scope either of the HSG 100 or embodiments of the present disclosure. Unless otherwise noted, in embodiments of the HSG 100 as in other components described throughout this document, signal processing may be carried out in analog hardware and/or digital hardware and/or mixed-signal (partly analog and partly digital) hardware.

Harmonics Signal Generator (HSG) 100

In some embodiments of HSG 100, the HSG 100 synthesizes a harmonic signal 199X from a harmonic at a single frequency.

Figure 6:
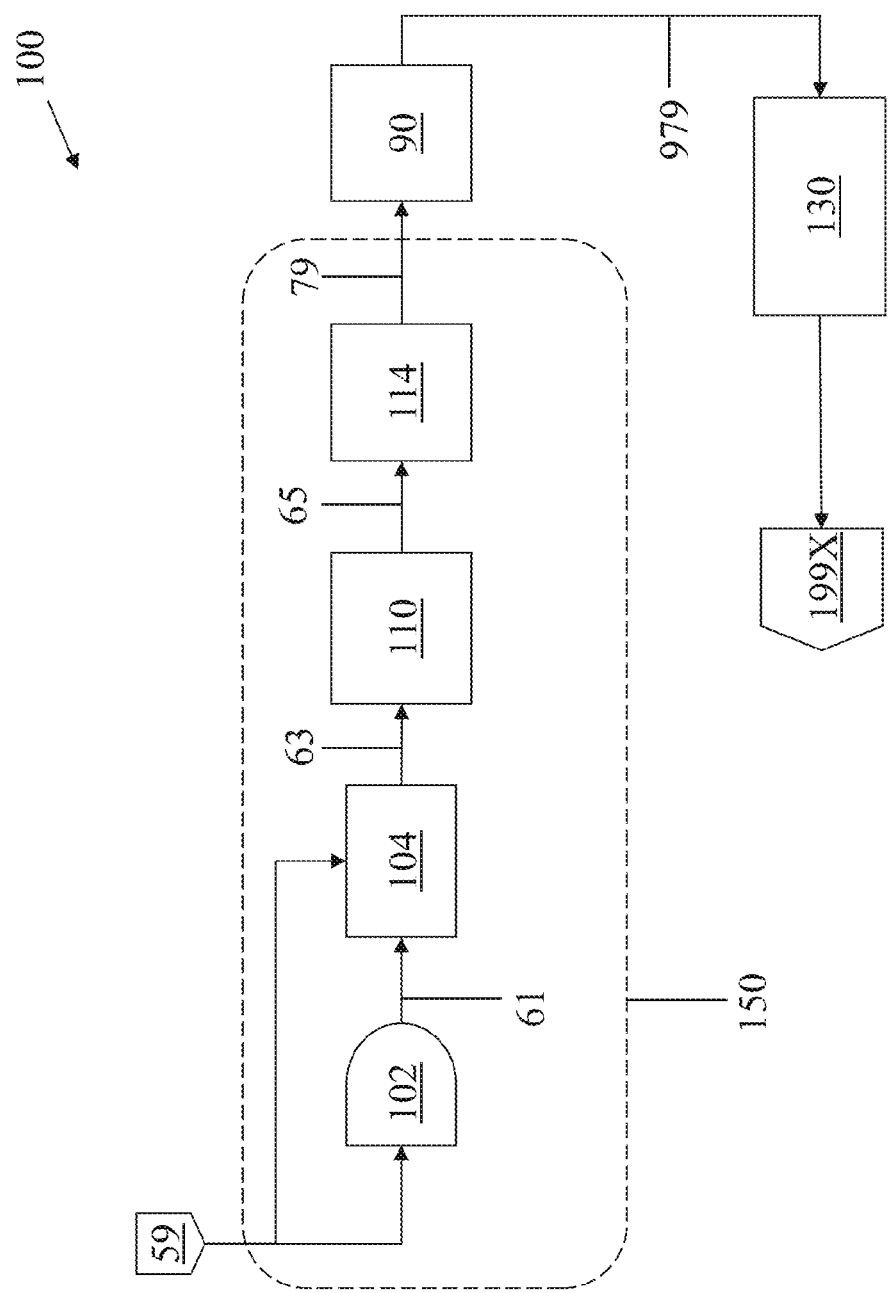
FIG. 6 is a simplified block diagram illustrating an example embodiment of a single-harmonic harmonics signal generator.

FIG. 6 shows a block diagram of an example of HSG 100. Here, the probe response signal 59 is delayed in the delay circuit 102 by half the period of the oscillation at a prominent or dominant frequency in the probe drive signal 5. The target harmonic is a harmonic (in the probe response signal 59) of the said prominent or dominant frequency. The probe response signal 59 and the delayed probe response signal 61 are added in the adder 104 to substantially reduce and ideally eliminate the contribution to the probe response signal 59 of oscillations at the said prominent or dominant frequency. This inventor has observed that depending on the implementation of the adder and delay circuits, the addition in an analog implementation may need to be weighted and compensated for offsets, i.e., one or both signals to be added may need to be scaled (up or down) and/or one or both signals and/or the sum of the signals may need to be offset by a positive or negative dc value. The resulting signal 63 is filtered (and optionally amplified) through one or more stages of band-pass filters 110 whose pass band is centered at or nearly centered at or includes the frequency of the target harmonic and whose output is herein called the extracted harmonic 65. This signal may be quite weak and may need to be amplified. If so, it enters a pre-amplifier 114 whose output is the amplified extracted harmonic 79. An example of the amplified extracted harmonic 79 is shown in FIGS. 5C and 5D. The collection of stages and the elements implementing the extraction and amplification of the harmonic or harmonics are herein called the harmonic extractor 150. The amplified extracted harmonic 79 is the input to an energy extractor 90 the output 979 of which is called the harmonic energy signal. The harmonic energy signal 979 is a measure of the energy in the amplified extracted harmonic 79. Examples of the energy extractor 90 include RMS-to-DC converter, positive or negative peak detector, peak-to-peak detector, and maximum absolute value detector. The harmonic energy signal 979 is the input to optional low-pass or band-pass filters 130 the output of which is the harmonics signal 199; it is possible that this filtering stage (130) is not needed, in which case in this embodiment the harmonic energy signal 979 is also the harmonics signal 199X.

In some embodiments of HSG 100, the delay 102 and adder 104 stages are absent. In some embodiments of HSG 100, the energy extractor 90 may precede rather than follow the pre-amplifier 114.

In some embodiments of HSG 100, the probe response signal 59 enters a digital or analog lock-in amplifier 160 (FIG. 7B), the output of which is a measure of the energy of a target harmonic embedded in the probe response signal 59. For example, the lock-in amplifier measures, using one or more reference signals at the frequency of the target harmonic, simultaneously the in-phase and in-quadrature components of the probe response signal 59 at the frequency of the target harmonic and produces the square root of the sum of the squares of these two components. If necessary, the output of the lock-in amplifier may be further filtered and amplified in low-pass or band-pass filters 130 (FIG. 7B). The final output is the harmonics signal 199X. The output of the lock-in amplifier or the output of the optional filters 130 as described in this embodiment may be equivalent to the harmonics energy signal 979. Therefore, wherever in an embodiment of the present disclosure or its components the harmonics energy signal 979 is used, for example in some embodiments of the harmonics input feedback synthesizer (HFIS) 300 described elsewhere in this disclosure, the output of the lock-in amplifier or the output of the subsequent optional filters 130 may be substituted for the harmonics energy signal 979.

Motivated by the characteristics of the normalized energy signal 979N as depicted in FIGS. 5C and 5D, in some embodiments of the HSG 100, the harmonic energy signal 979 is normalized (divided) by a measure of the energy of the probe response signal 59 (e.g., the probe energy signal 959 as obtained with energy extractor 90, as shown in FIG. 3).

This inventor has implemented several of the embodiments described above and observed that for implementing the delay 102 on an analog probe response signal 59, in the absence in the market of bucket-brigade delay chips with large enough number of stages to suit the high frequencies of the harmonics in AFM, multi-stage all-pass filters have served the objective well even at the expense sometimes of waveform distortion.

The next two example embodiments of the harmonic signal generator 100 are directed at extracting multiple harmonics and synthesizing a harmonics signal 199X from the multiplicity.

Figure 7A:
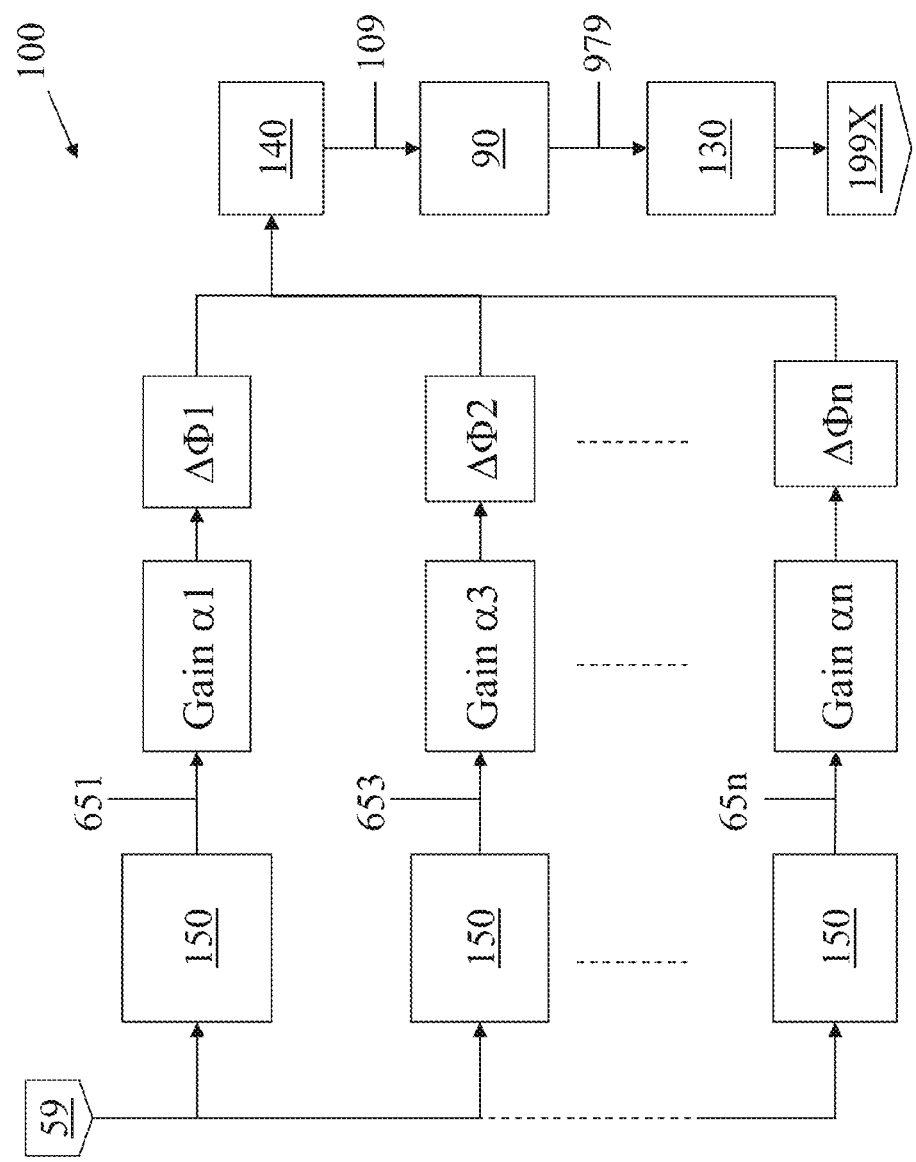
FIG. 7A is a simplified block diagram illustrating an example embodiment of a multiple-harmonic harmonics signal generator.
Figure 7B:
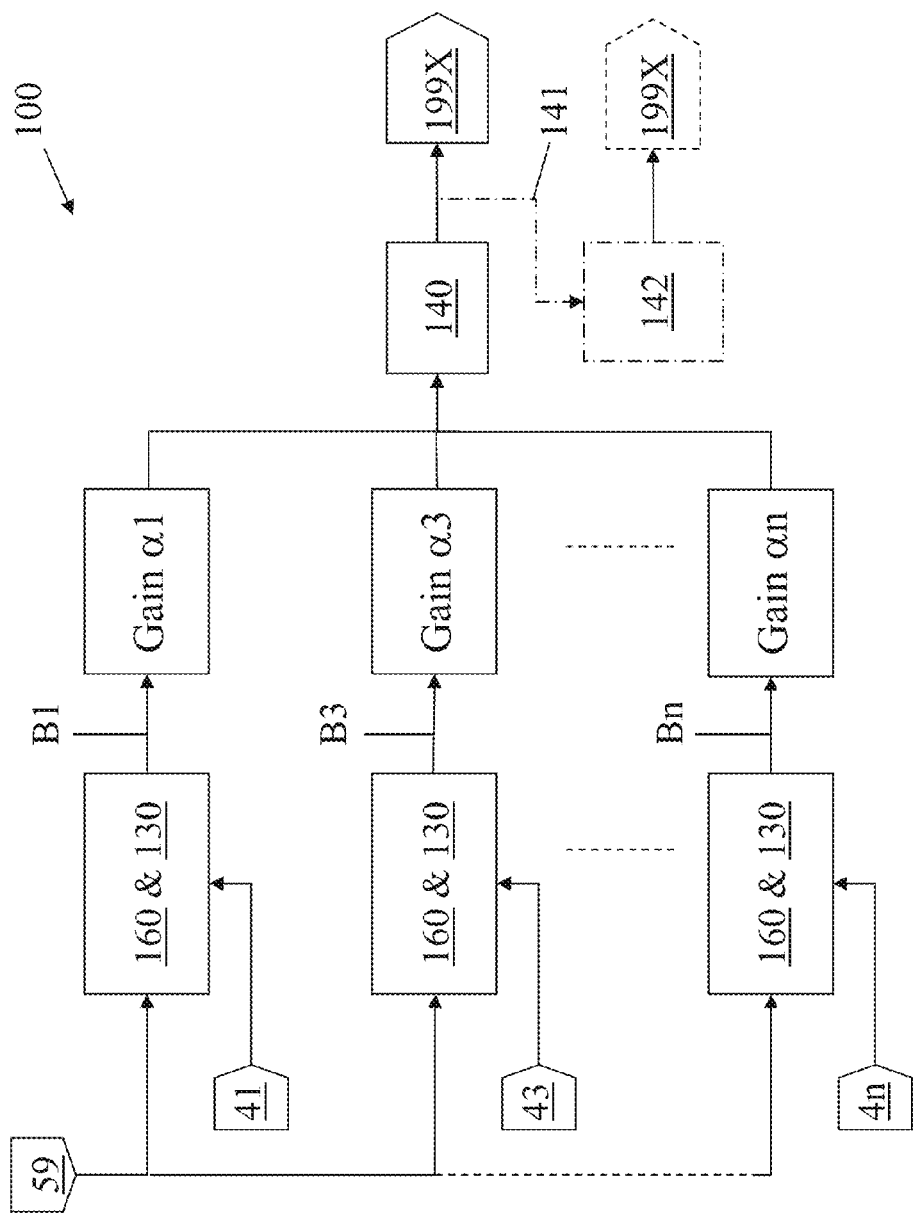
FIG. 7B is a simplified block diagram illustrating an example embodiment of a multiple-harmonic harmonics signal generator.

As shown in FIG. 7A, in some embodiments, probe response signal 59 enters a parallel bank of single-harmonic extractors 150 or any other embodiment of a single-harmonic extractor, and the extracted harmonics $A_i \sin(2\pi f_i t)$ outputs 651, 653, ..., 65n, of the single-harmonic extractors directed at frequencies $f_i$ are weighted (positive, negative, or zero gains $\alpha 1, \alpha 3, \ldots, \alpha n$) and optionally phase shifted ($\Delta \varphi 1, \Delta \varphi 3, \ldots, \Delta \varphi n$) though not necessarily in that order, and then added to render a composite extracted harmonic 109 according to Equation 1:

$$V_{109} = \Delta_1 A_1 \sin(2\pi f_1 t + \Delta \Phi_1) + \alpha_3 A_3 \sin(2\pi f_3 t + \Delta \Phi_3) + \ldots + \alpha_n A_n \sin(2\pi f_n t + \Delta \Phi_n)$$

which is subsequently converted in an energy extractor 90 the output 979 of which is the harmonics energy signal 979 and which is optionally further filtered in the low-pass or band-pass filters 130 (FIG. 7A), to generate the harmonic signal 199X. It is possible that this filtering stage 130 is not needed, in which case in this embodiment the harmonic energy signal 979 is also the harmonics signal 199X. The harmonics extractors in the bank need not necessarily be copies of one and the same extractor.

In the embodiment shown in FIG. 7B the probe response signal 59 enters a parallel bank of lock-in amplifiers 160. Each lock-in amplifier is possibly followed by subsequent filtering and scaling (130). Each lock-in amplifier also receives its own (possibly unique) reference signal 4i (i.e., 41, 43, . . . 4n), which is at the frequency of one of the target harmonics. The outputs $B_i$ are weighted (positive, negative, or zero gains $\alpha 1, \alpha 3, \ldots, \alpha n$) and added in the summer 140 to render the harmonic signal 199X ($V_{199}$) according to Equation 1B:

$$V_{199} = \alpha_1 B_1 + \alpha_3 B_3 + \ldots + \alpha_n B_n$$

Alternatively, in the signal processor 142 this sum signal may be further processed, including possibly filtered and amplified as necessary, before it is used as the harmonic signal 199X. The lock-in amplifiers and subsequent scaling and filtering (130) need not be copies of one and the same in the parallel branches in the bank.

Similarly to the way in which the harmonic energy signal 979 may be normalized by the probe energy signal 959 to render the harmonics signal 199, the harmonics signal 199X in the embodiments of FIGS. 7A-7B may be a signal that is normalized by the probe energy signal 959; for example by dividing the signal 109 or 141 or 979 by the probe energy signal 959. Such an option is motivated by the characteristics of the normalized harmonics energy signal 979N such as illustrated in FIGS. 5C-5D.

The above examples were detailed in order to emphasize that the manner in which the harmonics signal 199X is generated is not unique and the examples are not to be construed as limiting the embodiments of the disclosure. In fact, using different probe types, driven with different types of probe drive signal 5, the inventor has observed different harmonics appearing, strengthening, subsiding, and disappearing during the course of imaging or force spectroscopy on different types of samples. The flexibility in defining which harmonics are extracted, and to what degree, when, and under what conditions, and in exactly what customized fashion each harmonic becomes a significant contributor to the functioning of the feedback control scheme as described in the following sections results in a variety of the implementations of the embodiments of the present disclosure to selectively extract, amplify, and combine or otherwise incorporate various harmonics into generating a harmonics signal 199X suitable for use in a given application and a given sample type.

Harmonics-enabled Tip-sample Interaction Control

Systems and methods of the present disclosure may achieve one or more of the following objectives: 1) To identify and/or delineate the parts of a harmonics signal 199X that correspond to the absence of tip-sample intermittent contact from the parts of the same harmonics signal 199X that correspond to the presence of tip-sample intermittent contact. 2) To make actionable for the feedback operation the identification of the absence or loss of tip-sample intermittent contact; the desired action is for the feedback operation to actuate a z-actuator 700 in favor of reducing the distance "D" illustrated in FIG. 3 more promptly and/or faster than it can be done without the use of said harmonics signal 199, and thereby to establish or re-establish tip-sample intermittent contact sooner. 3) To control at least one actuator as defined earlier with the objective of rendering equal to or as close as possible to zero the value of a feedback error signal built in part or in whole from a harmonics signal 199X. 4) To identify the durations of time in which the strength of a harmonics signal 199X is substantially reduced and concurrently the strength of probe oscillations whole, as measured by a probe response signal 59 or by a probe energy signal 959, is reduced below an adjustable threshold. 5) To make actionable for the feedback control operation the identification of a reduction in the strength of a harmonics signal 199X concurrently with a reduction of probe oscillations whole, as indicated in a probe response signal 59 or probe energy signal 959, below an adjustable threshold; the desired action is for the feedback operation to act at any given moment in time (also indicated by the adjective present) on an input signal constructed in-part from a value of the said harmonics signal 199X other than its present value, for example its value at an earlier time which value is larger than its present value, or for example its present value deliberately amplified, or another value derived according to an algorithm to be defined by the human operator or to be automated. Such an algorithm may involve the strength of a probe energy signal 959 and the strength of a harmonics signal 199X and/or the first and/or the second time derivative(s) of a probe energy signal 959 and/or the first and/or the second time derivative(s) of a harmonics signal 199X.

Figure 8A:
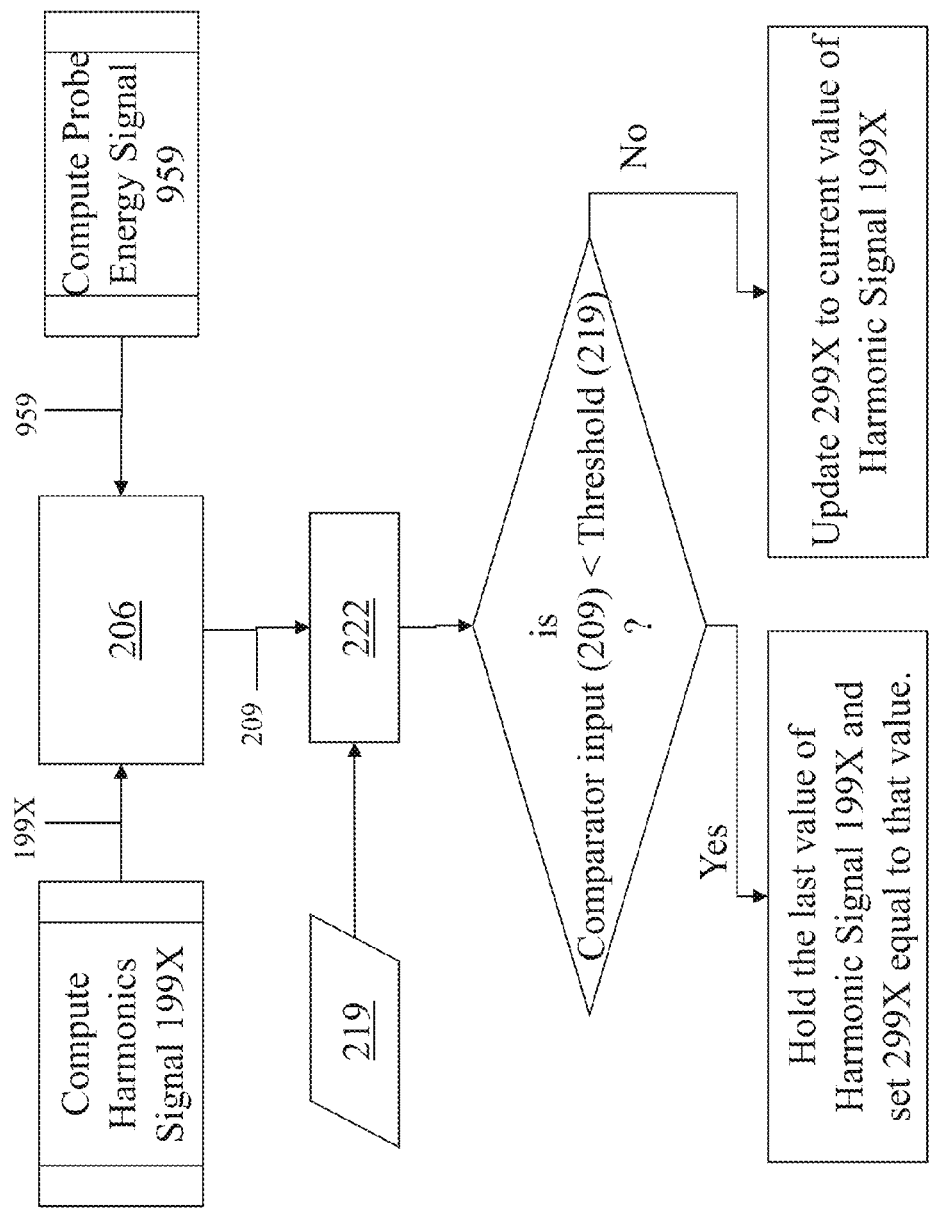
FIG. 8A is a flowchart describing in summary the function of an embodiment of the harmonic gating unit in accordance with the present disclosure.
Figure 8B:
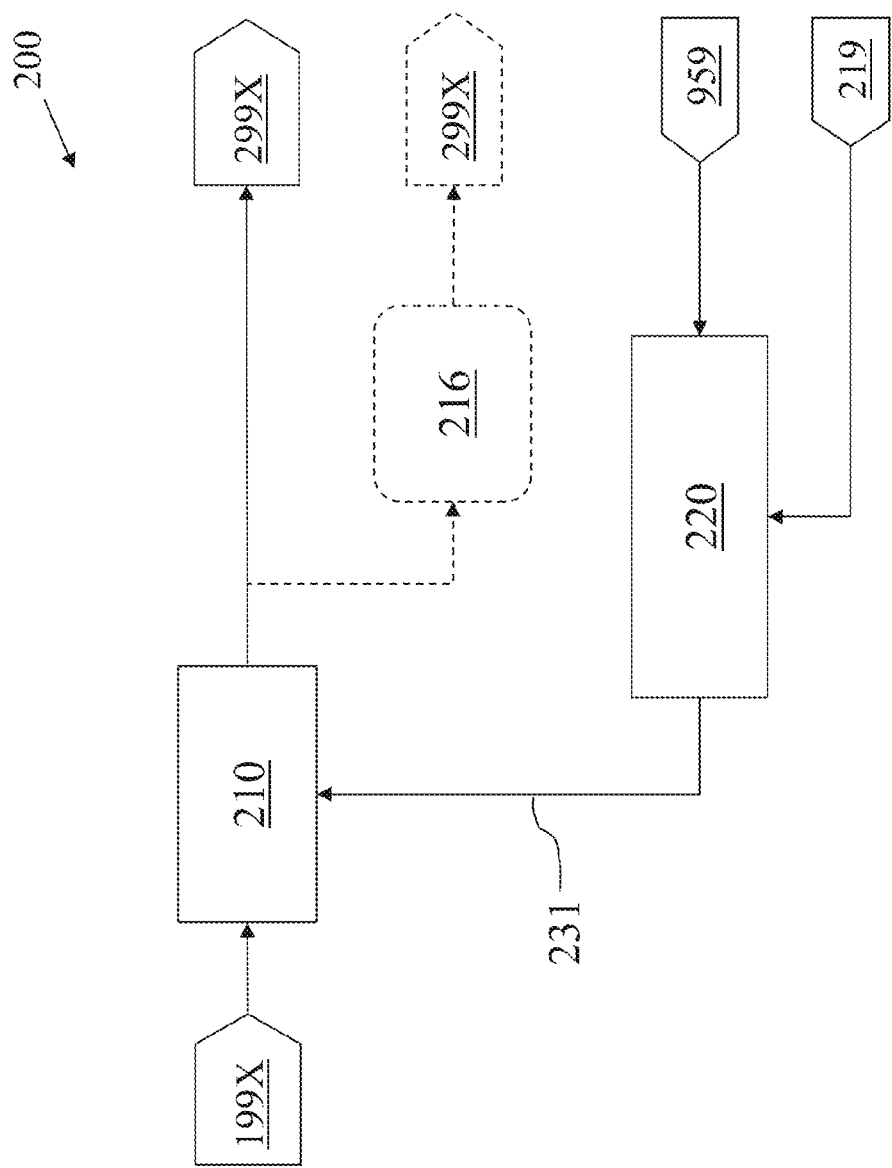
FIG. 8B is a simplified block diagram that shows an example embodiment of the harmonics gating unit in accordance with the present disclosure.

These tasks are accomplished in different parts of embodiments of the present disclosure, including in a harmonics-enabled controller 1000 and in a harmonics gating unit (HGU) 200 (FIG. 3). FIGS. 8A-8B illustrate one possible embodiment of the HGU 200 and its function. These figures are better understood when examined together with other figures herein, including but not limited to FIG. 3. The arrangement of the building blocks and their interconnections and the allocation of their respective functions and names are intended to illustrate some but not limit any embodiments of the harmonics-enabled controller 1000 and/or of the HGU 200 and/or of any embodiments of the present disclosure in general. It is to be understood that a given function allocated in these figures to a given block may be allocated to another block possibly with a different name in a different embodiment or even in the same embodiment.

In FIG. 3, the probe response signal 59 is converted by an energy extractor 90 into the signal 959 which is a measure of the energy of the probe response signal 59. The energy extractor 90 may be for example an RMS-to-DC converter, or a (positive or negative) peak detector, or a maximum absolute value detector (MAD), or a peak-to-peak detector, each optionally followed by a signal processing stage which may include scaling (gains) up or down and filtering. The output of this energy extractor 90 is the probe energy signal 959. To reiterate, in AM-AFM, for example in tapping mode and in multi-frequency AFM, the counterpart to this energy extractor takes on the form only of an RMS-to-DC converter.

In the HGU 200, the harmonics signal 199X is gated according to an algorithm based in part on the detailed implementation of the rest of the feedback scheme, for example on the detailed implementation of the harmonics feedback input signal synthesis performed in the harmonics feedback input signal synthesizer (HFIS) 300, to be discussed in a subsequent section below. At this point, it is necessary to describe the gating of the harmonics signal and its purpose.

Harmonics Gating Unit (HGU) 200

The function of the harmonics gating unit (HGU) 200 is to regulate how strongly at different times the harmonics signal 199X or a modified version of it is allowed to enter into various other components of an embodiment of the present disclosure, including but not limited to the components within the harmonics-enabled controller 1000. This function and/or the use of the HGU 200 is related to achieving one or more of the objectives enumerated in the earlier section entitled Harmonics-enabled Tip-sample Interaction Control.

For example, the harmonics gating unit 200 regulates how strongly at different times the harmonics signal 199X is allowed into the HFIS 300 to be used in the synthesis of the harmonics feedback input signal 399X as described later in this disclosure.

At any given time, the gated harmonics signal 299X, the output of the harmonic gating unit 200, is either the harmonics signal 199X at that time (herein also referred to as the present time); or the harmonics signal 199X at an earlier time with the duration of the delay determined by parameters which the human operator controls or which may be automated; or the harmonics signal 199X at the present time modified (e.g., amplified) with the modification algorithm (e.g., amplification factor) determined by parameters which the human operator controls or which may be automated. The function of the harmonic gating unit 200 may be understood better in the context of the following explanation:

The absolute strength of the harmonics signal 199X is reduced when detectable harmonics are diminished in the probe response signal 59. This happens in two situations. In the first, the strength of the probe response signal 59 is also diminished significantly, sometimes all the way down to the noise level. Barring total or near total loss of detector signal 25 due to misalignment or loss of laser light and instrument malfunction, this situation arises either when the tip is stuck to the sample surface or when the probe tip encounters a steep up-slope which is steep either intrinsically or perceived as such by the AFM feedback control scheme because of a fast scanning speed as described earlier. Probe oscillations including the harmonics are then forcefully suppressed, sometimes down to the noise level. In the second situation, the strength of the probe response signal 59 remains significantly larger than its noise level. In this second situation, the reduction in or the loss of the harmonics signal 199X is due to a reduction in the strength of the tip-sample interaction or due to the loss of tip-sample interaction, i.e., loss of tip-sample intermittent contact. Embodiments of the present disclosure discriminate the first situation from the second in part by measuring the energy of the probe response signal 59 at all times; this measurement is done in an energy extractor 90 (FIG. 3) which produces the probe energy signal 959.

Furthermore, embodiments of the present disclosure may make use of the harmonics gating unit (HGU) 200 to make this information actionable: at any given time, when the second situation is detected, i.e., when the harmonics signal 199X decreases but the probe energy signal 959 remains well above its noise level and above a threshold level (possibly adjustable by human operator), then the value of the harmonics signal 199X at that time is allowed to appear at an output port of the HGU 200 and to be incorporated as the gated harmonics signal 299X into the computations carried out in other components of a given embodiment of the present disclosure including some components of the harmonics-enabled controller 1000 such as the HFIS 300 which makes use of the gated harmonics signal 299X as will be detailed later in this disclosure. In this second situation, the gated harmonics signal 299X is the same or substantially the same as the harmonics signal 199X.

On the other hand, when the harmonics signal 199X is diminished and the probe energy signal 959 is also diminished below a threshold value (possibly adjustable the human operator), then the gated harmonics signal 299X is unequal (i.e., no longer equal) to the present value of the harmonics signal 199X. For example, the value of the gated harmonics signal 299X may be held constant at the last value of the harmonics signal 199X before the probe energy signal 959 dropped below the said threshold; the gated harmonics signal 299X is not allowed to update to the present value of the harmonics signal 199X until such time that the probe energy signal 959 recovers up to or above the said threshold value. The discrimination of the first situation from the second is done automatically, but the parameters for this automatic action may be adjusted by the human operator in software and/or in hardware.

The function of one embodiment of the HGU 200 is described in the flowchart diagram in FIG. 8A which shows the computed probe energy signal 959 and the computed harmonics signal 199X entering a comparator input generator 206. This unit computes an input signal 209 for the comparator 222; the input 209 to the comparator may be the probe energy signal 959 or it may be a signal synthesized by combining in some fashion the harmonics signal 199X and the probe energy signal 959. In the comparator 222, the comparator input 209 is compared with the value of a threshold signal 219 which may be adjustable by the human operator. Depending on the implementation of the comparator input 209, in the comparator 222 the threshold 219 may be subtracted from the comparator input 209 or vice-versa. For one example in which the comparator input 209 is the probe energy signal 959, when the level of this signal 959 drops below a threshold 219, the value of the gated harmonic signal 299X is held constant at the last value of the harmonics signal 199X before the comparator input 209 dropped below the said threshold 219; this value of the harmonics signal 199X is the gated harmonics signal 299X until such time that the comparator input 209 (in this example the probe energy signal 959) recovers to a value equal to or larger than the said threshold 219. In this example embodiment, when the comparator input 209 is larger than or equal to the threshold 219, the value of the gated harmonics signal 299X is continuously updated to the present value of the harmonics signal 199X.

One possible implementation of this example embodiment of the HGU 200 is illustrated in FIG. 8B, in which the harmonics signal 199X enters a sample-and-hold unit 210 whose trigger signal 231 is the output of a hard thresholding unit 220, whose inputs are the probe energy signal 959 and a hard threshold signal 219, which may be adjustable by the human operator. In the hard thresholding unit 220, in a comparator 222 (see also FIG. 8A) the probe energy signal 959 is compared to the hard threshold signal 219. The output of the comparator 222 is the trigger signal 231 for the sample-and-hold unit 210.

The output of the sample-and-hold 210 may need to be filtered including scaling (up or down) before being made available as the output 299X of the HGU 200; this is indicated by including the signal processing unit 216 in FIG. 8B. For example, in a harmonics signal generator 100 wherein the harmonics energy signal 979 is divided by the probe energy signal 959, the bandwidth of the resulting harmonic signal 199X may increase as compared with the bandwidth of the harmonics energy signal 979 or the bandwidth of the output of the lock-in amplifier. In such a case, the signal processing unit 216 may include a low-pass or band-pass filter. In some embodiments, this signal processing may precede the sample-and-hold stage (i.e., the harmonics signal 199X may enter the signal processing unit 216 before entering the sample-and-hold unit 210).

In contradistinction, the inventor has also observed that in general, filtering the probe energy signal 959 immediately prior to entering the HGU 200 may best be avoided if the probe energy signal 959 will include steps or impulses or other relatively sharp transitions, because depending on the implementation of the HGU 200, the oscillatory impulse response or step response of a filter may trigger (unwanted) multiple switching events of the sample-and-hold unit 210 in the HGU 200.

Other embodiments of the HGU 200 may have different implementations. A salient feature of the HGU 200 is to enable differentiation of the various conditions under which the harmonic signal 199X increases, decreases, and stays unchanged, and furthermore to act on this differentiation by implementing a gating of the harmonics signal 199X. For example, it is possible to implement a HGU 200 according to a different algorithm in which the gated signal is scaled up or down in a continuous fashion or in a discrete set of increments depending on the condition of the probe energy signal 959 in a larger context that may include, in addition to the probe energy signal 959 itself, at least one time derivative of the probe energy signal 959. Such an arrangement may then result for example in soft thresholding or incremental thresholding in contradistinction to the simple implementation illustrated above, in which the hard thresholding unit 220 takes account only of the strength of the probe energy signal 959. Another possible algorithm may make a switching from sampling to holding of the harmonics signal 199X conditional on the recent past behavior of both the harmonic signal 199X and a probe energy signal 959 and/or one or more of their time derivatives, with the human operator determining the algorithm parameters, including how far back in time the signals are to be monitored. For example, in an algorithm inspired by the data shown in Region 7 of FIG. 5A (see also FIGS. 5C-5D), when a positive first time derivative of a probe energy signal 959 indicating an increase of said signal coincides with an increase of a harmonics signal 199X and with a larger than a threshold positive first derivative of said harmonics signal 199, then a loss of tip-sample intermittent contact and the attendant parachuting may be prevented by substantially reducing the value of the gated harmonics signal 299X from the value of the said harmonics signal 199X. Such an algorithm and other similar algorithms can be implemented using logic circuits whose inputs may, for example, be a harmonics signal 199X and/or a probe energy signal 959 and/or various time derivatives of these signals.

Harmonics-enabled Controller 1000

Embodiments of the harmonics-enabled controller 1000 consist of several sub-units as exemplified below. These sub-units, including the and their respective functions may be combined or further sub-divided in various embodiments and given other names.

Setpoint Controller 350

Returning now to FIG. 3, the harmonics feedback input synthesizer (HFIS) 300 synthesizes the harmonics feedback input signal 399X. The HFIS 300 will be discussed in subsequent sections. Absent any input 299X (from the HGU 200), in the error signal controller 400 the harmonics feedback input signal 399X would be compared with the setpoint signal 375 coming from the setpoint controller 350. Absent input 299X from the HGU 200, the error signal controller 400 would produce an error signal 405 proportional to the difference between the harmonics feedback input signal 399X and the setpoint signal 375; the setpoint signal 375 may be subtracted from the harmonics feedback input signal 399X, or vice-versa depending on the relation of the harmonics feedback input signal 399X to the tip-sample interaction, and depending also on the definition and the implementation of the error signal 405 computation viz. the control algorithm implemented by the control algorithm unit (CAU) 410.

With input 299X from the HGU 200 however, the functions of the setpoint controller 350 and/or error signal controller 400 may be made to depend also on the gated harmonics signal 299X as described in the examples below.

In one embodiment of the present disclosure, the value of the setpoint signal 375 is controlled by the human operator directly and indirectly. In the direct method, the human operator enters in software (or possibly determines by hardware adjustment) the value for the setpoint signal 375. The indirect method involves automatic adjustments to the setpoint signal 375 controlled in part by the gated harmonics signal 299X. Via input into the harmonics gating unit HGU 200 and into the setpoint controller 350 the human operator determines the parameters for the automatic adjustments to the setpoint signal 375 as a result of changes in the gated harmonics signal 299X, and in this way also indirectly controls the value of the setpoint signal 375.

For example, the human operator may set the automatic adjustment parameters such that when parachuting occurs and is reflected in the harmonics signal 199X and/or the gated harmonics signal 299X, the setpoint signal 375 (and therefore the error signal 405) is automatically adjusted in a fashion that elicits from the control algorithm unit (CAU) 410 (to be discussed shortly) a change in the output 1089 of the CAU 410, and therefore, after the high voltage gains (HV Gains) 490, ultimately a change in the z-actuation signal 1099 to initiate and/or accelerate an action of the z-actuator 700 (FIG. 3), which action in this case is to approach the probe base 2 towards the sample stage 800 (or the sample stage 800 towards the probe base 2); this is intended to initiate and/or expedite a reduction of the distance "D" between the probe base 2 and the sample-stage 800 in order to re-instate tip-sample intermittent contact faster than it would be possible to do absent harmonics-enabled feedback methods of the present disclosure.

For another example, the human operator may set the automatic adjustment parameters such that when the gated harmonic signal 299X increases, the setpoint signal 375 (and therefore the error signal 405) is automatically adjusted in a fashion that elicits from the control algorithm unit (CAU) 410, a change in the z-output 1089 of the CAU 410 and therefore after the high voltage gains (HV Gains) 490, ultimately a change in the z-actuation signal 1099 to initiate and/or accelerate an action of the z-actuator 700, which action in this case is to retract the probe base 2 away from the sample stage 800 (or the sample stage 800 away from the probe base 2) or to decelerate an approach, and which is intended to initiate and/or expedite an increase of the distance "D" or decelerate a decrease of the distance "D" between the probe base 2 and the sample-stage 800 in order to control the tip-sample interaction better than it would be possible to do absent harmonics-enabled feedback methods of the present disclosure. The adjustments described in the two examples just discussed may be implemented in the same embodiment.

Error Signal Generator 400

In a similar way, in another embodiment of the present disclosure, a desired change in the error signal 405 may be obtained in an alternate scheme where the human operator exercises indirect control over the synthesis of the error signal 405 in the error signal controller 400, in which case the gated harmonics signal 299X is also routed into the error signal controller 400 as indicated in FIG. 3. For example, the human operator may set automatic adjustment parameters for the error signal controller 400 such that when parachuting occurs and is reflected in the harmonics signal 199X and/or the gated harmonics signal 299X, the error signal 405 is automatically adjusted in a fashion that elicits from the control algorithm unit (CAU) 410 (to be discussed shortly) a change in the output 1089 of the CAU 410, and therefore, after the high voltage gains (HV Gains) 490, ultimately a change in the z-actuation signal 1099 to initiate and/or accelerate an action of the z-actuator 700, which action in this case is to approach the probe base 2 towards the sample stage 800 (or the sample stage 800 towards the probe base 2); this is intended to initiate and/or expedite a reduction of the distance "D" between the probe base 2 and the sample-stage 800 in order to re-instate tip-sample intermittent contact faster than it would be possible to do absent harmonics-enabled feedback methods of the present disclosure.

For another example, the human operator may set the automatic adjustment parameters such that when the gated harmonic signal 299X increases, the error signal 405 is automatically adjusted in a fashion that elicits from the control algorithm unit (CAU) 410 a change in the output 1089 of the CAU 410, and therefore, after the high voltage gains (HV Gains) 490, ultimately a change in the z-actuation signal 1099 to initiate and/or accelerate an action of the z-actuator 700, which action in this case is to retract the probe base 2 away from the sample stage 800 (or the sample stage 800 away from the probe base 2) or to decelerate an approach, and which is intended to initiate and/or expedite an increase of the distance "D" or decelerate a decrease of the distance "D" between the probe base 2 and the sample-stage 800 in order to control the tip-sample interaction better than it would be possible to do absent harmonics-enabled feedback methods of the present disclosure. The adjustments described in the two examples just discussed may be implemented in the same embodiment.

The adjustments described in the two examples just discussed may be implemented in the same embodiment.

xy, z Control Algorithm Unit (CAU) 410

The output of the error signal controller 400 is the error signal 405, which enters the control algorithm unit (CAU) 410. The CAU 410 typically implements gains on the error signal 405 according to a proportional-integral (PI) algorithm or a proportional-integral-differential (PID) algorithm, but more complex alternatives such as model-based predictive algorithms may be used in the harmonics-enabled feedback schemes of embodiments of the present disclosure.

In another embodiment of the present disclosure, the parameters that determine the output of the CAU 410 are under direct and indirect control of the human operator similarly to that described for the setpoint controller 350 and the error signal controller 400. Since many control algorithms are possible, many different methods are also possible to enable such algorithms in-whole or in-part using harmonics. The following example is discussed in the context of some conventional feedback control algorithms currently in use in AFM. The example is to illustrate but not to limit the possible embodiments of the CAU 410 enabled in-part or in-whole by harmonics.

In the case of a PI or PID algorithm, for example, the various gains (proportional gain, integral gain, and differential gain) are set by the human operator (direct control), and may also be subject to automatic adjustment determined in part by the gated harmonics signal 299X, which also is an input to the CAU 410 (FIG. 3). The human operator determines the parameters for this automatic adjustment, and therefore also controls the gains indirectly by making the gated harmonics signal 299X relevant to the operation of the CAU 410.

For a more specific example relating to the gains of a PI or a PID algorithm, the human operator may set the harmonics-enabled automatic adjustment parameters such that when parachuting occurs and is detected in the harmonics signal 199X and/or the gated harmonics signal 299X, any one or more of the gains are automatically adjusted so as to elicit a change in the output signal 1089 of the CAU 410, and therefore, after the high voltage gains (HV Gains) 490, ultimately a change in the z-actuation signal 1099, to initiate and/or accelerate an action of the z-actuator 700, which action in this case is to approach the probe base 2 towards the sample stage 800 (or the sample stage 800 towards the probe base 2); this is intended to initiate and/or expedite a decrease of the distance "D" between the probe base 2 and the sample-stage 800 in order to re-instate tip-sample intermittent contact faster than it would be re-instated without harmonics-enabled feedback methods of the present disclosure.

Similarly, in another example relating to the gains of a PI or a PID algorithm, the human operator may set the harmonics signal-controlled automatic adjustment parameters such that when the gated harmonic signal 299X increases, any one or more of the gains (proportional, differential, integral) is automatically adjusted in a fashion that elicits from the control algorithm unit (CAU) 410 a change in the output 1089, and therefore, after the high voltage gains (HV Gains) 490, ultimately a change in the z-actuation signal 1099 to initiate and/or accelerate an action of the z-actuator 700, which action in this case is to retract the probe base 2 away from the sample stage 800 (or the sample stage 800 away from the probe base 2) or to decelerate an approach, and which is intended to initiate and/or expedite an increase of the distance "D" or decelerate a decrease of the distance "D" between the probe base 2 and the sample-stage 800 in order to control the tip-sample interaction better than it would be possible to do absent harmonics-enabled feedback methods of the present disclosure. The adjustments described in the two examples just discussed may be implemented in the same embodiment.

The adjustments described in the two examples just discussed may be implemented in the same embodiment.

Probe Drive Signal Controller 5

In another embodiment of the present disclosure, the human operator controls the probe drive signal 5 directly and also indirectly via the gated harmonics signal 299X. The human operator chooses and directly sets in software (and/or possibly with hardware control) the characteristics of the probe drive signal 5 such as amplitude, frequency composition, and phase composition; this is direct control. The human operator also sets the parameters which determine how in the probe drive signal controller 500 the gated harmonics signal 299X is used to make automatic adjustments to the characteristics of the probe drive signal 5.

For example, the human operator may set the harmonics-enabled automatic adjustment parameters of the probe drive signal controller 500 such that when parachuting occurs and is detected in the harmonics signal 199X and/or the gated harmonics signal 299X, the amplitude of the probe drive signal 5 is increased so as to elicit a change ultimately in the z-actuation signal 1099 to initiate and/or accelerate the action of the z-actuator 700, which action in this case is to approach the probe base 2 towards the sample stage 800 (or the sample stage 800 towards the probe base 2; this is intended to reduce more quickly the distance "D" between the probe base 2 and the sample-stage 800 in order to re-instate tip-sample intermittent contact faster than it would be re-instated without harmonics-enabled feedback methods of the present disclosure.

In the same or another embodiment, the human operator may set the harmonics signal-controlled automatic adjustment parameters of the probe drive signal controller 500 such that when the gated harmonic signal 299X increases, the amplitude of the probe drive signal 5 is decreased so as to elicit a change ultimately in the z-actuation signal 1099 to initiate and/or accelerate an action of the z-actuator 700, which action in this case is to retract the probe base 2 away from the sample stage 800 (or the sample stage 800 away from the probe base 2) or to decelerate an approach, and which is intended to initiate and/or expedite an increase of the distance "D" or decelerate a decrease of the distance "D" between the probe base 2 and the sample-stage 800 in order to control the tip-sample interaction better than it would be possible to do absent harmonics-enabled feedback methods of the present disclosure. The adjustments described in the two examples just discussed may be implemented in the same embodiment.

The adjustments described in the two examples just discussed may be implemented in the same embodiment.

Combined Action of Multiple Units

In embodiments of the present disclosure, harmonics-enabled feedback control as described above of the setpoint signal 375, and/or of the error signal 405, and/or of the feedback output signal 1089 of the CAU 410, and/or of the probe drive signal 5 may be implemented together concurrently and/or sequentially.

Harmonics Feedback Input Signal Synthesizer (HFIS) 300 and Example Embodiment 1

The HFIS 300 synthesizes the harmonics feedback input signal 399X to be used in the feedback control of the tip-sample interaction (FIG. 3). Embodiments of the HFIS 300 have at least one of the following features that are absent in the counterparts of the HFIS 300 in conventional oscillating probe mode AFM, including tapping mode AFM and multi-frequency AFM: 1) The HFIS 300 synthesizes in-part or independently from a probe response signal 59 a feedback input signal 399X that indicates the presence, absence, and changes of select harmonics more strongly and sometimes more promptly than does a probe energy signal 959, such as the RMS amplitude of oscillations, indicative of the energy of the same probe response signal 59; and 2) the HFIS 300 gives the human operator choices for and control over this synthesis. To recall, the harmonics are frequently more exclusively than the probe response signal 59 carriers of information about tip-sample intermittent contact.

The contrast is elucidated by considering the counterpart of the HFIS 300 in tapping mode AFM as an example. That counterpart produces the RMS amplitude of probe oscillations whole, to which the contribution of the harmonics and sub-harmonics are usually at least an order of magnitude smaller than the contribution of the oscillations at the frequency driven substantially and directly by the probe drive signal 5 and whose relative changes are frequently less strongly and less promptly discriminant of the presence, absence, and changes of tip-sample interaction as detailed in FIGS. 5A through 5D and the accompanying text. The contrast is further elucidated by considering the counterpart of the HFIS 300 in multi-frequency AFM as another example. That counterpart is similar to the one in tapping mode AFM but instead of a single frequency, multiple frequencies are driven by the probe drive signal 5; the RMS amplitude of probe oscillations whole (unaltered by intentional manipulation with extracted harmonics) is the counterpart to HFIS 300.

As described and illustrated in detail in these pages and in print and online literature and media elsewhere, under the right conditions, some harmonics are carriers of information nearly exclusively about the tip-sample interaction, which is the main entity that AFM is supposed to control. The said right conditions are nearly always found by using a probe whose characteristics (spring constant, resonance frequency, Q, etc.) are suitable for the given application at hand, which is often primarily defined by the material characteristics of the sample surface. The matching of the probe to the application and to sample surface properties is not new in AFM. In embodiments of the present disclosure, however, this matching serves the additional purpose of facilitating better and faster discrimination between the presence and absence of harmonics and better and/or faster control of tip-sample interaction. With the right probe selected, in various embodiments of the HFIS 300 in different embodiments of the present disclosure, and in contradistinction to conventional dynamic mode AFM including AM-AFM including tapping mode AFM and multi-frequency AFM, the human operator not only can choose which harmonics are to be incorporated into the synthesis of the HFIS 300 output, the harmonics feedback input signal 399X; but also how (according to what algorithm), how much, when, and under what conditions each selected harmonic plays into the synthesis of the harmonics feedback input signal 399X.

Embodiments of the HFIS 300 may have any one or more of the following features: Firstly, an embodiment of HFIS 300 creates an output signal 399X whose characteristics may be defined and adjusted by the human operator to represent the presence, absence, and/or changes of various harmonics selected by the human operator more strongly and more selectively than they are represented in the probe oscillations whole, represented by the probe response signal 59 and by the probe energy signal 959. Secondly, this process of incorporating harmonics into the synthesis of the output signal 399X more strongly and selectively than they are embedded in probe oscillations whole may involve one or more mathematical operations carried out on the signals involved; some of these operations may be linear, some nonlinear as will be illustrated in example embodiments of HFIS 300. Thirdly, the said defining and adjustment of the said characteristics including the said mathematical operations involve signal processing steps many if not all of which may be carried out in part or in whole in analog form or in digital form or in mixed-mode (partly analog, partly digital). Finally, a particular formulation of the HFIS 399X and/or a particular implementation of that formulation may be made the default and inflexible or substantially inflexible part of the harmonics-enabled feedback so as to deliberately reduce the options for a human operator involvement in defining the feedback parameters, for example in a setting where automated measurements may be desired, for example in semiconductor and data storage manufacturing. Such deliberately limited embodiments are also possible, but by no means define the boundaries nor limit the scope of the present disclosure; nor do such embodiments fall outside the scope of the present disclosure by virtue of being made deliberately limited in the choices they provide the human operator.

By way of illustration though not limitation, several embodiments of the HFIS 300 are described next. The example embodiments of HFIS listed and described below are to be understood as illustrating but not limiting the embodiments of the disclosure, nor limiting the embodiments of the harmonics feedback input signal synthesizer HFIS 300.

HFIS 300 Example Embodiment

Figure 9A:
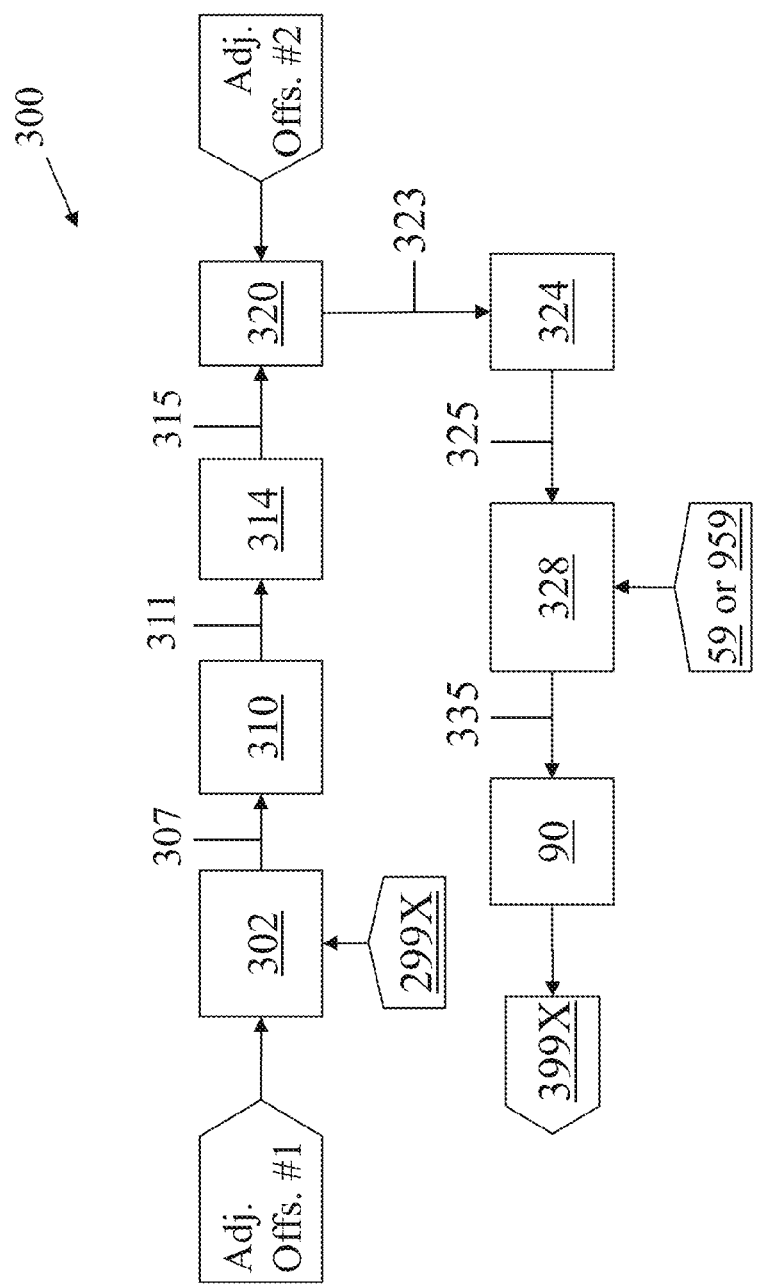
FIG. 9A is a simplified block diagram illustrating components and signal flow in a harmonics feedback input signal synthesizer.

The example embodiment 300 of HFIS, illustrated in FIG. 9A, operates such that when the signal 399X, the harmonics feedback input signal generated by the HFIS 300, decreases, the distance "D" (FIG. 3) between the probe base 2 and the sample stage 800 is increased to pull the probe base 2 and the sample stage 800 apart; when the harmonics feedback input signal 399X increases, the distance "D" is decreased to bring the probe base 2 and the sample stage 800 nearer to each other. This arrangement makes comparisons with AM-AFM including tapping mode AFM and multi-frequency AFM easier. However, the feedback input signals in AM-AFM differ from feedback input signals of embodiments of the present disclosure as exemplified in the HFIS 300 and as detailed below, and as exemplified further in other embodiments described afterwards.

Several figures including FIGS. 9A, 9B, 3, 8A, and 8B collectively but not exclusively describe one way the HFIS 300 may be incorporated into and function within the larger structure of an embodiment of the present disclosure.

Figure 9B:
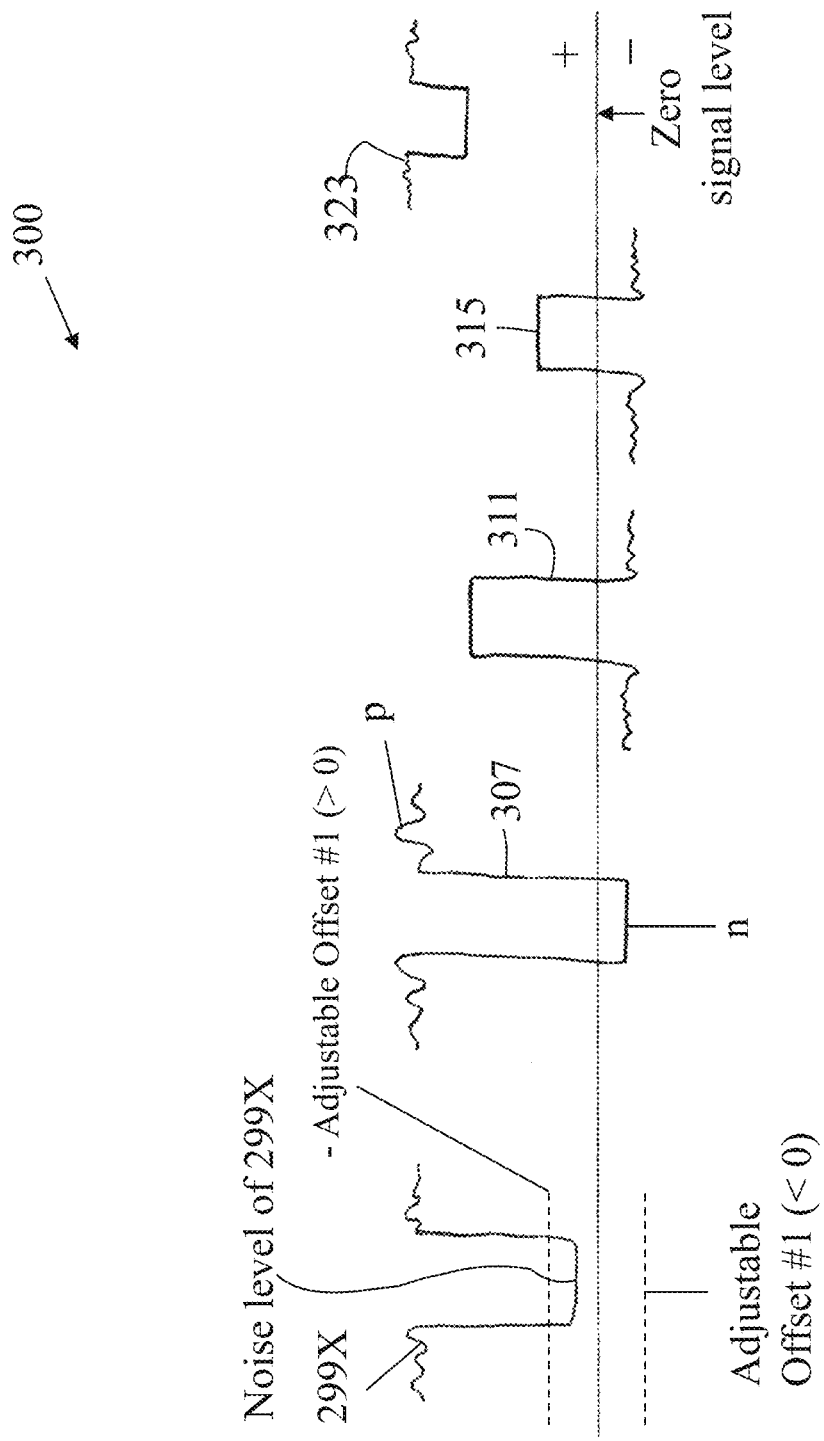
FIG. 9B shows drawings illustrating approximate shape transformations of some wave forms of signals pertaining to FIG. 9A and some of the related signal levels including the zero signal level.

Referring to FIG. 9A-9B, an analog, intended to be positive-definite polarity i.e., positive or zero valued, gated harmonics signal 299X is added in an analog weighted adder 302 to an adjustable DC offset signal of negative polarity herein called Adjustable Offset #1. An example of the implementation of such an analog weighted adder 302 is an operational amplifier inverting summing circuit followed by an inverter. The starting value for the strength of the Adjustable Offset #1 can be slightly larger than the noise level of the gated harmonics signal 299X prior to engaging the tip and the sample, i.e., while the probe 4 and the sample 10 are far apart, but with the polarity switched to negative. This is illustrated in the drawings of signals in FIG. 9B as "Adjustable Offset #1 (<0)". The Adjustable Offset #1 can be adjusted away from this starting value to make more effective the functioning of the rest of the embodiment, described next.

Figure 9C:
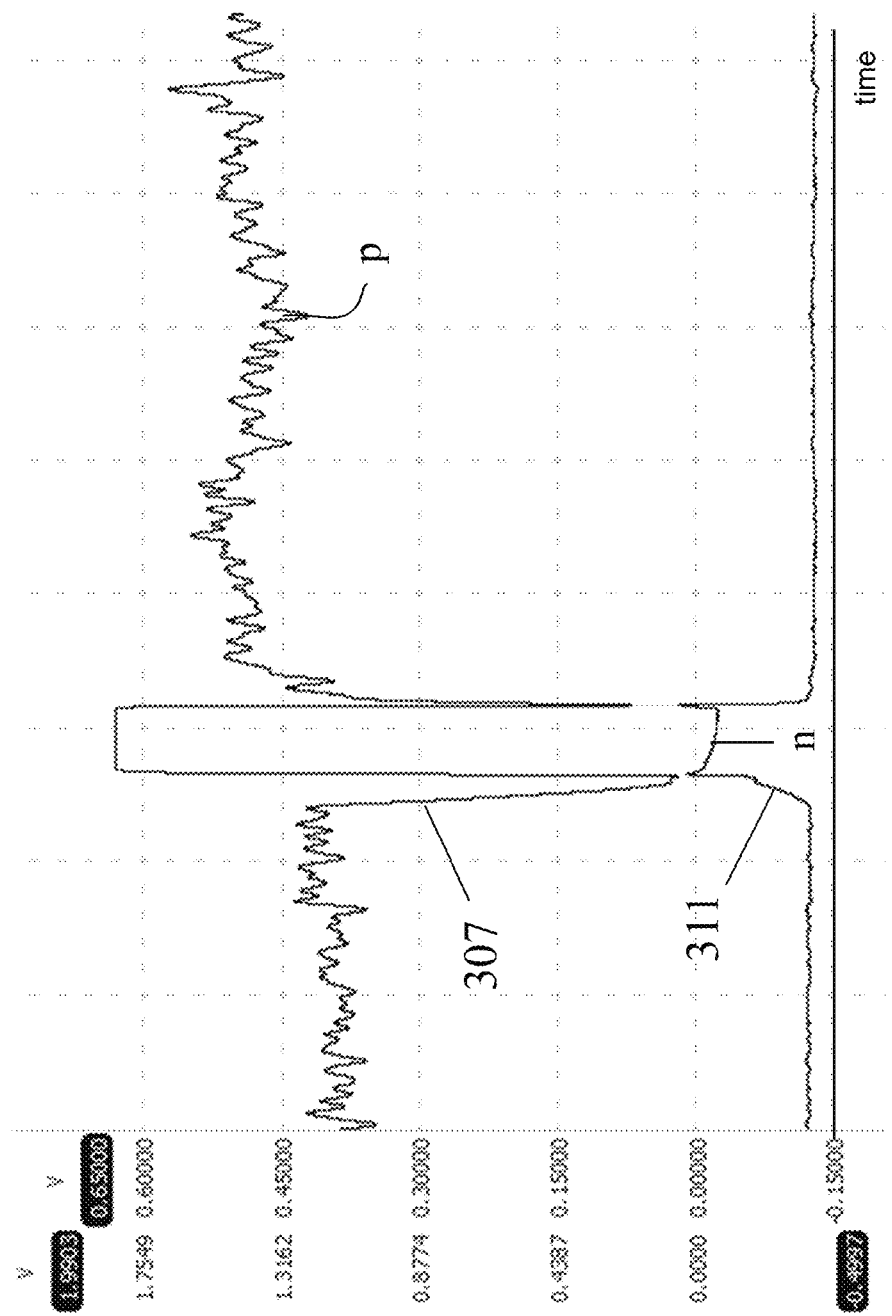
FIG. 9C is experimental data depicting the input and output of the analog log converter 310 in FIG. 9A

By adjusting the Adjustable Offset #1 and by adjusting in the weighted adder 302 the weights of the gated harmonic signal 299X and of the Adjustable Offset #1, the resulting sum signal denoted as signal 307 in FIGS. 9A-9B can be made to take on negative values as indicated in FIG. 9B by letter "n" when tip-sample intermittent contact is absent (i.e., when 299X is at or near its noise level) and positive values as indicated by letter "p" when tip-sample intermittent contact is present; these indications are also used in FIG. 9C. This bi-polar signal 307 is used as the input signal to an analog log converter circuit 310 in FIG. 9A. (A log converter is sometimes called a log amplifier).

The analog log converter circuit has numerous implementations designed to address certain undesirable characteristics (notably temperature sensitivity and saturation of the pn-junction-diode in reverse bias) of its simple implementation that employs only an operational amplified, a diode, and a resistor (illustrated widely in analog circuit design literature). The essential relevant function of the simplest as well as of such other refined implementations is described by the dual Equations 2 relating the input voltage $V_{in}$ to the output voltage $V_{out}$. The generic form of this function is adequately relevant to describing several features of this embodiment of the HFIS.

$$V_{out} = -V_{thermal} \ln\left(\frac{V_{in}}{I_S R}\right) \text{ when } V_{in} > 0;$$

$$V_{out} = V_0 > 0 \text{ when } V_{in} < 0.$$

Equations 2

Except for values very close to zero, negative values of the input 307 ($V_{in}$) to the analog log converter 310 circuit result in a constant positive value $V_0$ of the output signal 311 ($V_{out}$). This value is close to the positive power supply voltage ($V_+$) that powers the operational amplifier and comes about as the diode in the log converter becomes saturated in reverse bias (i.e., when $V_{in}$<0). Positive values of the input 307 to this log converter 310 result in negative values of the output 311; they are proportional to the positive values of the input 307 log-converted but their polarity is switched (from positive to negative) as described by Equations 2. These features are seen in the experimental results obtained from this embodiment of the HFIS 300, and are shown in FIG. 9C which shows both the negative-valued compact (small) modulations of the output 311 when the tip-sample interaction is present and the constant positive value ($V_0$) of the output 311 when tip-sample interaction is absent (negative-valued modulations are quite small in this figure, but they are present). The resistance value R of the sole resistor in the simplest implementation of the log converter circuit is at the discretion of the circuit designer. The analog log converter is seen here to achieve objective number 1 as described in the opening paragraphs of the section entitled Harmonics-enabled Tip-sample Interaction Control.

In the positive limiter 314, the positive values of the output 311 of the log converter 310 are limited to an upper limit, but the negative values are unchanged. This same limiting function may be implemented by using a version of the operational amplifier that functions at low positive voltages in which case the said upper limit is at or near a low positive power supply voltage ($V_+$) powering the operational amplifier; then the limiter 314 may be obviated. The output 315 of the limiter 314 is weight-added in a second analog weighted adder 320 to a second adjustable offset signal herein called Adjustable Offset #2. This offset and this weighted addition are implemented such that the result of the addition is intended to render the polarity of the output signal 323 always positive. Furthermore, this addition is implemented such that the parts of this output 323 that correspond to the positive values of the output 311 of the log converter 310 are smaller than the parts that correspond to negative values of the output 311 of the log converter 310; in other words, the shape of the signal 315 is flipped (vertically) but note that negative values (present in 311 and 315) are no longer present in 323; this is illustrated in the signal drawings in FIG. 9B. In generating its output 323, the weighted adder 320 can also expand or compact the modulations and dynamic range present in 315. A relatively simple way to implement this stage is to set the Adjustable Offset #2 to a negative value and to use an operational amplifier inverting summing circuit for the weighted adder 320.

Figure 9D:
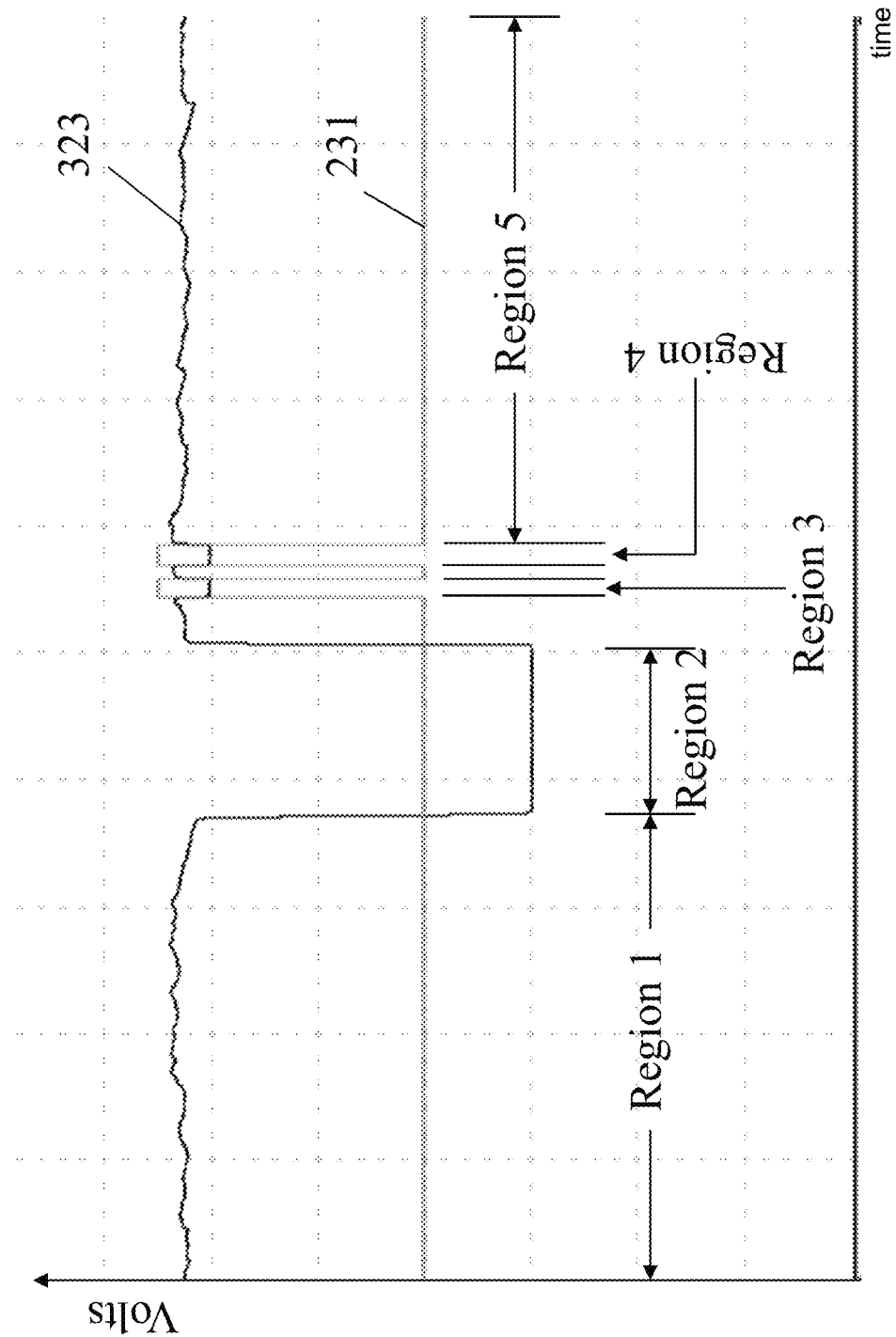
FIG. 9D is experimental data showing the output 323 of the second weighted adder 320 in a harmonics feedback input signal synthesizer 300 depicted in FIG. 9A, and the trigger signal 231 of an embodiment of a harmonic gating unit as illustrated in FIG. 8B.

In another example of experimental data seen in FIG. 9D, Region 2 of signal 323 is where the corresponding signal 311 (and 315) were positive, and the other regions of signal 323 are where the corresponding signal 311 (and 315) were negative. The other signal plotted in FIG. 9D is the trigger signal 231 that controls the sample-and-hold 210 in an embodiment of the HGU 200 illustrated in FIG. 8A and FIG. 8B. For the sample-and-hold circuit used here, when the trigger signal 231 is low, the sample-and-hold 210 samples the harmonic signal 199X continuously in real-time and the gated harmonic signal 299X is updated in real time to the current value of the harmonics signal 199, and all signals in the subsequent stages including signal 323 reflect this updating. When the trigger signal 231 goes high as seen in Region 3 and Region 4 in FIG. 9D, the sample-and-hold circuit 210 holds the last value of the harmonic signal 199X before the state of the trigger signal 231 switched, i.e., before the zero crossing of the difference signal which is signal 209 minus signal 219 in FIG. 8A (which here is the same as the difference signal probe energy signal 959 minus the hard threshold signal 219 as these signals are indicated in FIG. 8A and FIG. 8B). (We recall that in general, and unlike in this example, the signal denoted 209 as the input to the comparator 222 in FIG. 8A may be based on both the probe energy signal 959 and the harmonics signal 199X as discussed earlier in the section describing the HGU 200.)

In FIG. 9D, the modulations in the range of the larger values of the output 323 of the weighted adder 320, for example in Regions 1 and 5, have their origin in and correspond to the changes in the tip-sample intermittent interaction (intermittent contact) when the tip continuously or mostly continuously tracks the sample surface. These modulations also include sections that are constant as seen in Regions 3 and 4 which will be discussed below. In this example, the said modulations cover a relatively narrow range compared to the full dynamic range of this signal 323. The dynamic range may however be modified (made smaller or larger and/or offset up or down) depending on the application at hand and the desired performance from an embodiment of the present disclosure to address the said application. This flexibility, to be described further below, is herein only illustrated, but not to be limited by, this specific example embodiment of the HFIS 300.

The smallest (constant) value of 323 seen in Region 2 of FIG. 9D appears at the times when two conditions hold simultaneously: The first condition is that the harmonics signal 199X is at or near to its minimum, the value which it has when the probe and the sample are far apart (i.e., when there is no tip-sample intermittent contact); in other words when the harmonic energy signal 979 is at or near to its noise level. The second condition is that the probe energy signal 959 is well above its noise level and above threshold 219. This combination of conditions indicates parachuting; the tip has lost intermittent contact with and is no longer tracking the sample surface.

In Regions 3 and 4 of FIG. 9D, however, a different situation exists. The probe energy signal 959 (which in this example embodiment is the same as the comparator input 209) has dropped below the level of the hard threshold 219 of the embodiment of the HGU 200 illustrated in FIG. 8A and FIG. 8B; therefore, the gated harmonic signal 299X no longer updates to the current value of the harmonics signal 199; rather, its last value prior to the zero-crossing of the difference signal 959 minus signal 219 is held; the gated harmonics signal 299X is held constant at the level it had just prior to the zero crossing of the said difference signal. If the values of the probe energy signal 959 that correspond to the tip tracking the sample surface are not too close to the noise level of this signal (959), and if the threshold 219 is not set too closely to the values of the probe energy signal 959 corresponding to the tip tracking the surface, then the drop of the probe energy signal 959 below the threshold 219 corresponds to the times when this embodiment functions as if the tip has encountered a steep up-slope as defined earlier (or the tip has encountered some other thing or agent) which suppresses the totality of the probe oscillations and with it the harmonics.

The updating of the gated harmonics signal 299X resumes when the reverse zero crossing takes place; i.e., when the probe energy signal 959 rises above the threshold signal 219.

Referring again to FIG. 9A (and also FIG. 9B), the scheme just described prevents the output 335 of the divider 328, to be discussed below, from becoming very large as a consequence of the denominator 325 becoming very small. This is necessary because otherwise, the input 399X to the feedback loop becomes very large and prompts the distance "D" to be reduced further, and this in turn can push the tip harder into the sample surface, which is clearly an undesirable result.

Between the log converter 310 and signal processor 324, the dynamic range of the signal 323 can be adjusted by increasing or decreasing the Adjustable Offset #2, and/or by increasing or decreasing the output 315 of the limiter 314, and/or by changing the weight of each component being added in the weighted adder 320.

The output signal 323 of the second weighted adder 320 may be subjected to additional processing such as filtering and scaling in the signal processor 324 the output 325 of which enters as the denominator into an analog divider 328 the numerator of which is the probe response signal 59 (or the probe energy signal 959 as will be described in another embodiment).

The output 335 of the divider 328 is here seen to be the probe response signal 59 (or the probe energy signal 959 in another embodiment to be discussed below) modified to make the tip-sample intermittent interaction, via select harmonics, more strongly relevant to the feedback input signal and therefore more strongly relevant to the feedback operation tasked with controlling the tip-sample interaction.

Figure 9E:
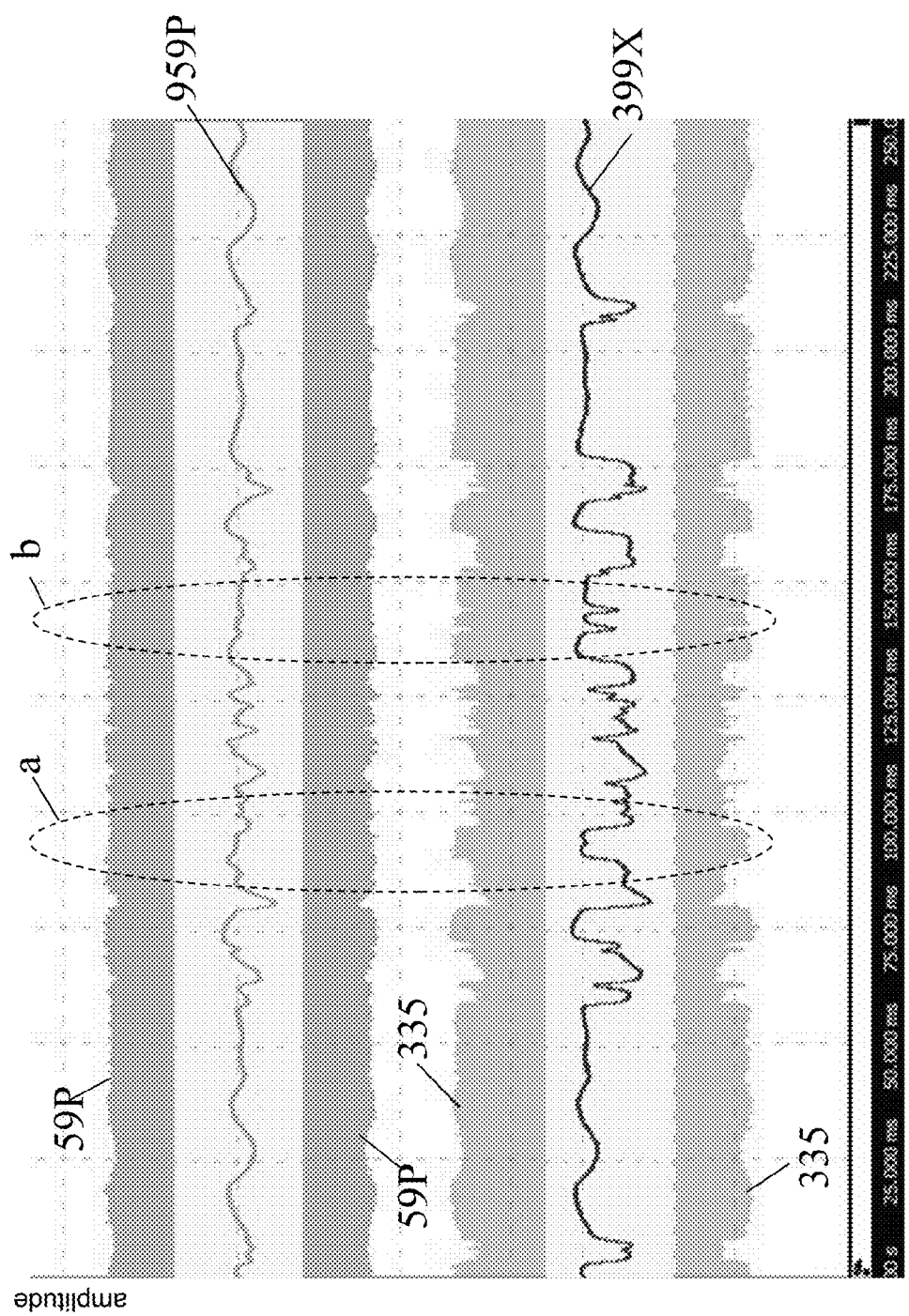
FIG. 9E shows a prior art probe response signal 59P and (with the middle section removed to make room for) the corresponding probe energy signal 959; and the output 335 of the divider 328 in the example embodiment harmonics feedback input synthesizer 300 depicted in FIG. 9A and FIG. 9B and (with the middle section removed to make room for) the corresponding harmonic signal 399X.

FIG. 9E shows an example of a probe response signal 59 and an example of the output signal 335 of the divider 328 in FIG. 9A whose numerator is the said example probe response signal 59 and whose denominator is a gated harmonics signal 299X.

The data in FIG. 9E were captured when harmonics contribution to the feedback operation of the AFM was absent, although a would-be harmonic feedback input signal 399X was also obtained; the feedback input signal used was the probe energy signal 959P which means that the AFM was operated in tapping mode feedback (AM-AFM) as illustrated in FIG. 1; while the output 335 of the divider 328 was also computed in HFIS 300 as described above and further below and as depicted in FIG. 9A and FIG. 9B, and also using the harmonic gating using depicted in FIG. 8A and FIG. 8B.

This is experimental data obtained with an embodiment of the present disclosure which uses the HFIS 300, the harmonic signal generator 100, and the HGU 200 as described in FIG. 8A and FIG. 8B. The harmonic signal 199X in this experiment was synthesized in part by extracting from said example probe response signal 59P oscillations at the sixth harmonic of the (sole) prominent frequency of a sinusoidal probe drive signal 5 that drove a rectangular cantilever AFM probe, which frequency nearly coincided with the said probe's lowest transverse oscillation eigenfrequency (first eigenfrequency f1 in FIGS. 4A-4B), and by amplifying said extracted harmonic by the harmonics signal generator 100 as described above; the frequency of the said sixth harmonic was close to the said probe's second lowest transverse oscillation eigenfrequency (second eigenfrequency f2 in FIGS. 4A-4B). FIGS. 4A-4B show a similar relationship between frequencies as described in this example. In FIGS. 4A-FIG. 4B, f1 and f2 are the first and second resonant frequencies (eigenfrequencies) of the AFM probe used. The AFM cantilever is driven at its first resonant frequency f1. In the absence of tip-sample interaction (when tip and sample are far apart) the second resonance around f2 is also visible at a very low amplitude. The contribution at the higher harmonics is visible only at frequencies 2f1 and 3f1. When intermittent tip-sample contact is established, however, several new higher harmonics of f1 appear, namely 4f1, 5f1, 6f1, 7f1, 8f1, and 9f1, with the sixth harmonic at 6f1 considerably amplified as it is the closest to the second eigenfrequency f2.

The output 335 of the divider 328 enters the energy extractor 90 which in this example is an RMS-to-DC converter, but other measures of signal energy may be measured in the energy extractor 90 and substituted for the RMS amplitude. The output of this energy converter 90 is the harmonics feedback input signal 399X. An example of the harmonics feedback input signal 399X computed from the example of the probe response signal 59P depicted in FIG. 9E is also shown in this same figure (FIG. 9E). This example of signal 399X is to be compared with the corresponding probe energy signal 959P of prior art shown in the same FIG. 9E which in this example is the RMS amplitude of the example of the probe response signal 59P depicted, and which is computed with a same embodiment of the energy converter 90 that computed the example signal 399X.

The synthesized harmonics feedback input signal 399X achieves all the objectives enumerated in the opening paragraph of the section entitled Harmonics-enabled Tip-sample Interaction Control. It is also more strongly than the probe energy signal 959 representative of the changes of select harmonics and therefore of the changes of the tip-sample intermittent interaction in intermittent contact as indicated by those harmonics.

The output signal 399X of this embodiment of HFIS 300 is such that if other feedback control parameters are kept unchanged; then 1) when tip-sample intermittent contact is lost, smaller values of 199X (and of the gated harmonics signal 299X) and eventually smaller values of the denominator 325 result in larger values of the harmonics feedback input signal 399X; furthermore, 2) since a loss of intermittent contact is often detected earlier and more strongly in the changes of the harmonics than in the changes of the probe response signal 59 (FIG. 5A and FIG. 5B), the resulting harmonics feedback input signal 399X of this embodiment of HFIS 300 often reflects this loss faster than does a feedback input signal such as a probe energy signal 959, for example the RMS amplitude of 59, or for example 959P, which would be the RMS amplitude of 59P in tapping mode AFM illustrated in FIG. 1. Referring now to FIG. 3, in a given period of time, these two effects bring about a larger and faster change in the error signal 405 (assuming setpoint 375 remains unchanged) and a more agile feedback reduction of the distance "D" between the probe base 2 and the sample stage 800 than is possible during the same period of time without the use of the harmonics as described here. 3) When tip-sample intermittent contact is present and probe energy signal 959 remains larger than the threshold 219 (FIG. 8A and FIG. 8B), smaller values of the gated harmonics signal 299X and eventually smaller values of the denominator 325 result in larger values of the harmonics feedback input signal 399X even if the probe energy signal 959 and/or the probe response signal 59 change by inconsequentially small amounts; thus in a given duration of time, the distance "D" is decreased or decreased more than it would decrease in that same duration of time in the absence of harmonics-enabled feedback as described here. 4) When tip-sample intermittent contact is present and probe energy signal 959 remains larger than the threshold 219, larger values of the gated harmonics signal 299X and eventually larger values of the denominator 325 result in smaller values of the harmonics feedback input signal 399X even if the probe energy signal 959 and/or the probe response signal 59 change by inconsequentially small amounts; thus in a given duration of time, the distance "D" is increased or increased more than it would increase in that same duration of time in the absence of harmonics-enabled feedback.

Referring again to FIG. 3 and defining the error signal 405 for this embodiment example as the setpoint 375 minus the harmonics feedback input signal 399X, we note that this error signal may be negative, zero, or positive. For a given value of the setpoint signal 375, when the gated harmonics signal 299X decreases, the error signal 405 decreases (taking into account the polarity of the error signal); when the gated harmonics signal 299X increases, the error signal 405 increases (taking into account the polarity of the error signal). These changes elicit from the feedback scheme a response that is no longer to changes in the totality of the probe oscillations indicated by the probe response signal 59 or by the probe energy signal 959, but to changes in the harmonics feedback input signal 399X which represents more strongly the changes of the tip-sample interaction via the change in select harmonics.

This inventor has succeeded in using this example embodiment and several other example embodiments of HFIS 300 in alleviating and even eliminating parachuting using AFM cantilever probes with spring constants nominally 0.3 nN/nm, 3 nN/nm, and 45 nN/nm. Those values represent three orders of magnitude of spring constants that cover the great majority of AFM probes used in oscillating probe mode AFM, including AM-AFM, as of this writing. Furthermore, the inventor has succeeded in reproducing this type of result on samples of different surface composition including relatively soft polymer, relatively hard highly-oriented pyrolytic graphite (HOPG), aluminum, paper, and gold.

Furthermore, the inventor has succeeded in using this example embodiment and several other embodiments of HFIS 300 to produce AFM images of samples which show at least one of higher resolution, higher fidelity, and sharper contrast, as illustrated in U.S. Provisional Patent Application Ser. No. 62/202,011, entitled "HARMONIC FEEDBACK ATOMIC FORCE MICROSCOPE".

In embodiments of the present disclosure, the more strongly the human operator chooses to incorporate the gated harmonics signal 299X into the synthesis of the harmonics feedback input signal 399X and/or into the control of any one or more of the setpoint, the error signal, control algorithm parameters, and probe drive signal, the more sensitive the feedback action may be made to the changes of the harmonics. The exercise of these choices are realized in different ways at several points in the signal processing stages in a given embodiment. In the particular embodiment of HFIS 300 described above, the choices include but are not limited to the following, any number of which may be applied separately or concurrently:

Referring to FIGS. 6, 7A, 7B, and 9A the human operator can 1) change the gain of the pre-amplifier 114 in the example embodiments of the harmonic signal generator 100, or change the amplification factor of the lock-in amplifier 160 (if present) in the harmonic signal generator 100; 2) change the value of the Adjustable Offset #1; 3) change the weight of the gated harmonics signal 299X in the weighted adder 302; 4) change the value of the resistor R in the log converter 310; 5) raise or lower in the limiter 314 the (positive) limit of the output 315, and/or equivalently raise or lower the positive voltage ($V_+$) of the power supply that powers the operational amplifier in the log converter 310; 6) change the strength of the Adjustable Offset #2; 7) adjust the weights and the gain in the weighted adder 320 to scale the dynamic range of the modulations of its output 323 which ultimately control the dynamic range of the denominator 325 in the divider 328 and therefore the dynamic range of the harmonics feedback input signal 399X; 8) choose from a silicon diode or a germanium diode or other types of diode for the diode in the log converter 310 as a diode made from each semiconductor material or materials has different input-output characteristics from each in both the forward-bias and reverse-bias regime.

Furthermore, it is to be understood that any and all functions of HFIS 300 may be implemented in digital circuits, for example as described next.

HFIS 300 Example Embodiment 2

Figure 10A:
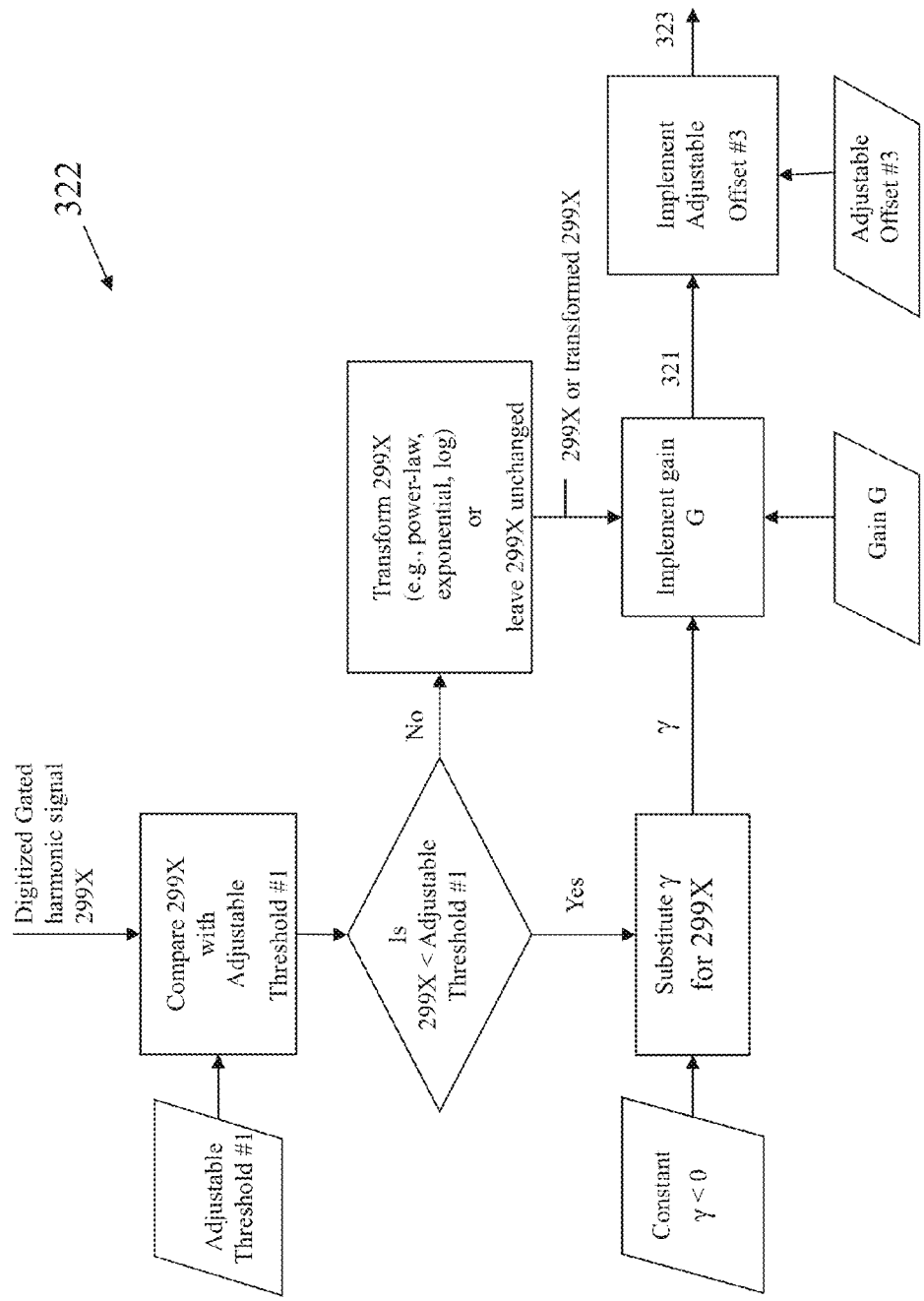
FIG. 10A is a flowchart describing an example of digital signal processing in the signal processor 322 in the harmonics feedback input signal synthesizer 300.
Figure 10B:
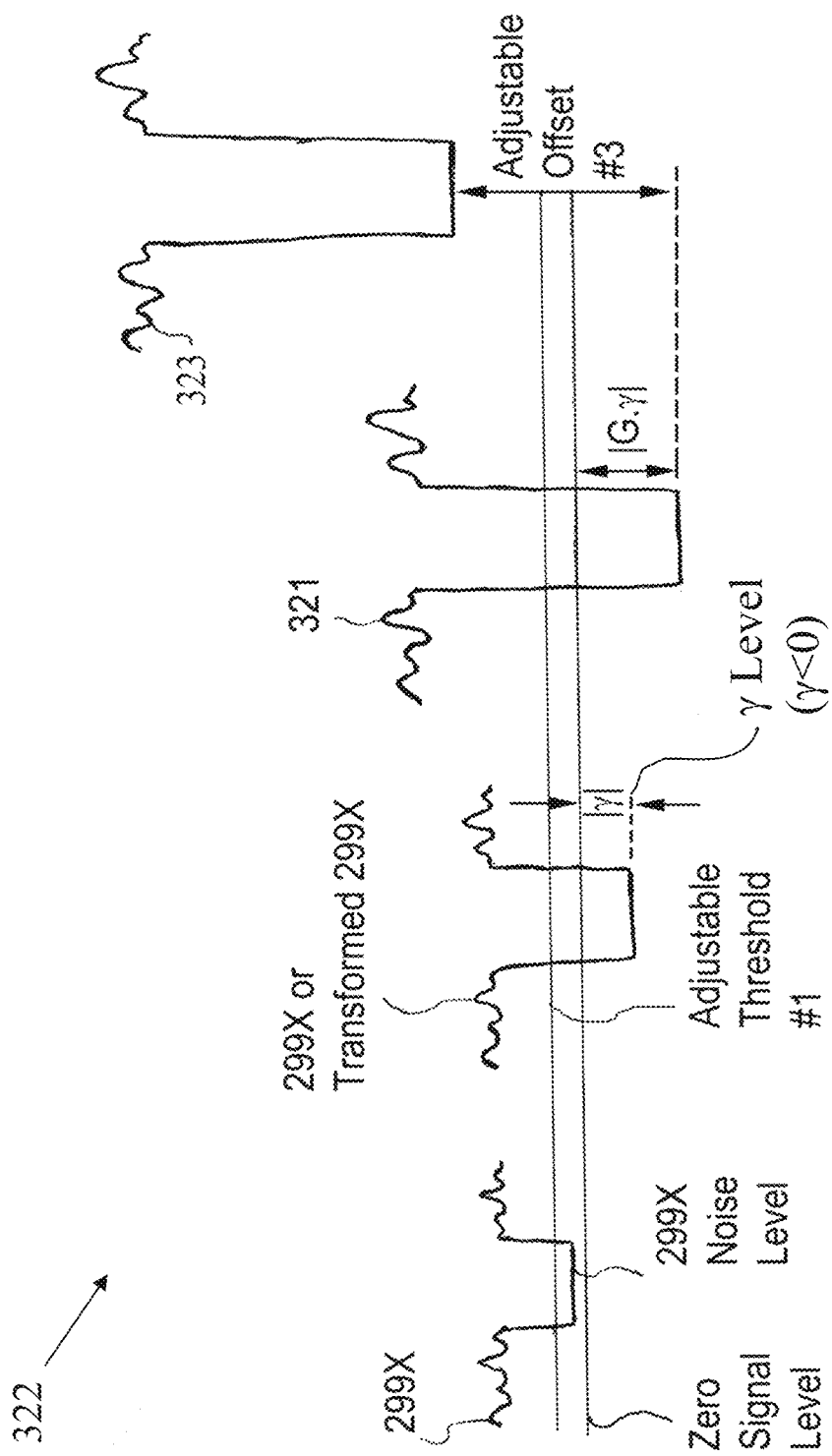
FIG. 10B is a drawing illustrating the evolution of a signal shape at several nodes in the example embodiments such as 322 of the harmonics feedback input signal synthesizer 300 illustrated in part described in FIG. 10A.

In this example embodiment of the HFIS 300, described in-part in the flowchart in FIG. 10A, after converting the gated harmonic signal 299X to digital form if this signal is not already in digital form, the following signal processing steps are carried out in the digital circuits of the processor 322, some intermediate and the final outputs of which are illustrated in the drawings in FIG. 10B: 1) The positive-valued gated harmonics signal 299X is compared with an Adjustable Threshold #1 whose value is determined by the human operator to be larger than the noise level of the gated harmonic signal 299X; this threshold's function is somewhat similar to that of the Adjustable Offset #1 in the HFIS 300 in the prior example, but this Adjustable Threshold #1 is positive. 2a) If the gated harmonics signal 299X is smaller than the Adjustable Threshold #1, then the gated harmonics signal 299X is not passed on to the next stage; instead, the value of a negative constant α, which is adjustable and determined by the human operator, is passed on to the next stage which is a gain stage. 2b) If the gated harmonics signal 299X is larger than the Adjustable Threshold #1, then either the gated harmonics signal 299X is left unchanged and passed on to the subsequent gain stage, or 2c) the gated harmonics signal 299X is transformed mathematically according to a linear transformation or a non-linear transformation or a combination of both which the human operator determines in-part or in-whole in software or in hardware, and the said transformed signal is passed on to the subsequent gain stage. Examples of said linear transformations include but are not limited to delay, scaling up or down, inversion, and addition of positive or negative offsets. Examples of the said non-linear transformations include but are not limited to logarithmic (any base), exponential (any positive or negative exponent), power-law including positive and negative integer powers and positive and negative non-integer powers, and up-sampling and down-sampling. Depending on the nature of a given transformation, it may be better or necessary to implement the transformation on the harmonics signal 199X prior to producing the gated harmonic signal 299X; in that case the comparison in step 1 is of the transformed harmonics signal 199X with the Adjustable Threshold #1. 3) In the gain stage, the input to the gain stage is scaled by the gain factor G which is determined by the human operator and which may be smaller or larger than unity; the result is the signal 321 and this is illustrated in FIGS. 10A-10B. 4) Next, an Adjustable Offset #3 is added to the signal 321 resulting in the signal 323 which serves the same purpose as the signal designated by the same number (323) in the HFIS 300 in the prior example.

The subsequent signal processing stages in HFIS 300 in this example may be the same as those in the prior example; resulting in the harmonics signal 399X which is similar to 399X. One difference from the prior example HFIS 300 is that some or all of the signals in the present example HFIS 300 are digital. In a modification to the present example HFIS 300, at any point during the signal processing, a conversion to analog form is possible. For example, the division step in the divider 328, or an energy signal computation in the energy extractor 90 may be implemented in analog form if the digital-to-analog conversion is deemed worth the resulting increased speed and/or the reduced need for digital computational resources and/or other advantages. The signal processor 324 may be used to in-part control the dynamic range of the denominator 325 of the divider 328 notwithstanding the control of the said dynamic range that is also possible via the gain G and/or the Adjustable Offset #3, and/or the value of γ. The output of HFIS 300 is the harmonics feedback input signal 399X.

The advantages of an analog implementation of HFIS 300 include a built-in mechanism in the analog log converter 310 to initially separate into opposite polarities the data indicative of absence and presence of tip-sample intermittent contact as indicated by the harmonics; speed of computations, especially viz. the division in the divider 328 and the computation of the signal energy in the energy extractor 90; and in some cases relative ease of implementing the Adjustable Offset #1 and Adjustable Offset #2, for example via hardware manual control elements such as dial knobs rather than software control and the associated programming resources and digital signal processing (DSP) overhead.

Mathematical Transformations and Resulting HFIS Choices

The mathematical transformation of the gated harmonics signal 299X (or of the harmonics signal 199) as exemplified above in the context of the example embodiment HFIS 300 above may also be implemented on analog counterparts if these signals are to be used in a HFIS 300 embodiment (or elsewhere in a given embodiment of the present disclosure) at nodes that require analog signal input. The log conversion in described above is of course one example. Another example is exponential amplification as exemplified in the context of other embodiments below.

HFIS 300 Example Embodiment 3 (Analog Exponential)

The inventor has successfully implemented a complete feedback scheme using a different embodiment of the HFIS in which the analog log converter (as described above) was replaced with an analog exponential amplifier, (in whose simplest implementation the diode and the resistor R in the analog log converter are switched one with the other). The weighted adder 302 and the Adjustable Offset #1 (FIG. 9A) may be eliminated in this embodiment. Absent additional subsequent signal processing, the resulting modulations of the exponentially-amplified gated harmonics signal 299X do not have the built-in separation feature of the output signal 311 of the log converter 310 in HFIS 300 example embodiment illustrated in FIG. 9A and FIG. 9B.

However, in contradistinction to the log converter in HFIS 300 example embodiment illustrated in FIG. 9A and FIG. 9B which compacts the modulations corresponding to the times when tip-sample intermittent contact is present, the exponential amplifier magnifies these modulations. The positive limiter 314 may not be needed in this embodiment, but several other parts of HFIS 300 example embodiment 1 are also used in this HFIS 300 example embodiment 3; these include the weighted adder 320 and the Adjustable Offset #2, the divider 328, the energy extractor 90, and optionally the signal processor 324. The inventor has documented that, as expected, the resulting feedback scheme is by its nature more sensitive to the changes of the harmonics when tip-sample intermittent contact is present. This type of heightened sensitivity to changes of intermittent contact interaction is also possible in embodiments that substitute a power amplification transformation for the exponential amplification transformation.

HFIS 300 Example Embodiment 4 (Analog Log Converter and Exponential)

The log converter in HFIS 300 compacts the modulations of the positive values of its input signal 307. This may be considered undesirable as some of the said modulations correspond to the times when tip-sample intermittent contact is present; compacting the said modulations would then correspond to reducing the sensitivity to changes of tip-sample interaction in intermittent contact. On the other hand, use of the log converter has proven quite effective in, among other things, reducing parachuting with relatively simple analog electronics. Therefore, a combination of the log converter and the analog exponential amplifier in HFIS 300 can be used to create an embodiment that has the built-in separation feature of the log converter described above and yet in-part or in-whole reverses the compaction resulting from the log conversion. Namely, once the signal 323 is obtained (see signal shapes in FIG. 9B), it may be transformed with an exponential amplifier that implements a mathematical inverse transform of the log compaction. An additional DC offset may be necessary subsequent to or prior to the exponential amplification to bring the signal to a suitable range for use in the divider.

This inventor has implemented this embodiment of the HFIS 300 relying in-part a on matched diode set (two diodes), two counts of the same operational amplifier (on common substrate), and two 1% tolerance resistors of same resistance value. (One of each component type is needed for the log converter and one for the exponential amplifier). As described earlier in the context of HFIS 300, implementations of both a log converter and an exponential amplifier can be quite sophisticated to compensate for non-ideal behavior of the components, including temperature-sensitivity of components and input offsets of the operational amplifiers. The embodiments of HFIS 300 may be made with log converters and/or exponential amplifiers more complex than those described herein.

HFIS 300 Example Embodiment 5 (Analog Divider of 959)

This example embodiment of the HFIS 300 is similar to HFIS 300 example embodiment 1 with two differences: 1) instead of receiving the probe response signal 59 in the divider 328 (FIG. 9A), the HFIS 300 receives the probe energy signal 959, which may be for example the RMS amplitude of the probe response signal 59. 2) This may obviate the need in some embodiments of HFIS 300 for the energy extractor 90. The output of HFIS 300 is the harmonics feedback input signal 399X.

HFIS 300 Example Embodiment 6 (Digital Divider of 959)

This example embodiment of the HFIS 300 is similar to HFIS 300 example embodiment 2 with two differences: 1) instead of receiving the probe response signal 59 in the divider 328, the HFIS 300 receives the probe energy signal 959, which may be for example the RMS amplitude of the probe response signal 59. 2) This may obviate the need in some embodiments of HFIS 300 for the energy extractor 90. The output of HFIS 300 is the harmonics feedback input signal 399X.

HFIS 300 Example Embodiment 7 (Analog Multiplier of 59)

Figure 11A:
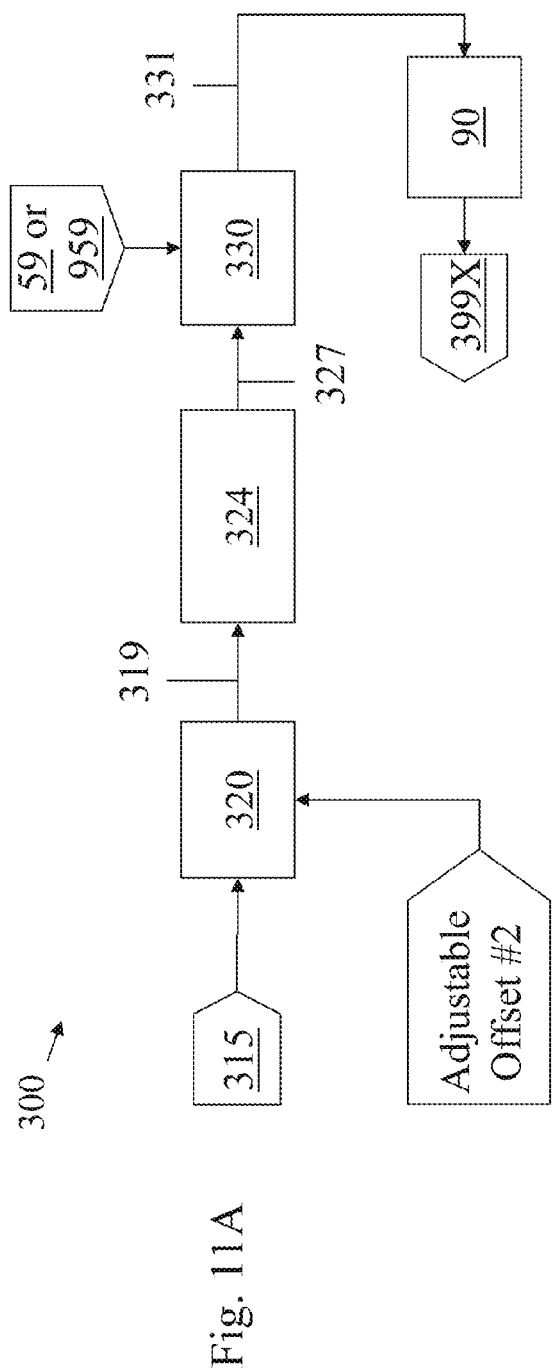
FIG. 11A shows a simplified block diagram of parts of example embodiments of the harmonics feedback input signal synthesizer 300.
Figure 11B:
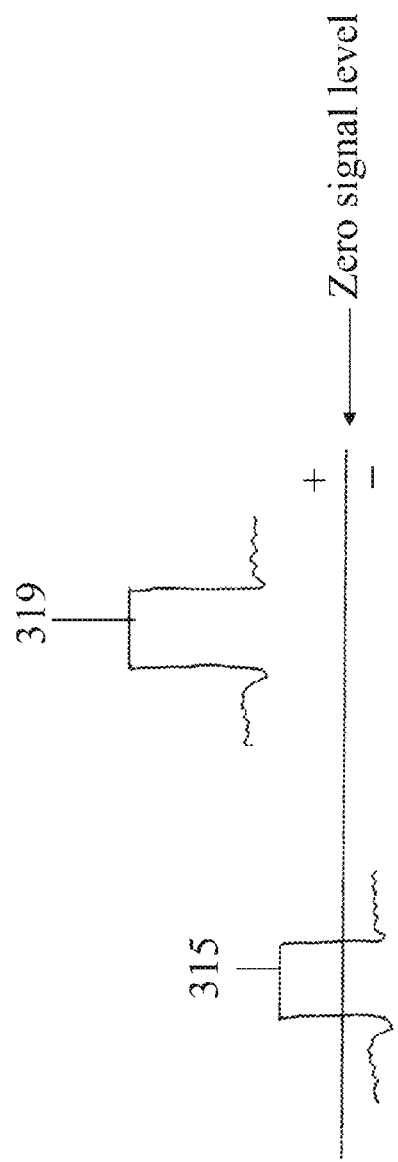
FIG. 11B is a drawing illustrating a signal shape evolution across the weighted 320 adder in the example embodiments of FIG. 11A.

This example embodiment of the HFIS 300, signal processing steps are the same as HFIS 300 example embodiment 1 (FIG. 9A) through the positive limiter 314 stage which produces the signal 315. As shown in FIG. 11A and FIG. 11B, in this example embodiment 7, the signal 315 enters the weighted adder 320, which also receives an Adjustable Offset #2. The output of the weighted adder 320 is in this case the signal 319. This signal 319 optionally enters a signal processor 324 the output 327 of which enters a multiplier 330. Alternatively, the signal 319 directly enters the multiplier 330. The divider 328 of HFIS 300 example embodiment 1 is replaced in this example embodiment 7 with a multiplier 330 that multiplies the probe response signal 59 by the output 327 of the signal processor 324 or by the signal 319. The output 331 of the multiplier 330 enters the energy extractor 90 whose output is the harmonics feedback input signal 399X.

HFIS 300 Example Embodiment 8 (Digital Multiplier of 59)

Figure 12A:
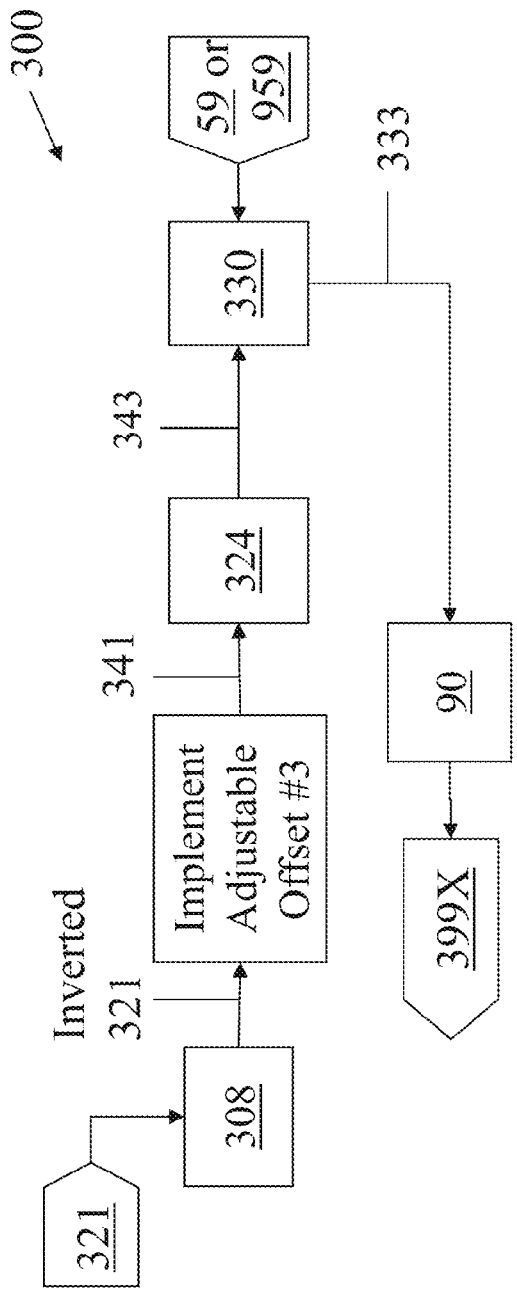
FIG. 12A shows a simplified block diagram of parts of example embodiments of the harmonics feedback input signal synthesizer 300.

In this example embodiment of the HFIS 300 depicted in part in FIG. 12A, signal processing steps are the same as HFIS 300 example embodiment 2 (described in part in FIG. 10A) through the adjustable gain step (implementing adjustable gain G) identified as item 3 in the descriptive text for example embodiment 2, which corresponds to implementing the gain G as illustrated in the flowchart in FIG. 10A. In this example embodiment 8, however, prior to implementing the Adjustable Offset #3, the output 321 (FIGS. 10A-10B) of the gain stage is inverted in the inverter 308 shown in FIG. 12A (see also FIG. 12B). The output after the Adjustable Offset #3 is implemented is the signal 341 in FIGS. 12A-12B. This signal 341 may be further processed in a signal processor 324 before it enters as signal 343 into the multiplier 330, where it multiplies the probe response signal 59. The output 333 of the multiplier is the input of an energy extractor 90 whose output in turn is the harmonics feedback input signal 399X.

HFIS 300 Example Embodiment 9 (Analog Multiplier of 959)

This example embodiment of the HFIS 300 is similar to HFIS 300 example embodiment 7; however, instead of the probe response signal 59, the probe energy signal 959 enters the multiplier 330. In this embodiment, the energy extractor 90 following the multiplier may not be needed. This embodiment is also illustrated in FIG. 11A-11B. The output of HFIS 300 is the harmonics feedback input signal 399X.

HFIS 300 Example Embodiment 10 (Digital Multiplier of 959)

Figure 12B:
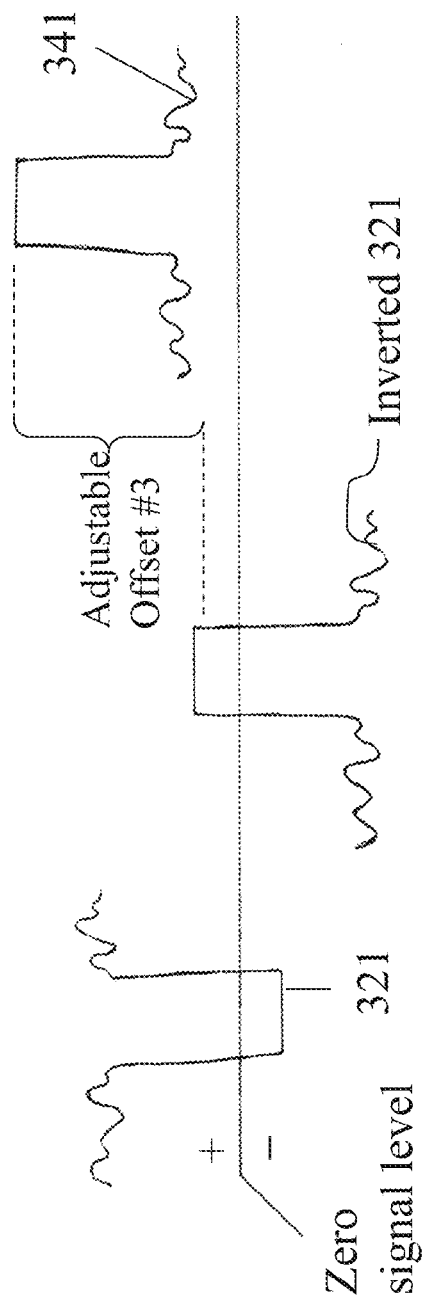
FIG. 12B is a drawing illustrating a signal shape evolution across the inverter 308 of FIG. 12A and after a subsequent adjustable offset addition.

This example embodiment of the HFIS 300 is similar to HFIS 300 example embodiment 8; however instead of the probe response signal 59, the probe energy signal 959 enters the multiplier 330. In this embodiment, the energy extractor 90 following the multiplier may not be needed. This embodiment is also illustrated in FIG. 12A-12B. The output of HFIS 300 is the harmonics feedback input signal 399X.

HFIS 300 Example Embodiment 11 (Basic Analog or Digital Divider)

Figure 13:
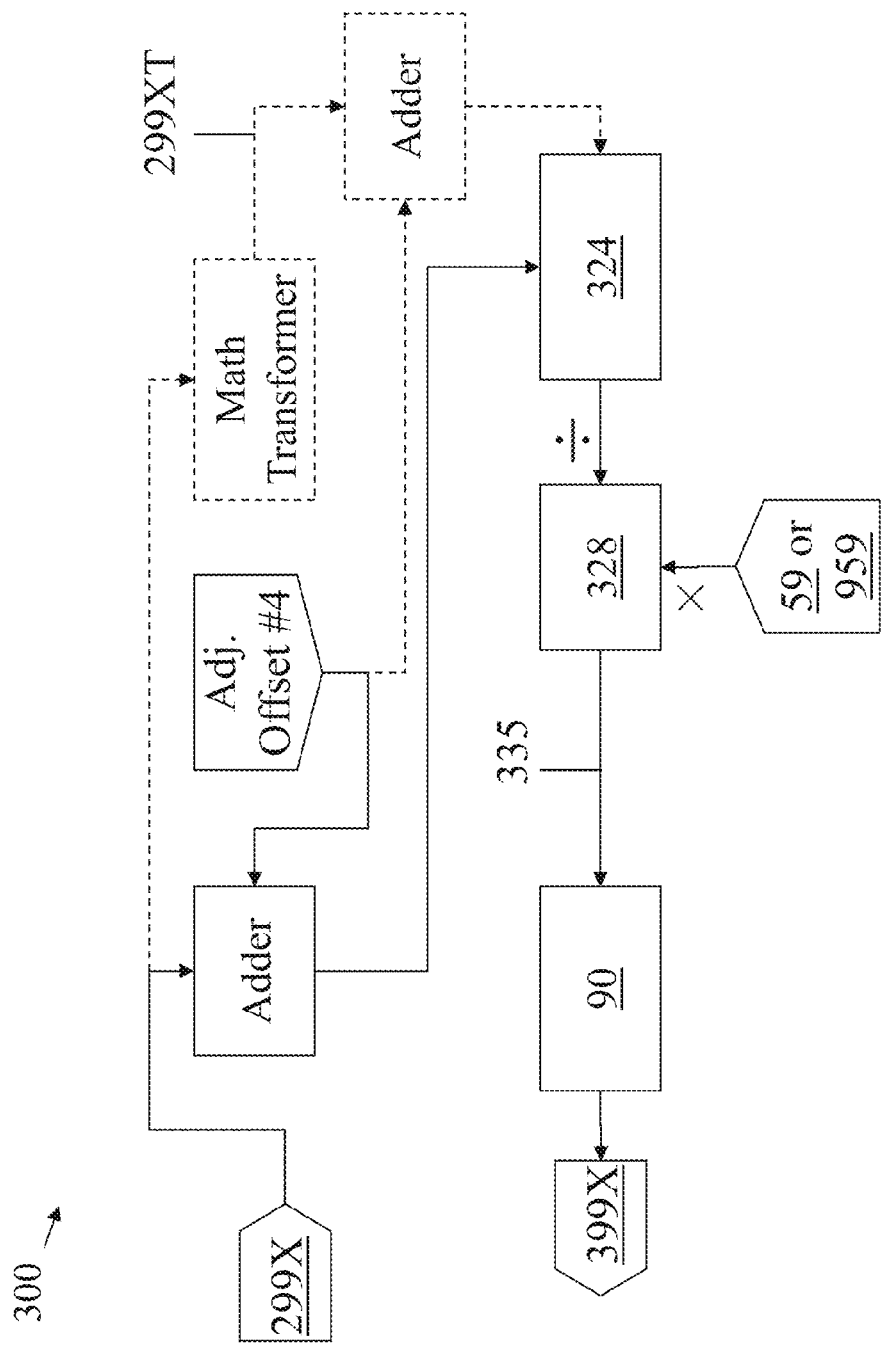
FIG. 13 is a simplified block diagram showing an implementation of an example embodiment of the harmonics feedback input signal synthesizer 300.

In this HFIS 300 example embodiment 11 illustrated in FIG. 13, the gated harmonics signal 299X (which is a positive polarity signal built on a measure of the energy of the harmonics oscillations) or 299XT which is the gated harmonic signal 299X transformed in a mathematical transformer 336 is simply added in a weighted adder 320 to an Adjustable Offset #4. The said mathematical transformation may include but is not limited to one or more of scaling (up or down), power-law transformation, exponentiation (negative or positive exponent), and logarithmic (any base) conversion. The sum signal 299X+Adjustable Offset #4 or 299XT+Adjustable Offset #4 (possibly subject to additional signal processing indicated by the signal processor 324) is the denominator of a divider 328 whose numerator is either the probe response signal 59 or the probe energy signal 959. If the probe response signal 59 is the numerator, the output 335 of the divider enters an energy extractor 90 whose output is the harmonics signal 399X. If the probe energy signal 959 is the numerator, the energy extractor 90 may not be required; then the output of the divider 328 is the harmonics signal 399X. Digital, analog, and mixed-signal implementations of this HFIS 300 example embodiment 11 are possible.

HFIS 300 Example Embodiment 12 (Basic Analog or Digital Multiplier)

Figure 14:
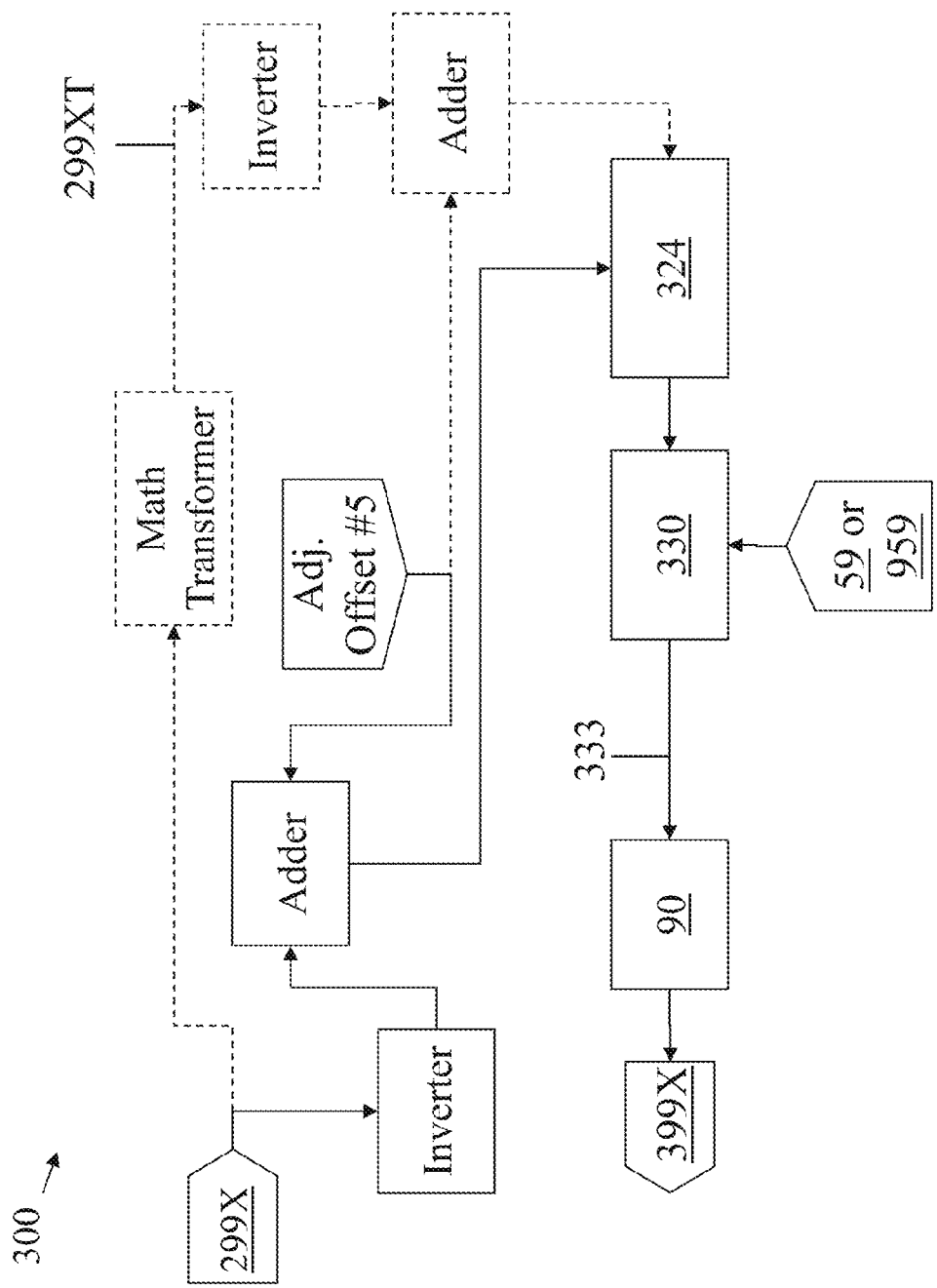
FIG. 14 is a simplified block diagram showing an implementation of an example embodiment of the harmonics feedback input signal synthesizer 300.

In this HFIS 300 example embodiment 12, shown in FIG. 14, the gated harmonics signal 299X (which is a positive-definite polarity signal built on a measure of the energy of the harmonics oscillations) or 299XT which is the gated harmonic signal 299X transformed in a mathematical transformer 336 is first inverted in an Inverter 308. The said mathematical transformation may include but is not limited to one or more of scaling (up or down), power-law transformation, exponentiation (negative or positive exponent), and logarithmic (any base) conversion.

The inverted signal is then added in a Weighted Adder 320 to an Adjustable Offset #5. In a multiplier 330, the difference signal Adjustable Offset #5 minus 299X or the difference signal Adjustable Offset #5 minus 299XT (possibly subject to additional signal processing) multiplies either the probe response signal 59 or the probe energy signal 959. If probe response signal 59 is used, the output 333 of the multiplier 330 enters an energy extractor 90 whose output is the harmonics signal 399X. If the probe energy signal 959 is used, the energy extractor 90 may not be required; then the output 333 of the multiplier 330 is the harmonics signal 399X. It is also possible to implement the mathematical transformation on the inverted version of the gated harmonic signal 299X, in other words to place the Math Transformer 336 between the Inverter 308 and the Weighted Adder 320 in FIG. 14. Digital, analog, and mixed-signal implementations of this HFIS 300 example embodiment 12 are possible.

HFIS 300 Example Embodiment 13 (Basic Addition to a Constant)

Figure 15:
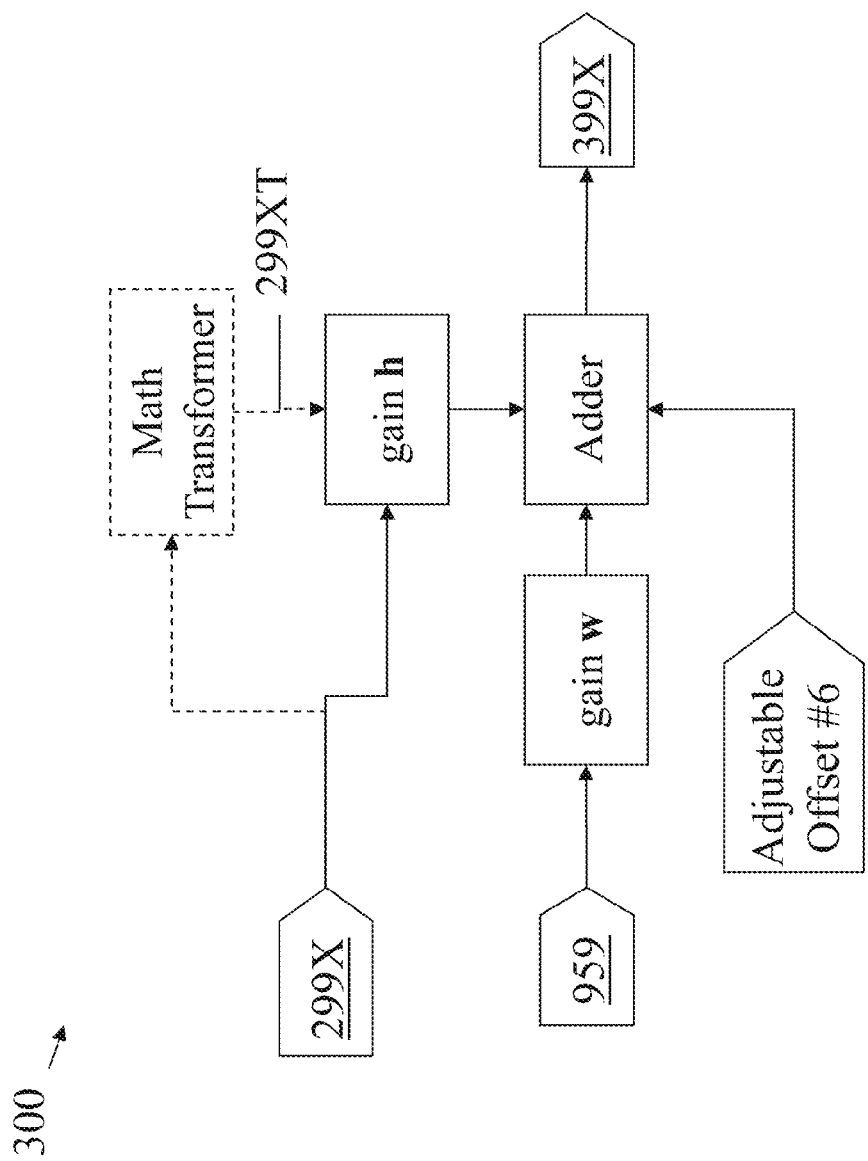
FIG. 15 is a simplified block diagram showing an implementation of an example embodiment of the harmonics feedback input signal synthesizer 300.

In this HFIS 300 example embodiment 13, shown in FIG. 15, in a weighted adder three signals are added together. These are 1) an Adjustable Offset #6; 2) a gated harmonics signal 299X or a gated harmonic signal mathematically transformed in a Math Transformer 336, i.e., 299XT, and; 3) a probe energy signal 959. The said mathematical transformation may include but is not limited to one or more of scaling (up or down), power-law transformation, exponentiation (negative or positive exponent), and logarithmic (any base) conversion. The output of the weighted adder, possibly with additional subsequent signal processing, is then the harmonics feedback input signal 399X as defined by the equation $$399X = \text{Adjustable Offset } \#6 + h*299XT + w*959.$$

(or $399X = \text{Adjustable Offset } \#6 + h*299X + w*959$.)

In this HFIS 300 example embodiment 13, the Adjustable Offset #6 and the weights "h" and "w", implemented via gain "h" and gain "w", of the signals to be added may be negative or positive depending on the way that error signal 405 is defined for the feedback scheme in a given embodiment of the harmonics-enabled controller 1000 (FIG. 3); however, the two gains "h" and "w" are of opposite polarity, namely, one gain is positive, the other gain is negative to ensure 299XT and 959 contribute to the harmonic feedback input signal 399X in opposing senses. In this construction it is possible to give the harmonics represented by 299XT (or 299X) a much bigger weight than the probe oscillations whole, represented by the probe energy signal 959. In the extreme, it is possible to set w to zero, thereby making the changes of the harmonics feedback input signal 399X a representation exclusively of the changes of the harmonics, as described below in the context of an embodiment that address the problem of false engages associated with AM-AFM which was described earlier.

False Engages

Some embodiments of the present disclosure enable a different type of solution to the problem of false engage; one that can work both without sewing, and also with sewing but improving the efficiency of sewing, and is indiscriminate of sample properties and the operating environment: gas, liquid, or vacuum. The solution relies on harmonics to ascertain the presence or absence of tip-sample intermittent contact. The parameters of harmonics-enabled feedback control including the harmonics feedback input signal 399X can be tailored in embodiments of the present disclosure to take into account the harmonics to any desired degree, even to the point where the harmonics completely determine the feedback control.

This inventor has observed experimentally that the option of making the probe energy signal 959 nearly or completely irrelevant (as compared to the gated harmonics signal 299X) to the synthesis of the harmonics feedback input signal 399X provides for a method to detect the tip-sample engagement during an approach sequence (preceding raster-scanning) that substantially reduces and can even eliminate "false engages" that come about as the distance "D" (FIG. 3) becomes smaller, especially as "D" becomes small enough that fluid squeeze-film effects become important. ("Air-Damping of AFM Micro-Cantilevers in the Presence of a Nearby Surface," FM Serry, P Neuzil, R Vilasuso, and G J Maclay in Proceedings of The 188th Electrochemical Society National Symposium, Chicago, Ill., 1995.) False engages during the approach sequence are prevalent in AM-AFM and, absent a robust solution, they are accepted as an inherent nuisance of AM-AFM. However, in some conventional AM-AFM, notably in tapping mode, false engages are addressed in a method referred to as "sewing" in which during the approach, every time the strength of the RMS amplitude of probe oscillations whole (959P) reduces for any reason including fluid dynamic damping, the feedback loop halts the approach, reduces the RMS amplitude setpoint by an increment, and checks to see if the required z-actuator 700P movement to establish the new RMS amplitude setpoint is incremental or substantial. If incremental, engage is deemed real and raster scanning commences. On the other hand if the required z-actuator 700P movement is substantial, then the engage is deemed false and approach resumes. This cycle repeats numerous times. Near the end of the approach, the cycles take progressively longer time. The result is an annoyingly long wait time especially during the initial approach, frequently up to several minutes and longer.

As discussed in an earlier section, sewing has the additional problem that it often fails when the AFM is used with a fluid cell, which is necessary to use when examining a sample in a liquid and sometimes necessary to use when examining a sample in a controlled gas ambient. The nature of this failure is frequently worse than the delay associated with sewing when sewing does work: the AFM simply "hangs", meaning it cannot determine if an engage has occurred or not. The resulting loss of time required to reposition hardware (including sometimes the probe whose repositioning requires some dexterity), or to flush air bubbles out of the liquid, etc., is much longer even than the typical waiting time during a successfully executed sewing approach and engage.

To reduce the chance of false engage, in other embodiments of the present disclosure Boolean logic gates can be used to make the determination of the engagement depend not only on the probe energy signal 959, but also on the harmonics signal 199X (or possibly on the gated harmonics signal 299X). In one example, the output of a two-input AND gate determines if a real engage has occurred. The inputs to the AND gate are determined by 1) a first time derivative of a suitably low-pass-filtered version of the probe energy signal 959, and 2) a harmonics signal 199X. In this example embodiment, a real engage is detected when a harmonics signal 199X or the suitably amplified version of it rises above a pre-determined value which the human operator selects AND simultaneously (or nearly simultaneously) a first time derivative of a probe energy signal 959 (taking into account its polarity) is smaller than a pre-determined value, which the human operator selects. In a triple-input AND gate, with a probe energy signal 959 determining one input of the gate, if only the strength but not the polarity of a first derivative of the probe energy signal 959 determines a second input to the said AND gate, then a second time derivative of the said probe energy signal 959 may be used to determine the third input to the said AND gate to ensure the correct polarity of the said first derivative.

To make probe oscillations whole as embodied in a probe response signal 59 and/or in a probe energy signal 959 completely irrelevant to the detection of an engagement during an approach, a harmonics feedback input signal 399X can be synthesized for the duration of approach only. To achieve this goal, the harmonics signal 199X may be substantially amplified possibly in a nonlinear fashion, for example exponentially. To facilitate the continuity of operation in transitioning from approach to raster scanning, this amplified signal is inverted and added to a positive adjustable offset. This offset's magnitude is larger or much larger than the maximum expected value of the amplified harmonics signal. In such an embodiment, the harmonics feedback input signal 399X during only the approach sequence is independent of probe oscillations whole (e.g., probe energy signal 959), and depends only on the harmonics signal 199X. When this harmonics feedback input signal 399X drops below a threshold value as a consequence of the rise of the harmonics signal 199, the engage is detected and the feedback parameters including the harmonic input feedback signal 399X switch to those set for raster scanning.

The motivation behind this scheme is in the fact that as compared with probe oscillations whole, harmonic oscillations are usually less than probe oscillations whole susceptible to substantial relative change as a result of hydrodynamic and optical effects during the approach, but they are usually more sensitive to tip-sample intermittent contact, especially the initiation of such contact. This is validated in the experimental data plotted in FIG. 5A, especially in the double peaks on the far left of the extracted harmonics 79 plot (in Regions 2 and 3).

This inventor has successfully implemented initial approach sequences as described above in which the probe oscillations whole (as represented by 59 and 959) is completely irrelevant to the feedback during the approach, but the harmonics signal 199X is exponentially amplified and used as described above (inverted and added to an adjustable positive offset) to synthesize a harmonics feedback input signal 399X (described above in HFIS 300 example embodiment 13) with h<0, Adjustable Offset #6>0, and w=0 for the duration of the approach to detect the engage event: the approach sequence ends with the tip and the sample engaged but without incidents of false engage preceding it.

Combined Action of HFIS with Other Units

In embodiments of the present disclosure, harmonics-enabled control as described above of the harmonics feedback input signal 399X, and/or of the setpoint signal 375, and/or of the error signal 405, and/or of the output signal 1089 of the CAU 410, and/or of the probe drive signal 5 may be implemented together concurrently and/or sequentially.

Further Description of Selected Embodiments

Systems and methods of the present disclosure, by making more strongly relevant to the AFM feedback control scheme than they are in conventional AFM the non-linear tip-sample interactions via the harmonics can enable improved tip-sample interaction control, which may lead at least to any one or more of the following: enhanced image fidelity and resolution, reduced parachuting, reduced wait time during approach, reduced incidences of false engage, increased scanning speed.

The frequency component to be extracted from the probe response signal is generated by the AFM probe as the sensing tip interacts with the sample surface. In conventional oscillating probe AFM, the feedback signal is related to a driven frequency of the probe response signal. The AFM probe oscillates at the driven frequency at an amplitude related to the type and amount of drive signal and the mechanics of the AFM probe. When the sensing tip of the AFM probe interacts with the sample surface, the amplitude of oscillation of the AFM probe at the driven frequency is reduced (limited by repulsive forces as the sensing tip taps the sample surface). Hence, the amplitude of oscillation at the driven frequency decreases as the average distance between the sensing tip and the sample surface decreases (i.e., the average position of the sensing tip approaches the sample surface or vice versa).

In AFM techniques of the present disclosure, the extracted frequency component of the probe response signal is related to distortions (e.g., deviations) of the AFM probe oscillation at the driven frequency. The distortions may manifest in harmonics of the driven frequency and/or mixtures of driven frequencies (and/or mixtures of harmonics). When the sensing tip of the AFM probe interacts with the sample surface, the energy of the oscillation of the AFM probe at the driven frequency (the driven frequency component) is reduced (the amplitude is reduced). Some of that energy is distributed to harmonics of the driven frequency or other non-linearities (such as frequency mixing). The extracted frequency component of the probe response signal of the present disclosure indicates at least some of the energy lost from the driven frequency component. Hence, the extracted frequency component strengthens as the sample-tip interaction increases and the conventional feedback signal weakens. When the sensing tip does not interact with the sample surface (i.e., the sensing tip is sufficiently far away from the sample surface), the conventional feedback signal (the energy of the probe response signal or the driven frequency component) is essentially maximal while the extracted frequency component of the probe response signal of the present disclosure is essentially minimal.

In some embodiments, multiple frequencies present at the AFM probe may mix to produce signals at the sum and/or difference of frequencies. The multiple frequencies may include one or more driven frequencies of the probe drive signal and may include one or more harmonics of the driven frequency (or driven frequencies).

The extracted frequency component of the present disclosure generally negatively correlates with the average distance between the sensing tip and the sample surface. The negative correlation means that the extracted frequency component weakens (i.e., a magnitude measure (such as energy, power, RMS amplitude, peak-to-peak amplitude, etc.) decreases) as the average distance increases and the extracted frequency component strengthens (i.e., the magnitude measure increases) as the average distance decreases. Because the extracted frequency component of the probe response signal negatively correlates with the tip-sample interaction, the extracted frequency component is generally a small component of the probe response signal when the sensing tip and the sample surface are separated sufficiently to avoid interaction. The magnitude of the extracted frequency component generally grows as the tip-sample interaction increases.

In conventional oscillating probe AFM, the feedback signal (typically the energy of the probe response signal, as a whole or at a driven frequency) is positively correlated with the average distance between the sensing tip and the sample surface. The positive correlation in conventional oscillating probe AFM means that the feedback signal strengthens as the average distance increases and weakens as the average distance decreases. Therefore, in conventional oscillating probe AFM, regulation of the average distance and the feedback system is based upon decreasing the average distance as the feedback signal strengthens and increasing the average distance as the feedback signal weakens. Hence, the regulation and feedback in conventional oscillating probe AFM operate in the opposite sense as regulation and feedback according to the present disclosure.

A first resonant frequency of the AFM probe also may be called a fundamental resonant frequency and corresponds to the lowest frequency mechanical resonance of the AFM probe. Resonant frequencies also may be called eigenfrequencies. Resonances have a peak frequency and a band. The band of the resonance is generally characterized by a full bandwidth at half maximum and/or a half bandwidth at half maximum. For example, the band may be between the frequencies where the resonance is at half maximum of the peak frequency. The half maximum frequencies are the frequencies where the amplitude of the resonance is one half of the amplitude at the peak frequency (or 3 dB less than the amplitude at the peak frequency; in energy units, the half maximum frequencies are where the energy of the resonance is 6 dB less than the energy at the peak frequency). The full bandwidth at half maximum is the difference of the half maximum frequencies. The half bandwidth at half maximum is half of the full bandwidth at half maximum. Resonances are typically substantially symmetrical about the peak frequency. Unless otherwise noted, a reference to 'full bandwidth' or 'half bandwidth' is a respective reference to the full bandwidth at half maximum or the half bandwidth at half maximum. If a signal is within the full bandwidth of a resonance, the signal has a frequency between the half maximum frequencies of the resonance (inclusive). If a signal is outside of the full bandwidth of a resonance, the signal has no frequencies within the full bandwidth of the resonance.

Examples of inventive subject matter according to the present disclosure are described in the following enumerated paragraphs.

A1. A method of atomic force microscopy, the method comprising:

driving an AFM probe in an oscillatory motion with a probe drive signal, wherein the AFM probe includes a sensing tip;

detecting the oscillatory motion of the AFM probe to produce a probe response signal;

extracting an extracted frequency component of the probe response signal; and regulating an average distance between the sensing tip and a sample surface according to a contribution due to the extracted frequency component.

A2. The method of paragraph A1, wherein the regulating is regulating the average distance between the sensing tip and the sample surface according to the contribution due to the extracted frequency component and an opposing contribution due to the probe response signal.

A2.1. The method of paragraph A2, wherein the opposing contribution due to the probe response signal is one of a magnitude measure of the probe response signal and an inverted magnitude measure of the probe response signal.

A2.1.1. The method of paragraph A2.1, wherein the contribution due to the extracted frequency component is a magnitude measure of the extracted frequency component and the opposing contribution due to the probe response signal is the inverted magnitude measure of the probe response signal.

A2.1.2. The method of paragraph A2.1, wherein the contribution due to the extracted frequency component is an inverted magnitude measure of the extracted frequency component and the opposing contribution due to the probe response signal is the magnitude measure of the probe response signal.

A2.2. The method of paragraph A2, wherein the opposing contribution due to the probe response signal is an opposing contribution due to a driven frequency component of the probe response signal.

A2.2.1. The method of paragraph A2.2, wherein the opposing contribution due to the probe response signal is one of a magnitude measure of the driven frequency component of the probe response signal and an inverted magnitude measure of the driven frequency component of the probe response signal.

A2.2.1.1. The method of paragraph A2.2.1, wherein the contribution due to the extracted frequency component is a magnitude measure of the extracted frequency component and the opposing contribution due to the probe response signal is the inverted magnitude measure of the driven frequency component of the probe response signal.

A2.2.1.2. The method of paragraph A2.2.1, wherein the contribution due to the extracted frequency component is an inverted magnitude measure of the extracted frequency component and the opposing contribution due to the probe response signal is the magnitude measure of the driven frequency component of the probe response signal.

A3. The method of any of paragraphs A1-A2.2.1.2, wherein the contribution due to the extracted frequency component is one of a/the magnitude measure of the extracted frequency component and an/the inverted magnitude measure of the extracted frequency component.

A4. The method of any of paragraphs A1-A3, wherein the regulating includes regulating such that a weakening of the extracted frequency component contributes positively to a decrease in the average distance between the sensing tip and the sample surface, and contributes negatively to an increase in the average distance between the sensing tip and the sample surface.

A5. The method of any of paragraphs A1-A4, wherein the regulating includes regulating such that a strengthening of the extracted frequency component contributes positively to an increase in the average distance between the sensing tip and the sample surface, and contributes negatively to a decrease in the average distance between the sensing tip and the sample surface.

A6. The method of any of paragraphs A1-A5, wherein the regulating includes regulating such that a weakening of the probe response signal contributes negatively to a decrease in the average distance between the sensing tip and the sample surface, and contributes positively to an increase in the average distance between the sensing tip and the sample surface.

A7. The method of any of paragraphs A1-A6, wherein the regulating includes regulating such that a strengthening of the probe response signal contributes negatively to an increase in the average distance between the sensing tip and the sample surface, and contributes positively to a decrease in the average distance between the sensing tip and the sample surface.

A8. The method of any of paragraphs A1-A7, wherein the regulating includes regulating such that a weakening of a/the driven frequency component of the probe response signal contributes negatively to a decrease in the average distance between the sensing tip and the sample surface, and contributes positively to an increase in the average distance between the sensing tip and the sample surface.

A9. The method of any of paragraphs A1-A8, wherein the regulating includes regulating such that a strengthening of a/the driven frequency component of the probe response signal contributes negatively to an increase in the average distance between the sensing tip and the sample surface, and contributes positively to a decrease in the average distance between the sensing tip and the sample surface.

A10. The method of any of paragraphs A1-A9, wherein the regulating includes regulating the average distance between the sensing tip and the sample surface by increasing the average distance as the extracted frequency component strengthens and decreasing the average distance as the extracted frequency component weakens.

A10.1. The method of paragraph A10, wherein the extracted frequency component strengthens when a/the magnitude measure of the extracted frequency component increases and wherein the extracted frequency component weakens when a/the magnitude measure of the extracted frequency component decreases.

A11. The method of any of paragraphs A1-A10.1, wherein the extracted frequency component is related to distortion of the probe response signal due to sensing tip-sample surface interaction.

A12. The method of any of paragraphs A1-A11, wherein the extracted frequency component negatively correlates with the average distance between the sensing tip of the AFM probe and the sample surface.

A13. The method of any of paragraphs A1-A12, wherein the probe response signal positively correlates with the average distance between the sensing tip of the AFM probe and the sample surface.

A14. The method of any of paragraphs A1-A13, wherein an extracted frequency of the extracted frequency component is a harmonic of a prominent frequency in the probe drive signal.

A14.1. The method of paragraph A14, wherein the prominent frequency is at least one of a dominant frequency of the probe drive signal and a driven frequency of the probe drive signal, and optionally wherein a/the driven frequency component of the probe response signal has a frequency that is the driven frequency.

A14.2. The method of any of paragraphs A14-A14.1, wherein the harmonic is a non-unity harmonic of the prominent frequency.

A14.3. The method of any of paragraphs A14-A14.2, wherein the harmonic is one of 5, 6, and 7 times the prominent frequency.

A14.4. The method of any of paragraphs A14-A14.2, wherein the harmonic is one of 10, 11, and 12 times the prominent frequency.

A14.5. The method of any of paragraphs A14-A14.2, wherein the harmonic is one of 17 and 18 times the prominent frequency.

A15. The method of any of paragraphs A1-A14.5, wherein an/the extracted frequency of the extracted frequency component is a non-unity multiple of a/the prominent frequency in the probe drive signal.

A16. The method of any of paragraphs A1-A15, wherein the probe drive signal includes one or more prominent frequencies.

A16.1. The method of paragraph A16, wherein the prominent frequencies are harmonics of each other.

A16.2. The method of any of paragraphs A16-A16.1, wherein an/the extracted frequency of the extracted frequency component is not one of the prominent frequencies of the probe drive signal and/or is different than each of the prominent frequencies.

A16.3. The method of any of paragraphs A16-A16.2, wherein the probe drive signal includes a dominant frequency that is more energetic than each of the prominent frequencies.

A16.3.1. The method of paragraph A16.3, wherein the prominent frequencies are harmonics of the dominant frequency.

A16.3.2. The method of any of paragraphs A16.3-A16.3.1, wherein an/the extracted frequency of the extracted frequency component is not the dominant frequency and/or is different than the dominant frequency.

A17. The method of any of paragraphs A1-A16.3.2, wherein an/the extracted frequency of the extracted frequency component is a mixed frequency of two or more prominent frequencies in the probe drive signal, and optionally wherein the mixed frequency is one of the sum of two prominent frequencies in the probe drive signal and the difference of two prominent frequencies in the probe drive signal.

A18. The method of any of paragraphs A1-A17, wherein the probe drive signal includes a signal at an/the extracted frequency of the extracted frequency component that has an energy or a power that is at least 10 dB (decibels), at least 20 dB, at least 40 dB, at least 60 dB, or at least 80 dB weaker than an energy or a power of a signal at a/the dominant frequency of the probe drive signal, and/or the signal at the extracted frequency of the extracted frequency component that has an amplitude that is at least 5 dB (decibels), at least 10 dB, at least 20 dB, at least 30 dB, or at least 40 dB weaker than an amplitude of the signal at the dominant frequency of the probe drive signal.

A19. The method of any of paragraphs A1-A18, wherein the probe response signal, absent sensing tip-sample surface interaction, includes a signal at an/the extracted frequency of the extracted frequency component that has an energy or a power that is at least 10 dB, at least 20 dB, at least 40 dB, at least 60 dB, or at least 80 dB weaker than an energy or a power of a component of the probe response signal at a/the dominant frequency of the probe drive signal, and/or the signal at the extracted frequency of the extracted frequency component that has an amplitude that is at least 5 dB, at least 10 dB, at least 20 dB, at least 30 dB, or at least 40 dB weaker than an amplitude of the component of the probe response signal at the dominant frequency of the probe drive signal.

A20. The method of any of paragraphs A1-A19, wherein the extracting includes extracting a plurality of extracted frequency components of the probe response signal.

A21. The method of any of paragraphs A1-A20, wherein the probe drive signal includes a driven signal at a resonant frequency of the AFM probe.

A21.1. The method of paragraph A21, wherein the AFM probe has a resonance with a full bandwidth including the resonant frequency.

A21.1.1. The method of paragraph A21.1, wherein the extracted frequency component has an/the extracted frequency of the probe response signal that is outside of the full bandwidth of the resonance of the AFM probe.

A21.1.2. The method of any of paragraphs A21.1-A21.1.1, wherein the resonance is a driven resonance and the resonant frequency is a driven resonant frequency, wherein the AFM probe includes an ancillary resonance with a full bandwidth, and wherein the extracted frequency component has an/the extracted frequency that is within the full bandwidth of the ancillary resonance and that is a harmonic of the driven resonant frequency, and optionally further comprising selecting the extracted frequency within the full bandwidth of the ancillary resonance and at the harmonic of the driven resonant frequency.

A21.1.3. The method of any of paragraphs A21.1-A21.1.2, wherein the resonance is a driven resonance and the resonant frequency is a/the driven resonant frequency, wherein the AFM probe includes an/the ancillary resonance with a full bandwidth, and wherein the extracted frequency component has an/the extracted frequency that is within the full bandwidth of the ancillary resonance, wherein the driven resonant frequency is a sub-harmonic of the extracted frequency, and optionally further comprising selecting the driven resonant frequency within the full bandwidth of the driven resonance and at the sub-harmonic of the extracted frequency.

A21.2. The method of any of paragraphs A21-A21.1.3, further comprising selecting a frequency of the driven signal at the resonant frequency of the AFM probe.

A21.3. The method of any of paragraphs A21-A21.2, wherein the probe drive signal includes at least one of a first resonant frequency of the AFM probe, a second resonant frequency of the AFM probe, and a third resonant frequency of the AFM probe.

A21.4. The method of any of paragraphs A21-A21.3, wherein the resonant frequency is a/the dominant frequency and/or a/the prominent frequency of the probe drive signal.

A22. The method of any of paragraphs A1-A21.4, further comprising generating a feedback signal based upon the extracted frequency component of the probe response signal and wherein the regulating is based upon the feedback signal.

A22.1. The method of paragraph A22, wherein the feedback signal is based upon a plurality of extracted frequency components of the probe response signal.

A22.2. The method of any of paragraphs A22-A22.1, wherein the feedback signal is based upon a/the magnitude measure of the probe response signal.

A22.2.1. The method of paragraph A22.2, wherein the feedback signal is normalized by one of an energy and a power of the probe response signal.

A22.2.2. The method of any of paragraphs A22.2-A22.2.1, wherein the feedback signal is gated by at least one of an/the energy and a/the power of the probe response signal.

A22.3. The method of any of paragraphs A22-A22.2.2, wherein the feedback signal is based upon at least one of an energy and a power of a/the driven frequency component of the probe response signal.

A22.4. The method of any of paragraphs A22-A22.3, wherein the feedback signal is configured to increase to indicate an increase in the average distance between the sensing tip and the sample surface and configured to decrease to indicate a decrease in the average distance, and wherein the regulating includes incorporating the extracted frequency component in the feedback signal such that an increase in a/the magnitude measure of the extracted frequency component contributes to an increase in the feedback signal and a decrease in the magnitude measure of the extracted frequency component contributes to a decrease in the feedback signal.

A22.4.1. The method of paragraph A22.4, wherein the regulating includes incorporating the probe response signal in the feedback signal such that a decrease in a/the magnitude measure of the probe response signal contributes to an increase in the feedback signal and such that an increase in the magnitude measure of the probe response signal contributes to a decrease in the feedback signal.

A22.4.2. The method of any of paragraphs A22.4-A22.4.1, wherein the regulating includes incorporating a/the driven frequency component of the probe response signal in the feedback signal such that a decrease in a/the magnitude measure of the driven frequency component of the probe response signal contributes to an increase in the feedback signal and such that an increase in the magnitude measure of the driven frequency component of the probe response signal contributes to a decrease in the feedback signal.

A22.5. The method of any of paragraphs A22-A22.3, wherein the feedback signal is configured to decrease to indicate an increase in the average distance between the sensing tip and the sample surface and configured to increase to indicate a decrease in the average distance, and wherein the regulating includes incorporating the extracted frequency component in the feedback signal such that an increase in a/the magnitude measure of the extracted frequency component contributes to a decrease in the feedback signal and a decrease in the magnitude measure of the extracted frequency component contributes to an increase in the feedback signal.

A22.5.1. The method of paragraph A22.5, wherein the regulating includes incorporating the probe response signal in the feedback signal such that a decrease in a/the magnitude measure of the probe response signal contributes to a decrease in the feedback signal and such that an increase in the magnitude measure of the probe response signal contributes to an increase in the feedback signal.

A22.5.2. The method of any of paragraphs A22.5-A22.5.1, wherein the regulating includes incorporating a/the driven frequency component of the probe response signal in the feedback signal such that a decrease in a/the magnitude measure of the driven frequency component of the probe response signal contributes to a decrease in the feedback signal and such that an increase in the magnitude measure of the driven frequency component of the probe response signal contributes to an increase in the feedback signal.

A23. The method of any of paragraphs A1-A22.5.2, wherein the regulating includes increasing the average distance as a/the magnitude measure of the extracted frequency component increases and a/the magnitude measure of the probe response signal decreases, and wherein the regulating includes decreasing the average distance as the magnitude measure of the extracted frequency component decreases and the magnitude measure of the probe response signal increases.

A24. The method of any of paragraphs A1-A23, wherein the regulating includes increasing the average distance as at least one of a/the magnitude measure of the extracted frequency component increases and a/the magnitude measure of the probe response signal decreases, and optionally wherein the regulating includes decreasing the average distance as at least one of the magnitude measure of the extracted frequency component decreases and the magnitude measure of the probe response signal increases.

A25. The method of any of paragraphs A1-A24, wherein the regulating includes increasing the average distance as a/the magnitude measure of the extracted frequency component increases and a/the magnitude measure of a/the driven frequency component of the probe response signal decreases, and wherein the regulating includes decreasing the average distance as the magnitude measure of the extracted frequency component decreases and the magnitude measure of the driven frequency component of the probe response signal increases.

A26. The method of any of paragraphs A1-A25, wherein the regulating includes increasing the average distance as at least one of a/the magnitude measure of the extracted frequency component increases and a/the magnitude measure of a/the driven frequency component of the probe response signal decreases, and optionally wherein the regulating includes decreasing the average distance as at least one of the magnitude measure of the extracted frequency component decreases and the magnitude measure of the driven frequency component of the probe response signal increases.

A27. The method of any of paragraphs A1-A26, wherein the regulating includes regulating the average distance based upon a setpoint signal indicative of a desired strength of a/the sensing tip-sample surface interaction.

A28. The method of any of paragraphs A1-A27, wherein the regulating includes regulating according to the contribution due to the extracted frequency component provided that a/the magnitude measure of the probe response signal is greater than a minimum threshold.

A28.1. The method of paragraph A28, wherein the regulating includes increasing the average distance between the sensing tip and the sample surface while the magnitude measure of the probe response signal is less than or equal to the minimum threshold.

A28.2. The method of any of paragraphs A28-A28.1, wherein the regulating includes increasing the average distance between the sensing tip and the sample surface as the magnitude measure of the probe response signal decreases while the magnitude measure of the probe response signal is less than or equal to the minimum threshold A28.2.1. The method of paragraph A28.2, wherein changes in the extracted frequency component do not contribute to changes in the average distance between the sensing tip and the sample surface while the magnitude measure of the probe response signal is less than or equal to the minimum threshold and while a/the magnitude measure of the extracted frequency component is decreasing.

A28.2.2. The method of any of paragraphs A28.2-A28.2.1, wherein the regulating includes, while the magnitude measure of the probe response signal is less than or equal to the minimum threshold, regulating the average distance between the sensing tip and the sample surface according to a contribution due to a value of a/the magnitude measure of the extracted frequency component prior to the magnitude measure of the probe response signal decreasing below the minimum threshold and an/the opposing contribution due to the probe response signal.

A28.3. The method of any of paragraphs A28-A28.2.2, wherein the regulating includes decreasing the average distance between the sensing tip and the sample surface as the magnitude measure of the probe response signal increases while the magnitude measure of the probe response signal is less than or equal to the minimum threshold.

A28.4. The method of any of paragraphs A28-A28.3, wherein the regulating includes increasing the average distance between the sensing tip and the sample surface as a/the magnitude measure of the extracted frequency component increases while the magnitude measure of the probe response signal is less than or equal to the minimum threshold.

A28.5. The method of any of paragraphs A28-A28.4, wherein the regulating includes decreasing the average distance between the sensing tip and the sample surface as a/the magnitude measure of the extracted frequency component decreases while the magnitude measure of the probe response signal is less than or equal to the minimum threshold.

A28.6. The method of any of paragraphs A28-A28.3, wherein the regulating is not based upon the extracted frequency component while the magnitude measure of the probe response signal is less than or equal to the minimum threshold.

A29. The method of any of paragraphs A1-A28.6, wherein the regulating includes regulating according to the contribution due to the extracted frequency component provided that a/the magnitude measure of a/the driven frequency component of the probe response signal is greater than a minimum driven frequency threshold.

A29.1. The method of paragraph A29, wherein the regulating includes increasing the average distance between the sensing tip and the sample surface while the magnitude measure of the driven frequency component of the probe response signal is less than or equal to the minimum driven frequency threshold.

A29.2. The method of any of paragraphs A29-A29.1, wherein the regulating includes increasing the average distance between the sensing tip and the sample surface as the magnitude measure of the driven frequency component of the probe response signal decreases while the magnitude measure of the driven frequency component of the probe response signal is less than or equal to the minimum driven frequency threshold.

A29.2.1. The method of paragraph A29.2, wherein changes in the extracted frequency component do not contribute to changes in the average distance between the sensing tip and the sample surface while the magnitude measure of the driven frequency component of the probe response signal is less than or equal to the minimum driven frequency threshold and while a/the magnitude measure of the extracted frequency component is decreasing.

A29.2.2. The method of any of paragraphs A29.2-A29.2.1, wherein the regulating includes, while the magnitude measure of the driven frequency component of the probe response signal is less than or equal to the minimum driven frequency threshold, regulating the average distance between the sensing tip and the sample surface according to a/the contribution due to a/the value of a/the magnitude measure of the extracted frequency component prior to the magnitude measure of the driven frequency component of the probe response signal decreasing below the minimum driven frequency threshold and an/the opposing contribution due to the driven frequency component of the probe response signal.

A29.3. The method of any of paragraphs A29-A29.2.2, wherein the regulating includes decreasing the average distance between the sensing tip and the sample surface as the magnitude measure of the driven frequency component of the probe response signal increases while the magnitude measure of the driven frequency component of the probe response signal is less than or equal to the minimum driven frequency threshold.

A29.4. The method of any of paragraphs A29-A29.3, wherein the regulating includes increasing the average distance between the sensing tip and the sample surface as a/the magnitude measure of the extracted frequency component increases while the magnitude measure of the driven frequency component of the probe response signal is less than or equal to the minimum driven frequency threshold.

A29.5. The method of any of paragraphs A29-A29.4, wherein the regulating includes decreasing the average distance between the sensing tip and the sample surface as a/the magnitude measure of the extracted frequency component decreases while the magnitude measure of the driven frequency component of the probe response signal is less than or equal to the minimum driven frequency threshold.

A29.6. The method of any of paragraphs A29-A29.3, wherein the regulating is not based upon the extracted frequency component while the magnitude measure of the driven frequency component of the probe response signal is less than or equal to the minimum driven frequency threshold.

A30. The method of any of paragraphs A1-A29.6, wherein the regulating includes regulating according to the contribution due to the extracted frequency component provided that a/the magnitude measure of the probe response signal is less than a maximum threshold.

A30.1. The method of paragraph A30, wherein the regulating includes decreasing the average distance between the sensing tip and the sample surface while the magnitude measure of the probe response signal is greater than or equal to the maximum threshold.

A30.2. The method of any of paragraphs A30-A30.1, wherein the regulating includes decreasing the average distance between the sensing tip and the sample surface as the magnitude measure of the probe response signal increases while the magnitude measure of the probe response signal is greater than or equal to the maximum threshold.

A30.2.1. The method of paragraph A30.2, wherein changes in the extracted frequency component do not contribute to changes in the average distance between the sensing tip and the sample surface while the magnitude measure of the probe response signal is greater than or equal to the maximum threshold and while a/the magnitude measure of the extracted frequency component is increasing.

A30.2.2. The method of any of paragraphs A30.2-A30.2.1, wherein the regulating includes, while the magnitude measure of the probe response signal is greater than or equal to the maximum threshold, regulating the average distance between the sensing tip and the sample surface according to a/the contribution due to a/the value of a/the magnitude measure of the extracted frequency component prior to the magnitude measure of the probe response signal increasing above the maximum threshold and an/the opposing contribution due to the probe response signal.

A30.3. The method of any of paragraphs A30-A30.2.2, wherein the regulating includes increasing the average distance between the sensing tip and the sample surface as the magnitude measure of the probe response signal increases while the magnitude measure of the probe response signal is greater than or equal to the maximum threshold.

A30.4. The method of any of paragraphs A30-A30.3, wherein the regulating includes increasing the average distance between the sensing tip and the sample surface as a/the magnitude measure of the extracted frequency component decreases while the magnitude measure of the probe response signal is greater than or equal to the maximum threshold.

A30.5. The method of any of paragraphs A30-A30.4, wherein the regulating includes increasing the average distance between the sensing tip and the sample surface as a/the magnitude measure of the extracted frequency component increases while the magnitude measure of the probe response signal is greater than or equal to the maximum threshold.

A30.6. The method of any of paragraphs A30-A30.3, wherein the regulating is not based upon the extracted frequency component while the magnitude measure of the probe response signal is greater than or equal to the maximum threshold.

A31. The method of any of paragraphs A1-A30.6, wherein the regulating includes regulating according to the contribution due to the extracted frequency component provided that a/the magnitude measure of a/the driven frequency component of the probe response signal is less than a maximum driven frequency threshold.

A31.1. The method of paragraph A31, wherein the regulating includes decreasing the average distance between the sensing tip and the sample surface while the magnitude measure of the driven frequency component of the probe response signal is greater than or equal to the maximum driven frequency threshold.

A31.2. The method of any of paragraphs A31-A31.1, wherein the regulating includes decreasing the average distance between the sensing tip and the sample surface as the magnitude measure of the driven frequency component of the probe response signal increases while the magnitude measure of the driven frequency component of the probe response signal is greater than or equal to the maximum driven frequency threshold A31.2.1. The method of paragraph A31.2, wherein changes in the extracted frequency component do not contribute to changes in the average distance between the sensing tip and the sample surface while the magnitude measure of the driven frequency component of the probe response signal is greater than or equal to the maximum driven frequency threshold and while a/the magnitude measure of the extracted frequency component is increasing.

A31.2.2. The method of any of paragraphs A31.2-A31.2.1, wherein the regulating includes, while the magnitude measure of the driven frequency component of the probe response signal is greater than or equal to the maximum driven frequency threshold, regulating the average distance between the sensing tip and the sample surface according to a/the contribution due to a/the value of a/the magnitude measure of the extracted frequency component prior to the magnitude measure of the driven frequency component of the probe response signal increasing above the maximum threshold and an/the opposing contribution due to the driven frequency component of the probe response signal.

A31.3. The method of any of paragraphs A31-A31.2.2, wherein the regulating includes increasing the average distance between the sensing tip and the sample surface as the magnitude measure of the driven frequency component of the probe response signal decreases while the magnitude measure of the driven frequency component of the probe response signal is greater than or equal to the maximum driven frequency threshold.

A31.4. The method of any of paragraphs A31-A31.3, wherein the regulating includes decreasing the average distance between the sensing tip and the sample surface as the magnitude measure of a/the extracted frequency component decreases while the magnitude measure of the driven frequency component of the probe response signal is greater than or equal to the maximum driven frequency threshold.

A31.5. The method of any of paragraphs A31-A31.4, wherein the regulating includes increasing the average distance between the sensing tip and the sample surface as a/the magnitude measure of the extracted frequency component increases while the magnitude measure of the driven frequency component of the probe response signal is greater than or equal to the maximum driven frequency threshold.

A31.6. The method of any of paragraphs A31-A31.3, wherein the regulating is not based upon the extracted frequency component while the magnitude measure of the driven frequency component of the probe response signal is greater than or equal to the maximum driven frequency threshold.

A32. The method of any of paragraphs A1-A31.6, wherein the magnitude measure of the extracted frequency component, where used, includes at least one of, optionally is one of, an intensity, an energy, a power, an amplitude, an RMS amplitude, a peak-to-peak amplitude, a positive peak amplitude, a negative peak amplitude, and a maximum absolute value of the extracted frequency component.

A33. The method of any of paragraphs A1-A32, wherein the inverted magnitude measure of the extracted frequency component, where used, includes at least one of, optionally is one of, an inverse and a negation of a/the magnitude measure of the extracted frequency component.

A34. The method of any of paragraphs A1-A33, wherein the magnitude measure of the probe response signal, where used, includes at least one of, optionally is one of, an intensity, an energy, a power, an amplitude, an RMS amplitude, a peak-to-peak amplitude, a positive peak amplitude, a negative peak amplitude, and a maximum absolute value of the probe response signal.

A35. The method of any of paragraphs A1-A34, wherein the inverted magnitude measure of the probe response signal, where used, includes at least one of, optionally is one of, an inverse and a negation of a/the magnitude measure of the probe response signal.

A36. The method of any of paragraphs A1-A35, wherein the magnitude measure of the driven frequency component of the probe response signal, where used, includes at least one of, optionally is one of, an intensity, an energy, a power, an amplitude, an RMS amplitude, a peak-to-peak amplitude, a positive peak amplitude, a negative peak amplitude, and a maximum absolute value of the driven frequency component of the probe response signal.

A37. The method of any of paragraphs A1-A36, wherein the inverted magnitude measure of the driven frequency component of the probe response signal, where used, includes at least one of, optionally is one of, an inverse and a negation of a/the magnitude measure of the driven frequency component of the probe response signal.

A38. The method of any of paragraphs A1-A37, further comprising displaying at least one of an/the amplitude, an/the intensity, a frequency, a phase, an/the energy, and a/the power of the probe response signal.

A39. The method of any of paragraphs A1-A38, further comprising displaying at least one of an/the amplitude, an/the intensity, a frequency, a phase, an/the energy, and a/the power of a/the driven frequency component of the probe response signal.

A40. The method of any of paragraphs A1-A39, further comprising displaying at least one of an/the amplitude, an/the intensity, a frequency, a phase, an/the energy, and a/the power of the extracted frequency component.

A41. The method of any of paragraphs A1-A40, further comprising displaying a/the feedback signal.

A42. The method of any of paragraphs A1-A41, further comprising displaying a signal representative of regulation of the average distance between the sensing tip and the sample surface.

A43. The method of any of paragraphs A1-A42, further comprising, before the regulating, decreasing the average distance between the sensing tip and the sample surface until a/the magnitude measure of the extracted frequency component is greater than a contact threshold.

A43.1. The method of paragraph A43, wherein the contact threshold is related to a/the desired strength of a/the sensing tip-sample surface interaction.

A43.2. The method of any of paragraphs A43-A43.1, wherein the contact threshold is an extracted frequency contact threshold and wherein the decreasing includes decreasing the average distance between the sensing tip and the sample surface until the magnitude measure of the extracted frequency component is greater than the extracted frequency contact threshold and a/the magnitude measure of the probe response signal is at least one of (a) decreasing and (b) less than a probe response contact threshold.

A43.3. The method of any of paragraphs A43-A43.2, wherein the contact threshold is an/the extracted frequency contact threshold and wherein the decreasing includes decreasing the average distance between the sensing tip and the sample surface until the magnitude measure of the extracted frequency component is greater than the extracted frequency contact threshold and a/the magnitude measure of the driven frequency component of the probe response signal is at least one of (a) decreasing and (b) less than a driven frequency contact threshold.

A43.4. The method of any of paragraphs A43-A43.3, further comprising raster scanning the sample surface with the sensing tip after the decreasing.

A44. The method of any of paragraphs A1-A43.4, wherein the regulating includes decreasing the average distance between the sensing tip and the sample surface until a/the magnitude measure of the extracted frequency component is greater than a/the contact threshold.

A44.1. The method of paragraph A44, wherein the contact threshold is related to a/the desired strength of a/the sensing tip-sample surface interaction.

A44.2. The method of any of paragraphs A44-A44.1, wherein the contact threshold is an extracted frequency contact threshold and wherein the regulating includes decreasing the average distance between the sensing tip and the sample surface until the magnitude measure of the extracted frequency component is greater than the extracted frequency contact threshold and a/the magnitude measure of the probe response signal is less than a/the probe response contact threshold.

A44.3. The method of any of paragraphs A44-A44.2, wherein the contact threshold is an/the extracted frequency contact threshold and wherein the regulating includes decreasing the average distance between the sensing tip and the sample surface until the magnitude measure of the extracted frequency component is greater than the extracted frequency contact threshold and a/the magnitude measure of the driven frequency component of the probe response signal is less than a/the driven frequency contact threshold.

A44.4. The method of any of paragraphs A44-A44.3, further comprising raster scanning the sample surface with the sensing tip after the decreasing.

A45. The method of any of paragraphs A1-A44.4, further comprising, before the regulating, decreasing the average distance between the sensing tip and the sample surface to a predetermined distance related to a/the desired strength of a/the sensing tip-sample surface interaction.

A46. The method of any of paragraphs A1-A45, wherein the regulating includes decreasing the average distance between the sensing tip and the sample surface to a/the predetermined distance related to a/the desired strength of a/the sensing tip-sample surface interaction.

B1. An atomic force microscope comprising:
an AFM probe that has a sensing tip;
a probe drive signal controller configured to generate a probe drive signal to elicit oscillatory motion from the AFM probe;
a probe detector configured generate a probe response signal indicative of the oscillatory motion of the AFM probe; and
a feedback system comprising
a feedback signal generator configured to extract an extracted frequency component of the probe response signal; and
a control algorithm unit configured to regulate an average distance between the sensing tip and a sample surface according to a contribution due to the extracted frequency component.

B2. The atomic force microscope of paragraph B1, wherein one or more of the AFM probe, the sensing tip, the probe drive signal, the oscillatory motion, the probe response signal, and the extracted frequency component are the respective elements as recited in any of paragraphs A1-A46.

B3. The atomic force microscope of any of paragraphs B1-B2, wherein the feedback system is configured to perform any of the methods or steps of paragraphs A1-A46.

B4. The atomic force microscope of any of paragraphs B1-B3, wherein the feedback signal generator includes, optionally is, at least one of a harmonics signal generator and a harmonics feedback input signal synthesizer.

B4.1. The atomic force microscope of paragraph B4, wherein the harmonics signal generator is configured to extract the extracted frequency component of the probe response signal, and optionally wherein the harmonics signal generator is configured to provide a harmonics energy signal that indicates a magnitude measure of the extracted frequency component.

B4.2. The atomic force microscope of any of paragraphs B4-B4.1, wherein the harmonics feedback input signal synthesizer is configured to produce a harmonics feedback input signal that indicates a/the magnitude measure of the extracted frequency component.

B4.2.1. The atomic force microscope of paragraph B4.2, wherein the harmonics feedback input signal is based upon the probe response signal, and optionally based upon at least one of an energy of the probe response signal, a power of the probe response signal, a driven frequency component of the probe response signal, an energy of the driven frequency component of the probe response signal, and a power of the driven frequency component of the probe response signal.

B4.3. The atomic force microscope of any of paragraphs B4-B4.2.1, further comprising a harmonics gating unit configured to gate the extracted frequency component based upon the probe response signal, and optionally based upon at least one of an/the energy of the probe response signal, a/the power of the probe response signal, a/the driven frequency component of the probe response signal, an/the energy of the driven frequency component of the probe response signal, and a/the power of the driven frequency component of the probe response signal.

B5. The atomic force microscope of any of paragraphs B1-B4.3, wherein the feedback system includes a setpoint controller configured to generate a setpoint signal indicative of a desired strength of a sensing tip-sample surface interaction and includes an error signal controller that is configured to produce an error signal based upon the setpoint signal, and wherein the control algorithm unit is configured to regulate the average distance between the sensing tip and the sample surface based upon the error signal.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

As used herein, the phrase, "for example," the phrase, "as an example," and/or simply the term "example," when used with reference to one or more components, features, details, structures, embodiments, and/or methods according to the present disclosure, are intended to convey that the described component, feature, detail, structure, embodiment, and/or method is an illustrative, non-exclusive example of components, features, details, structures, embodiments, and/or methods according to the present disclosure. Thus, the described component, feature, detail, structure, embodiment, and/or method is not intended to be limiting, required, or exclusive/exhaustive; and other components, features, details, structures, embodiments, and/or methods, including structurally and/or functionally similar and/or equivalent components, features, details, structures, embodiments, and/or methods, are also within the scope of the present disclosure.

As used herein, the phrases "at least one of" and "one or more of," in reference to a list of more than one entity, means any one or more of the entities in the list of entities, and is not limited to at least one of each and every entity specifically listed within the list of entities. For example, "at least one of A and B" (or, equivalently, "at least one of A or B," or, equivalently, "at least one of A and/or B") may refer to A alone, B alone, or the combination of A and B.

As used herein, the term "and/or" placed between a first entity and a second entity means one of (1) the first entity, (2) the second entity, and (3) the first entity and the second entity. Multiple entities listed with "and/or" should be construed in the same manner, i.e., "one or more" of the entities so conjoined. Other entities may optionally be present other than the entities specifically identified by the "and/or" clause, whether related or unrelated to those entities specifically identified. Thus, as a non-limiting example, a reference to "A and/or B," when used in conjunction with open-ended language such as "comprising" may refer, in one embodiment, to A only (optionally including entities other than B); in another embodiment, to B only (optionally including entities other than A); in yet another embodiment, to both A and B (optionally including other entities). These entities may refer to elements, actions, structures, steps, operations, values, and the like.

As used herein, the singular forms "a", "an" and "the" may be intended to include the plural forms as well, unless the context clearly indicates otherwise.

This application incorporates by reference in their entirety for all purposes all patents, patent applications (published, pending, and/or abandoned), and other patent and nonpatent references cited anywhere in this application. In the event that any patents, patent applications, or other references that are incorporated by reference herein (1) define a term in a manner that is inconsistent with and/or (2) are otherwise inconsistent with, either the non-incorporated portion of the present disclosure or any of the other incorporated references, the non-incorporated portion of the present disclosure shall control, and the term or incorporated disclosure therein shall only control with respect to the reference in which the term is defined and/or the incorporated disclosure was present originally.

The various disclosed elements of systems and steps of methods disclosed herein are not required of all systems and methods according to the present disclosure, and the present disclosure includes all novel and non-obvious combinations and subcombinations of the various elements and steps disclosed herein. Moreover, any of the various elements and steps, or any combination of the various elements and/or steps, disclosed herein may define independent inventive subject matter that is separate and apart from the whole of a disclosed system or method. Accordingly, such inventive subject matter is not required to be associated with the specific systems and methods that are expressly disclosed herein, and such inventive subject matter may find utility in systems and/or methods that are not expressly disclosed herein.

It is believed that the following claims particularly point out certain combinations and subcombinations that are directed to one of the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower, or equal in scope to the original claims, are also regarded as included within the subject matter of the inventions of the present disclosure.

The invention claimed is:

1. A method of atomic force microscopy, the method comprising:
    driving an AFM probe in an oscillatory motion with a probe drive signal, wherein the AFM probe includes a sensing tip;
    detecting the oscillatory motion of the AFM probe to produce a probe response signal;
    extracting an extracted frequency signal of the probe response signal; and
    regulating an average distance between the sensing tip and a sample surface according to a contribution due to the extracted frequency signal and an opposing contribution due to the probe response signal, and wherein the regulating includes decreasing the average distance between the sensing tip and the sample surface until a magnitude measure of the extracted frequency signal is greater than a contact threshold;
    wherein the contact threshold is an extracted frequency signal contact threshold and wherein the regulating includes decreasing the average distance between the sensing tip and the sample surface until the magnitude measure of the extracted frequency signal is greater than the extracted frequency signal contact threshold and a magnitude measure of the probe response signal is decreasing.

2. The method of claim 1, wherein the contact threshold is related to a desired strength of a sensing tip-sample surface interaction.

3. The method of claim 1, wherein an extracted frequency of the extracted frequency signal is a harmonic of a driven frequency in the probe drive signal.

4. The method of claim 1, further comprising raster scanning the sample surface with the sensing tip after the decreasing.

5. A method of atomic force microscopy, the method comprising:
  driving an AFM probe in an AFM probe oscillatory motion with a probe drive signal, wherein the probe drive signal has a frequency spectrum that includes a driven frequency, and wherein the AFM probe includes a sensing tip;
  detecting the AFM probe oscillatory motion to produce a probe response signal indicative of the AFM probe oscillatory motion;
  extracting an extracted frequency signal of the probe response signal at an extracted frequency indicative of the AFM probe oscillatory motion at the extracted frequency;
  synthesizing a synthesized feedback input signal to a feedback control scheme by combining the extracted frequency signal and the probe response signal; and
  regulating an average distance between the sensing tip and a sample surface according to the synthesized feedback input signal;
  wherein the regulating includes regulating such that a decrease of an energy of the AFM probe oscillatory motion at the extracted frequency contributes positively to decreasing the average distance between the sensing tip and the sample surface, and such that the decrease of the energy of the AFM probe oscillatory motion at the extracted frequency contributes negatively to increasing the average distance between the sensing tip and the sample surface; and
  wherein the regulating includes regulating such that an increase of an energy of the probe response signal contributes positively to decreasing the average distance between the sensing tip and the sample surface, and such that the increase of the energy of the probe response signal contributes negatively to increasing the average distance between the sensing tip and the sample surface.

6. The method of claim 5, wherein the regulating includes regulating such that an increase of the energy of the AFM probe oscillatory motion at the extracted frequency contributes positively to increasing the average distance between the sensing tip and the sample surface, and such that the increase of the energy of the AFM probe oscillatory motion at the extracted frequency contributes negatively to decreasing the average distance between the sensing tip and the sample surface.

7. The method of claim 5, wherein the regulating includes regulating such that a decrease of the energy of the probe response signal contributes positively to increasing the average distance between the sensing tip and the sample surface, and such that the decrease of the energy of the probe response signal contributes negatively to decreasing the average distance between the sensing tip and the sample surface.

8. The method of claim 5, wherein the synthesizing includes combining a contribution due to the extracted frequency signal of the probe response signal and an opposing contribution due to a driven frequency signal of the probe response signal at the driven frequency.

9. The method of claim 5, wherein the extracted frequency is a harmonic of the driven frequency.

10. The method of claim 5, wherein the regulating includes regulating according to the synthesized feedback input signal provided that the energy of the probe response signal is greater than a minimum threshold.

11. The method of claim 6, wherein the regulating includes regulating such that a decrease of the energy of the probe response signal contributes positively to increasing the average distance between the sensing tip and the sample surface, and such that the decrease of the energy of the probe response signal contributes negatively to decreasing the average distance between the sensing tip and the sample surface.

12. The method of claim 6, wherein the synthesizing includes combining a contribution due to the extracted frequency signal of the probe response signal and an opposing contribution due to a driven frequency signal of the probe response signal at the driven frequency.

13. The method of claim 7, wherein the synthesizing includes combining a contribution due to the extracted frequency signal of the probe response signal and an opposing contribution due to a driven frequency signal of the probe response signal at the driven frequency.

14. The method of claim 11, wherein the synthesizing includes combining a contribution due to the extracted frequency signal of the probe response signal and an opposing contribution due to a driven frequency signal of the probe response signal at the driven frequency.

15. The method of claim 6, wherein the extracted frequency is a harmonic of the driven frequency.

16. The method of claim 7, where in the extracted frequency is a harmonic of the driven frequency.

17. The method of claim 8, wherein the extracted frequency is a harmonic of the driven frequency.

18. The method of claim 11, wherein the extracted frequency is a harmonic of the driven frequency.

19. The method of claim 6, wherein the synthesizing includes combining a contribution due to the extracted frequency signal of the probe response signal and an opposing contribution due to a driven frequency signal of the probe response signal at the driven frequency, and wherein the extracted frequency is a harmonic of the driven frequency.

20. The method of claim 7, wherein the synthesizing includes combining a contribution due to the extracted frequency signal of the probe response signal and an opposing contribution due to a driven frequency signal of the probe response signal at the driven frequency, and wherein the extracted frequency is a harmonic of the driven frequency.

21. The method of claim 11, wherein the synthesizing includes combining a contribution due to the extracted frequency signal of the probe response signal and an opposing contribution due to a driven frequency signal of the probe response signal at the driven frequency, and wherein the extracted frequency is a harmonic of the driven frequency.

22. The method of claim 5, wherein the regulating includes regulating according to the synthesized feedback input signal provided that a magnitude measure of the probe response signal is greater than a minimum threshold.

23. The method of claim 8, wherein the regulating includes regulating according to the synthesized feedback input signal provided that a magnitude measure of the probe response signal is greater than a minimum threshold.

24. The method of claim 9, wherein the regulating includes regulating according to the synthesized feedback input signal provided that a magnitude measure of the probe response signal is greater than a minimum threshold.

25. The method of claim 8, wherein the regulating includes regulating according to the synthesized feedback input signal provided that a magnitude measure of the driven frequency signal of the probe response signal at the driven frequency is greater than a minimum threshold.

26. A method of atomic force microscopy, the method comprising:
   driving an AFM probe in an oscillatory motion with a probe drive signal, wherein the AFM probe includes a sensing tip;
   detecting the oscillatory motion of the AFM probe to produce a probe response signal;
   extracting an extracted frequency signal of the probe response signal; and
   regulating an average distance between the sensing tip and a sample surface according to a contribution due to the extracted frequency signal and an opposing contribution due to the probe response signal, and wherein the regulating includes decreasing the average distance between the sensing tip and the sample surface until a magnitude measure of the extracted frequency signal is greater than a contact threshold;
   wherein the contact threshold is an extracted frequency signal contact threshold, wherein the opposing contribution due to the probe response signal is an opposing contribution due to a driven frequency signal of the probe response signal, and wherein the regulating includes decreasing the average distance between the sensing tip and the sample surface until the magnitude measure of the extracted frequency signal is greater than the extracted frequency signal contact threshold and a magnitude measure of the driven frequency signal of the probe response signal is decreasing.

27. The method of claim 26, wherein the contact threshold is related to a desired strength of a sensing tip-sample surface interaction.

28. The method of claim 26, wherein an extracted frequency of the extracted frequency signal is a harmonic of a driven frequency in the probe drive signal.

29. The method of claim 26, further comprising raster scanning the sample surface with the sensing tip after the decreasing.

* * * * *